United States Patent
Petrick et al.

(10) Patent No.: US 7,357,086 B2
(45) Date of Patent: Apr. 15, 2008

(54) MODULAR SYSTEM OF POWER AND DATA DELIVERY COMPONENTS AND METHOD OF SETTING UP AND UTILIZING THE COMPONENTS IN A WORK SPACE ENVIRONMENT

(75) Inventors: Chris Petrick, Park Ridge, IL (US); David James Gennrich, Madison, WI (US); Kent Bradley Chase, Madison, WI (US); Richard A. Nelipovich, Madison, WI (US); William Charles Lindeman, Marshall, WI (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 414 days.

(21) Appl. No.: 10/619,861

(22) Filed: Jul. 15, 2003

(65) Prior Publication Data

US 2004/0082334 A1 Apr. 29, 2004

Related U.S. Application Data

(60) Provisional application No. 60/396,088, filed on Jul. 15, 2002.

(51) Int. Cl.
 *A47B 37/00* (2006.01)
(52) U.S. Cl. .................................. 108/50.02
(58) Field of Classification Search ............ 108/50.01, 108/50.02, 64; 312/223.6, 196, 195, 223.3; 52/36.1, 220.7, 220.8
See application file for complete search history.

(56) References Cited

U.S. PATENT DOCUMENTS

| | | |
|---|---|---|
| 3,425,587 A | 2/1969 | Duross, Jr. |
| 3,576,304 A | 4/1971 | Gillemot |
| 4,224,769 A | 9/1980 | Ball et al. |
| 4,535,703 A | 8/1985 | Henriott et al. |
| 4,748,913 A * | 6/1988 | Favaretto et al. ........ 108/50.02 |
| 4,771,583 A | 9/1988 | Ball et al. |
| 4,831,791 A | 5/1989 | Ball |
| 4,852,500 A * | 8/1989 | Ryburg et al. ........... 108/50.01 |
| 5,037,164 A * | 8/1991 | Weissenbach et al. ... 108/50.02 |
| 5,150,554 A | 9/1992 | Quinlan, Jr. et al. |
| 5,152,698 A | 10/1992 | Juhlin et al. |
| 5,186,425 A * | 2/1993 | Keusch et al. ........... 108/50.02 |
| 5,215,280 A | 6/1993 | Tigrett |
| 5,362,923 A | 11/1994 | Newhouse et al. |
| D354,904 S | 1/1995 | Halsten |
| 5,511,348 A | 4/1996 | Cornell et al. |
| 5,606,919 A | 3/1997 | Fox et al. |
| 5,606,920 A | 3/1997 | Meyer et al. |
| D378,731 S | 4/1997 | Kopish |
| 5,673,632 A * | 10/1997 | Sykes ...................... 108/50.02 |
| D387,652 S | 12/1997 | Carlson, Jr. |
| 5,704,298 A * | 1/1998 | Corpuz et al. ........... 108/50.01 |

(Continued)

*Primary Examiner*—Jose V. Chen
(74) *Attorney, Agent, or Firm*—Welsh & Katz, Ltd

(57) ABSTRACT

A modular system of power and data components comprising a substation having power and data ports is provided. The system includes channels releasably connectable to the substation and supports. The substation, channels and supports are releasably and rotatably connected to permit the system to be formed in almost infinite combinations to accommodate numerous office or work space configurations. The system is used in conjunction with tables, screens and other furniture to form a fully and easily adjustable office or work space set-up to accommodate any office or work space situation and to allow quick change to accommodate changes in the initial office or work space set-up.

18 Claims, 40 Drawing Sheets

U.S. PATENT DOCUMENTS

| | | | |
|---|---|---|---|
| 5,899,025 A * | 5/1999 | Casey et al. | 108/50.02 |
| 5,901,513 A * | 5/1999 | Mollenkopf et al. | 108/50.02 |
| 5,971,508 A | 10/1999 | Deimen et al. | |
| 5,988,076 A * | 11/1999 | Vander Park | 108/50.02 |
| 6,029,713 A | 2/2000 | Miranda | |
| 6,037,538 A | 3/2000 | Brooks | |
| 6,101,954 A * | 8/2000 | Rein et al. | 108/50.02 |
| 6,161,487 A * | 12/2000 | Chang | 108/50.01 |
| 6,170,410 B1 * | 1/2001 | Gioacchini et al. | 108/50.01 |
| 6,202,567 B1 * | 3/2001 | Funk et al. | 108/50.02 |
| 6,226,931 B1 | 5/2001 | Haversat | |
| 6,267,064 B1 * | 7/2001 | Ostertag et al. | 108/50.02 |
| D446,028 S | 8/2001 | Ruedinger et al. | |
| 6,327,983 B1 * | 12/2001 | Cronk et al. | 108/50.02 |
| 6,374,548 B1 | 4/2002 | Ruedinger et al. | |
| 6,448,498 B1 * | 9/2002 | King et al. | 108/50.02 |
| 6,732,660 B2 * | 5/2004 | Dame et al. | 108/50.01 |
| 2002/0011193 A1 | 1/2002 | Beck et al. | |

* cited by examiner

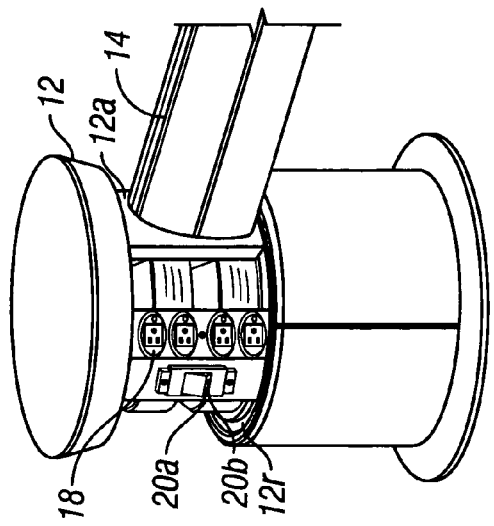
FIG. 9
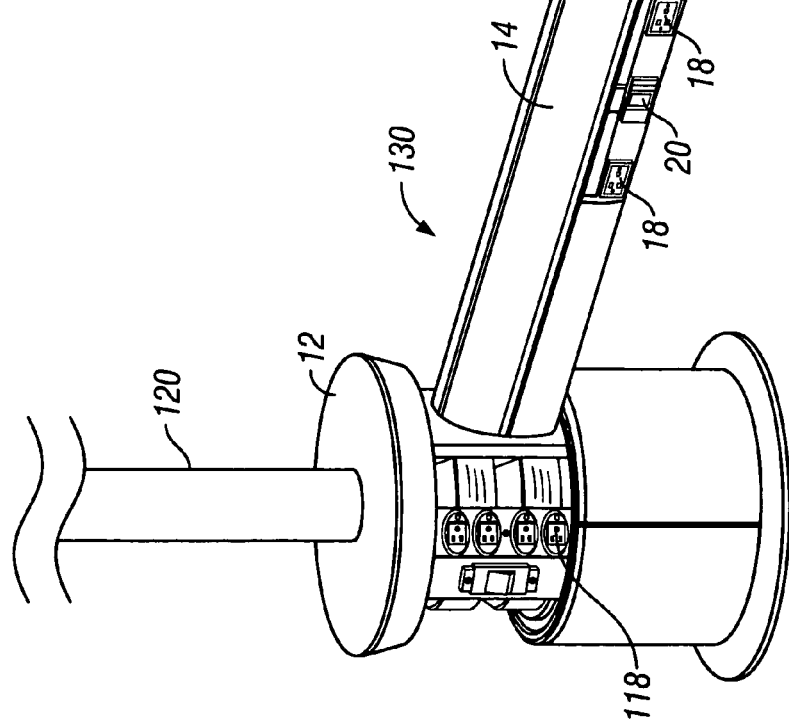
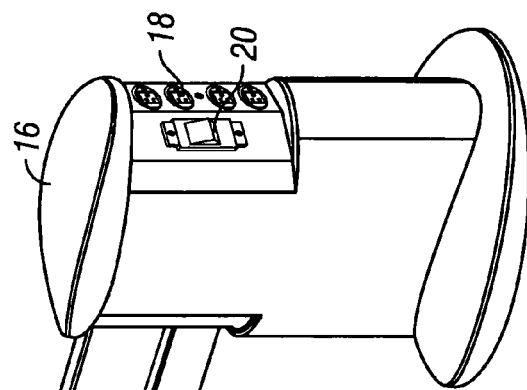
FIG. 10

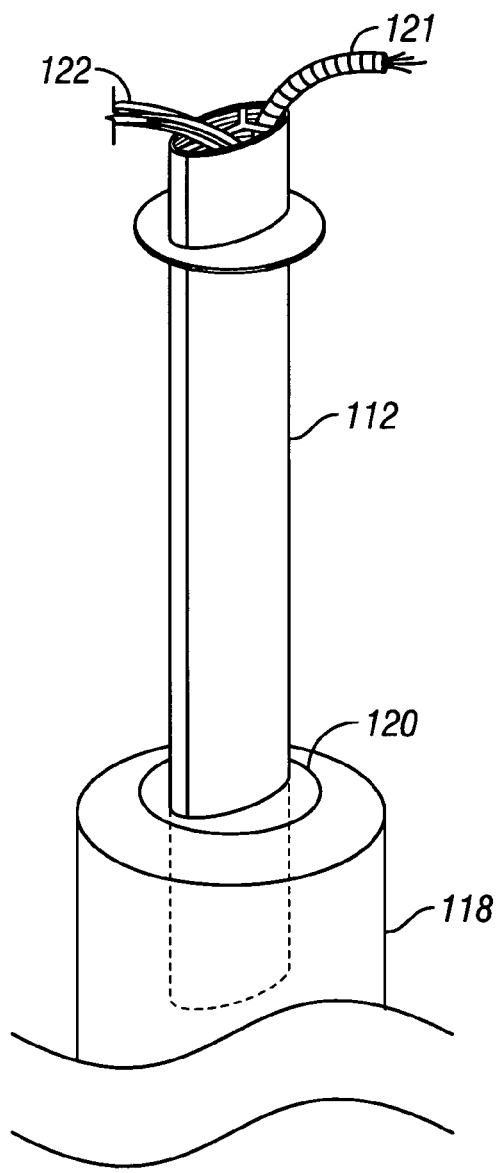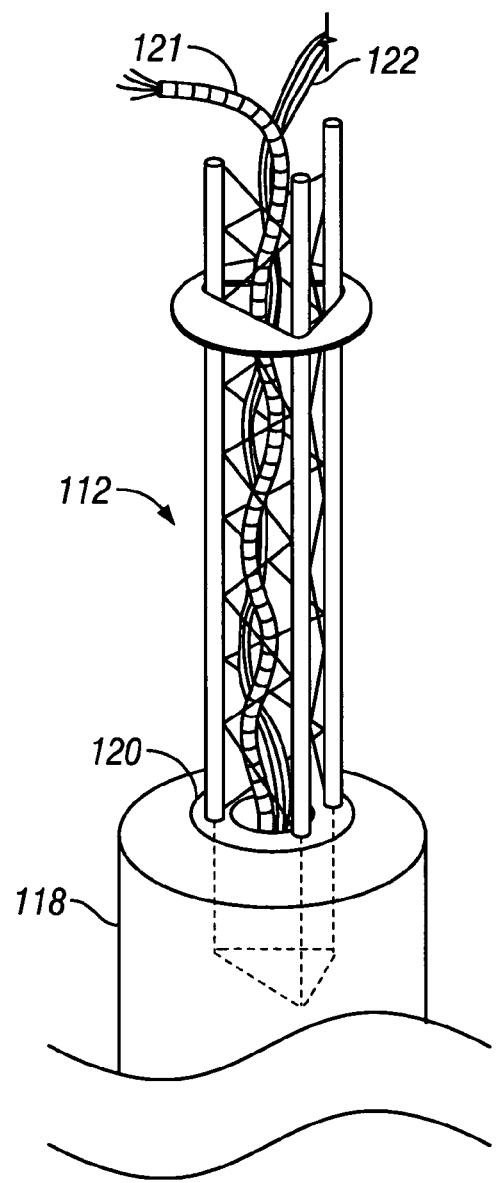
*FIG. 11A*      *FIG. 11B*

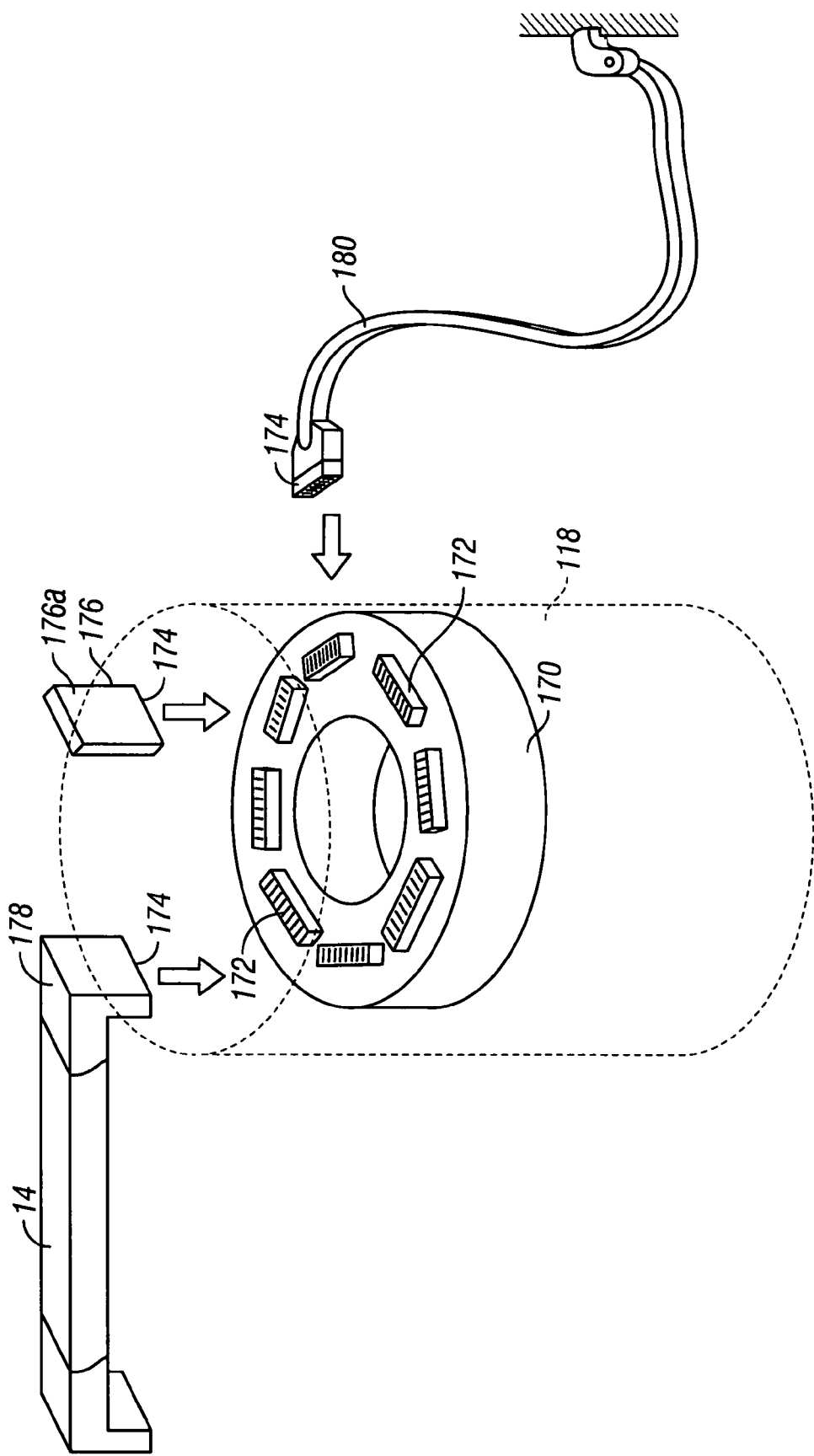

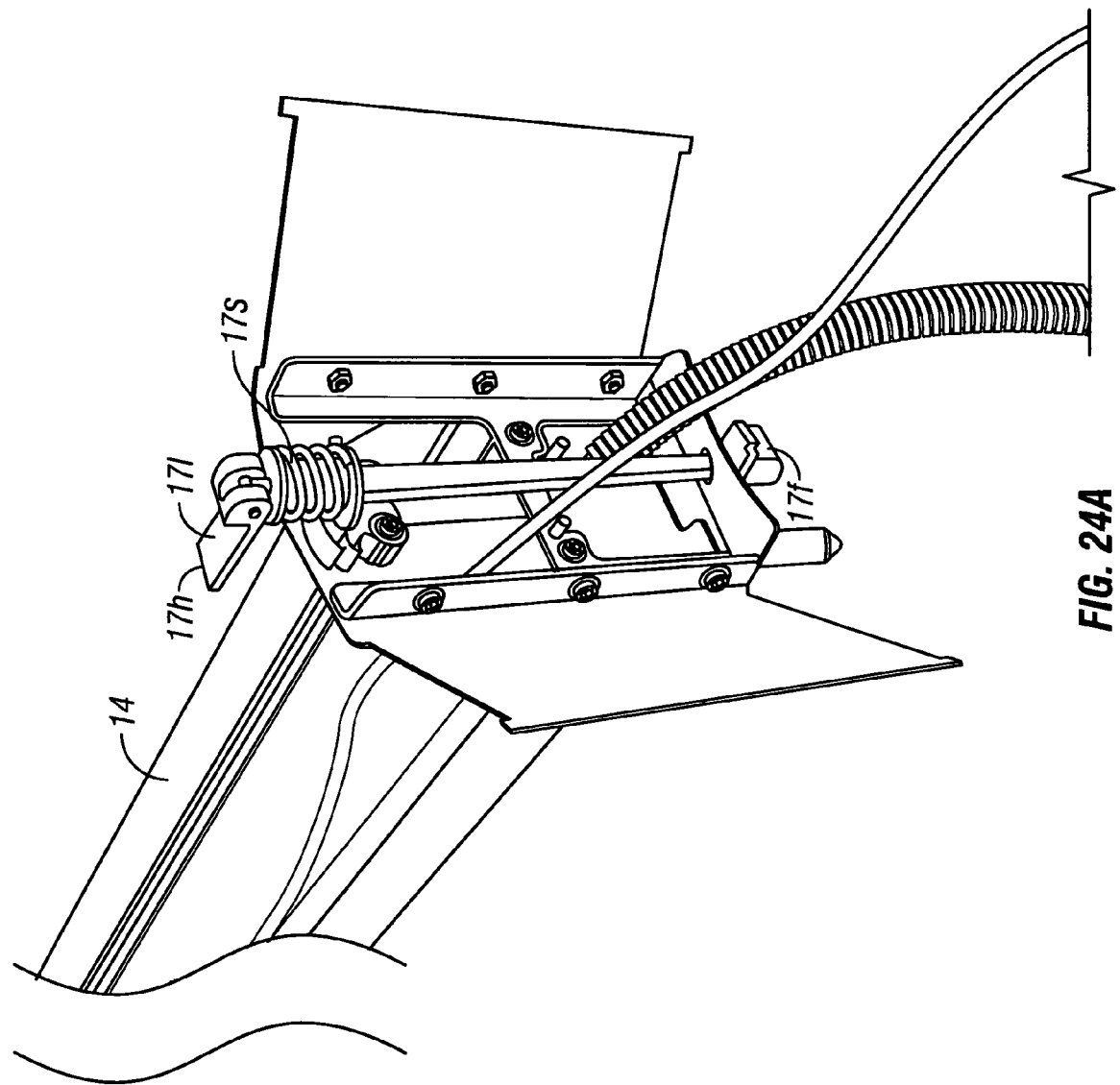

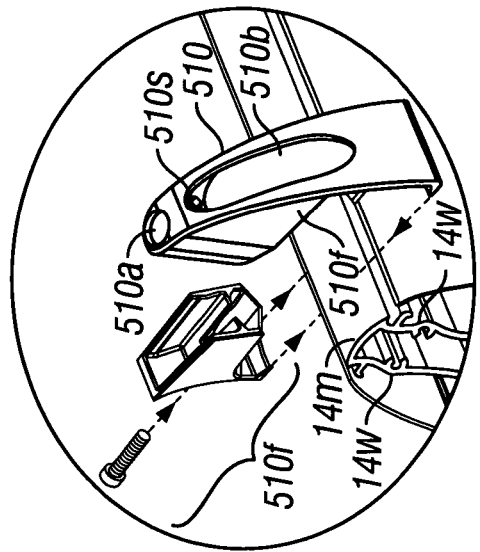
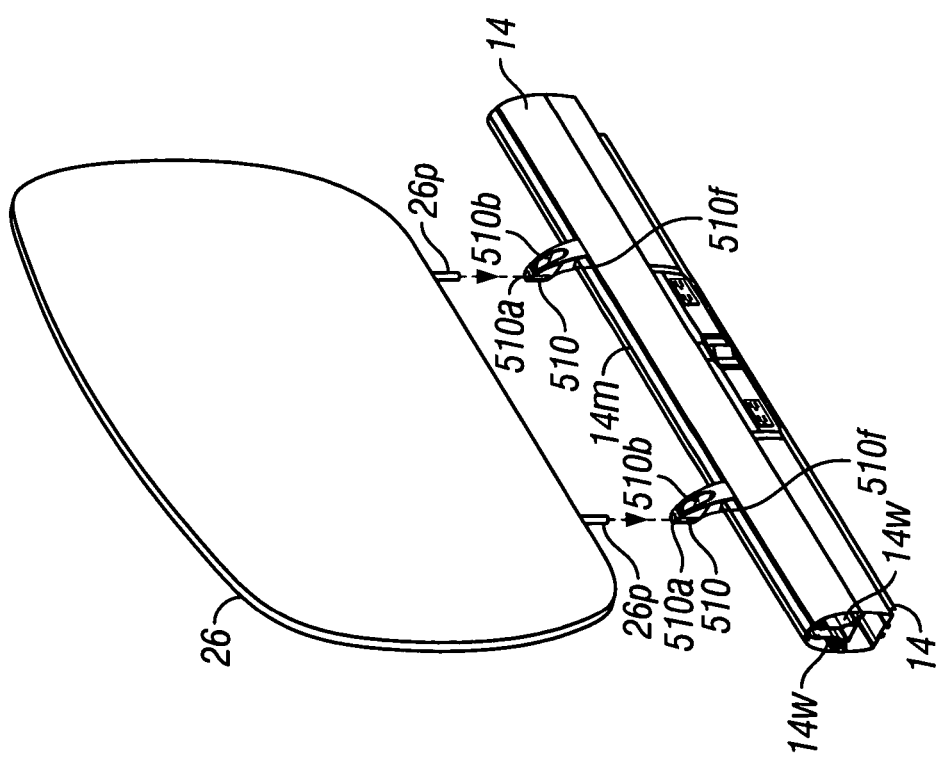
FIG. 30A
FIG. 30

MODULAR SYSTEM OF POWER AND DATA DELIVERY COMPONENTS AND METHOD OF SETTING UP AND UTILIZING THE COMPONENTS IN A WORK SPACE ENVIRONMENT

This application is related to U.S. Provisional Patent Application No. 60/396,088 filed Jul. 15, 2002, now complete. U.S. Provisional Patent Application No. 60/396,088 is incorporated by reference as if set forth in its entirety herein.

FIELD OF THE INVENTION

The present invention concerns a modular system designed to deliver power and data in a work environment in a comfortable, stylish and ergonomic fashion. More particularly the present invention concerns devices that can be used individually or combined to create a work environment comprised of components that exceed the present needs of a modern office or work space while being stylish, workable, readily and easily changeable and configurable to satisfy the future needs of an office or work space.

BACKGROUND OF THE INVENTION

Work space environments have long consisted of executive offices, which typically are at the perimeter of the office space, with the interior of the space, typically having secretarial and staff stations. Other types of work spaces often comprise large open areas filled with cubicles, typically in rigid and even rows. There are also work spaces that comprise a small space where groups of individuals work together on projects, and, therefore, require both individual work-spaces and a combined environment for meetings and group project spaces. Further, work spaces can be defined in schools, including universities, colleges, and public schools (elementary and secondary levels) as well as libraries and meeting rooms (such as government office and legislative arenas, for example the meeting place of a congress or other legislature). It will be understood by persons having skill in the art that the use, herein, of terms such as office space and work space are meant only to simplify the present text and should not be seen or effected, as a limitation on the broad scope of the present invention. Terms such as office space, work space, work stations, cubicles (as well as collections of cubicles) and other terms that describe places and equipment used to permit groups of people to work together, are herein interchangeable and not meant to limit the scope of the present invention.

In the past, rigid forms of work spaces provided for a work space design, which while it could encompass all of the above styles, typically encompassed only one and the one chosen was built in a permanent and fixed manner. Remodeling of such spaces generally requires the tearing down of the former space and the construction of a new environment, using workmen such as carpenters, electricians, furniture installers, data technicians, voice technicians, plumbers and other tradesmen and requiring considerable time and expense.

Equipment used in prior art office space set ups typically requires that cords, cables and other wires and/or communications means, be hand fed, head first, through such elements as cubical walls, moldings and office equipment, as well as through building walls, ceilings and floors, so that power and data can be fed from the point of power and data entry to desired portions of work stations. Often times these cables must be fed repeatedly through multiple points in each of the above noted barriers. In order to set-up these work stations of the prior art, cables and cords must be fed or fished throughout equipment and devices, somewhat like the process of sewing where a thread must be interwoven by a needle within the fabric. In order to remodel work space, the cords must be removed in a procedure akin to ripping seems. Generally, cords and cables are destroyed and/or the work-station disassembly can far exceed the costs of purchase of new systems (particularly when the cost of assembly, using the threading or fishing process, can be so costly).

Often times an office will begin with one or two partners, or associates, forming a company with a project in mind or a profession to be practiced. Secretarial and clerical staff may be initially chosen in small efficient numbers to accommodate the new business. As the business grows and matures into a working concern, the number of staff and executives will change. The initially set up office or work space must be remodeled to accommodate the changes or the new workers will suffer from lack of individual work space, desks and, generally, room within their respective spaces. Remodeling is often neglected due to the difficulties, as explained above, of breaking down the old office, cubicle set up or work space and setting up the new space. Further, setting up new space, in the prior art, requires the ability to visualize the office or work space, as it will be when remodeling is done, before proceeding. Once a plan is in motion, and equipment has been ordered, it is very difficult to modify a design in prior art systems. Further, the initial vision of the space and the reality of its dimensions are often skewed and the plan becomes unworkable or must be drastically modified at great cost and waste.

Occurrences of employees leaving, either in layoffs or in other moral lowering experience or in expansions of firms that do not have space for new employees are somewhat common. This is a general truism because business is not static; it typically grows or retracts. Typically such occurrences lead to a diminution in work product and efficiency until such time as the office, or work space, is remodeled to accommodate current needs and, if foresight is used, the potential growth (or retraction) of the company. It has happened, however, that a company that has thought itself likely to continue growing, finds its products or services in lesser demand and instead matures into a smaller sized company, downsizing as it grows. As a result, the large or remodeled office, or work space, often times becomes a hindrance to efficient communication and work between remaining employees. Further, the empty rooms and cubicles are constant reminders to remaining employees and partners (or associates) that the long-term plan of the company has failed and that the company, as well as their job, might be in jeopardy. Such reminders are destructive to moral and are often self-fulfilling prophecies of employees leaving, as in such situations valued employees begin to look for opportunities in other locations. Further, when a company moves from one location to another it is often the case that the office set up will be left behind as the costs and time of disassembling, moving and reassembling prior art set ups is typically more than the purchase and assembly of new equipment.

It would be desirable to have office, or work space, set ups that can easily be changed to accommodate the growth or retraction of the company. It would be desirable to have space, and the furniture and fixtures within it that could change with the needs of the company even on a day-to-day basis. Further, it would be desirable to have an office set up that could be packed away and moved to a new location, at a savings in cost and time, when a company moves to new space. Such changes, which would not require the complete disassembly and removal of components, cords and equipment, would cut the costs of remodeling and allow firms and work places to add or remove elements of work areas to make work easier, more pleasant and forward looking.

SUMMARY OF THE INVENTION

In accordance with the present invention a modular system of power and data components comprising a substation having power and data ports, for connection respectively to power and data carrier means, and means to connect the ports to, respectively, a source of power and at least one communication data source is provided. The system is made up of a number of components each of which is a novel part of the present invention. The substation, while part of the system, is a stand-alone device capable of providing all necessary systems for an office or work space or multiple work stations.

The system can further comprise at least one channel, releasably connectable to the substation, the channel comprising a proximal end and a distal end and means to carry power and data from the substation therethrough. In a preferred embodiment the channel is releasably connectable without the use of tools. At least one support is provided in association with the channel. The support comprises means to releasably connect the channel such that the channel can span from a substation to a support, from a first support to another support or from a first substation to another substation. In a preferred embodiment, a series of channels are provided and span from both the substation and from one or more of the supports. Tables, screens and other office furniture are provided in association with the substation, channel and support devices forming a complete office ensemble.

In a preferred embodiment of the modular system, the channels and substations are connected together, such that the channel can be easily rotated and/or pivoted in relation to the substation when desired. Further, in that preferred embodiment the channels and supports are also connected such that the channels can be rotated and/or pivoted in relation to the supports when desired. In this manner, the system of the present invention is extremely flexible in forming work areas in desirable and functional configurations.

In a preferred embodiment, substations are utilized to bring electricity, data and communications means into the work space and form substantially a hub for the distribution of electricity, data and communications. In one embodiment, the substation in conjunction with means to take data, communications and power to each desk, such as an umbilical of systems, forms a hub from which desks and other furniture orbit to form a working office environment.

Further, in a preferred embodiment, data, communication and power means are distributed through channels which permit the placement, removal and replacement of such power, data and communications means without the removal of channels or the necessity to feed the data through openings and structural components of the channels. In this manner, upgrading and remodeling of office, or work space, is simplified.

In one embodiment of the present invention, the connection between substations and channels, and also supporting means, is made such that the channels can be swiveled, or otherwise rotated and/or pivoted, in substantially any direction, permitting the creation of ergonomic designs of office, or work space. The combination of the ease of movement and placement of channels along with the ease of placement and upgrading of power, data and communications means, permits the easy remodeling of office, or work space, created with the devices and methods of the present invention.

In a preferred embodiment, screens, desks, chairs, workstations and other furniture and office equipment can be connected to, or used in association with, the substations, channels and supports, such that a complete office or workstation, system is created. Such a system would enjoy the modularity and ease of maintenance, construction and re-constructability of the present invention.

A more detailed explanation of the invention is provided in the following description and claims and is illustrated in the accompanying drawings.

BRIEF DESCRIPTION OF THE DRAWINGS

FIG. 9 is an enlarged view of one embodiment of the substation and channel of FIG. 8 of the present invention.

FIG. 10 is a schematic view, partially cut away, of another embodiment of a substation having a power pole ceiling infeed.

FIG. 11a is a perspective view, partially cut away, of the power entry point of FIG. 10.

FIG. 11b is another perspective view, partially cut away, and shown without the decorative cover, of the power entry point of FIG. 10.

FIG. 14 is a perspective view of one embodiment of a ring connection system of a substation of another embodiment of the device of the present invention.

FIG. 24a is a perspective view of one end of the channel of FIG. 24.

FIG. 30 is an exploded perspective view of one embodiment of a channel and screen combination of the present invention.

FIG. 30a is an exploded perspective view of an accessory holding means.

DETAILED DESCRIPTION OF THE ILLUSTRATIVE EMBODIMENTS

Figure 1:
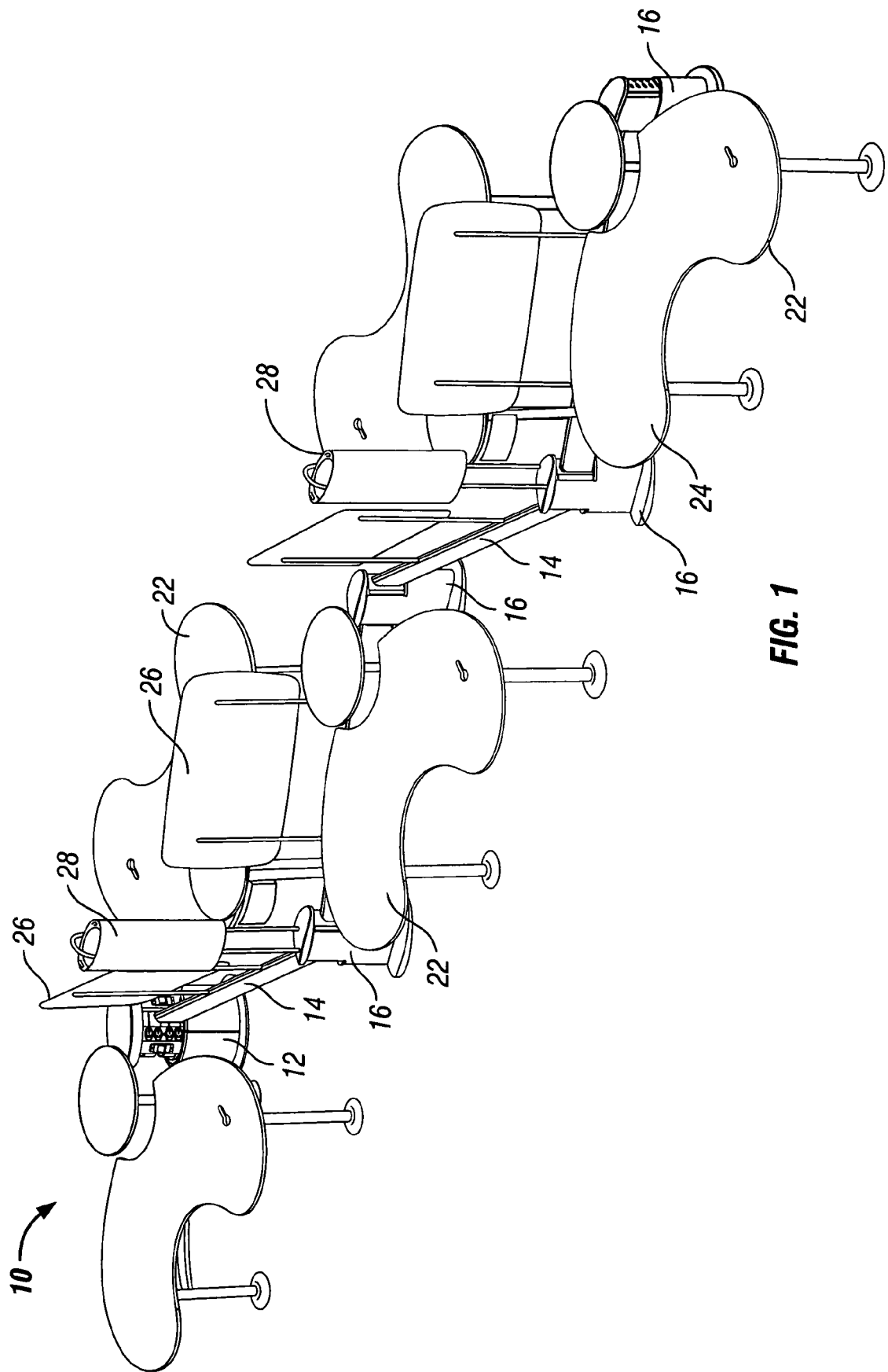
FIG. 1 is a perspective view of one embodiment of a system made in accordance with the teachings of the present invention.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiments") relates to a requirement of the United States Patent Office, and should not be found to limit the disclosed herein.

Figure 2:
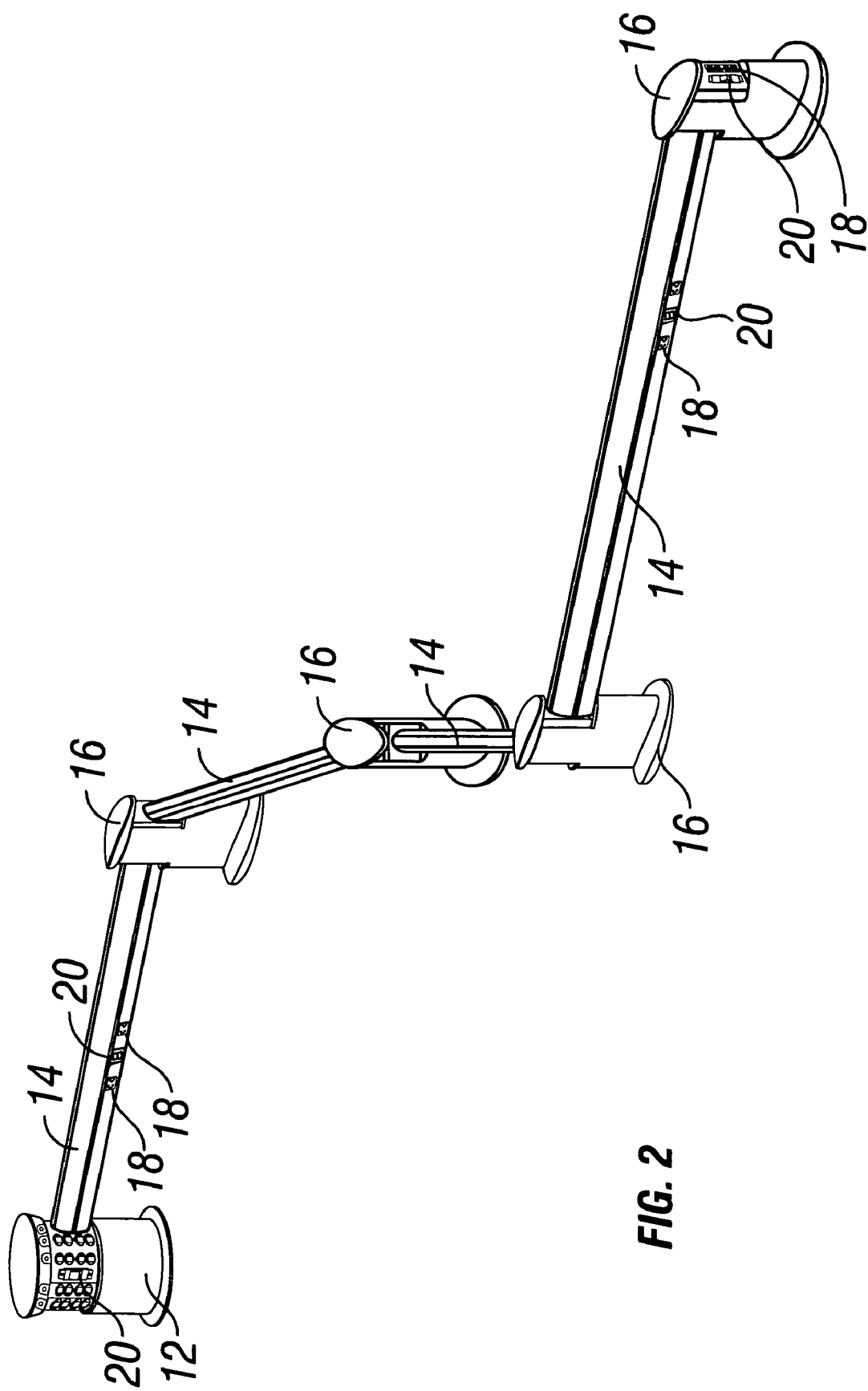
FIG. 2 is a perspective view of one embodiment of the power, data and communication transmission components of a system made in accordance with the teachings of the present invention.

Referring to the figures, a modular system of power and data delivery components is shown. FIG. 1 shows one embodiment of an office or work space system 10 utilizing some of the components, described further herein, that are provided and can be used, in association with other elements, to create such a system 10. As shown in FIG. 1, which should be considered as one embodiment of the present invention and not as the sole manner of arranging components, system 10 comprises the following components: substations 12, channels 14, supports 16, power connections 18 (FIG. 2), data ports 20 (FIG. 2) and various furniture pieces 22. The furniture pieces comprise, among other things, tables 24, screens 26 and lamps 28. FIG. 2 shows the channels 14, supports 16 and a substation 12 of the present invention apart from furniture 22. It will be seen that channels 14, supports 16 and substations 12, forming the underlying transmission system 30 can be arranged in innumerable ways to produce any desired shape of an office or work space layout.

As shown in FIG. 2, the power, data and communication transmission system 30 is shown without the furniture attached It will be seen that the transmission system 30 is comprised of a substation 12, channels 14 and supports 16, in various numbers and configurations. Power connections 18 and data ports 20 are shown in each of these elements in desirable places about the transmission system 30. It will be understood by persons having skill in the art that the transmission system 30 elements are designed to provide convenient outlets for data, power and communications, generally transmissives 31 and therefore any configuration of such ports in each of these components is within the novel scope of the present invention.

Figure 3:
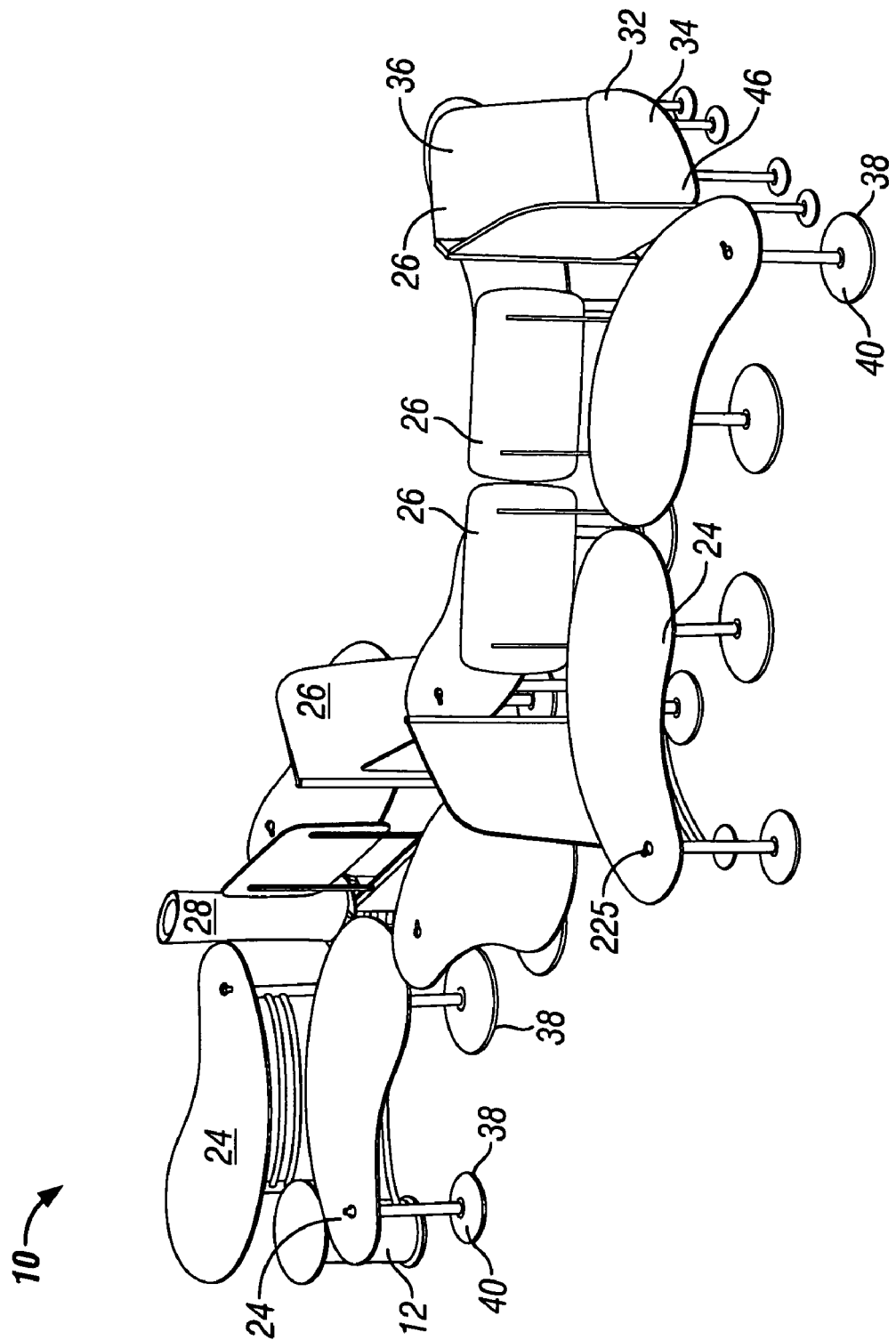
FIG. 3 is a perspective view of one embodiment of a system including some furniture and screens made in accordance with the teachings of the present invention.
Figure 4:
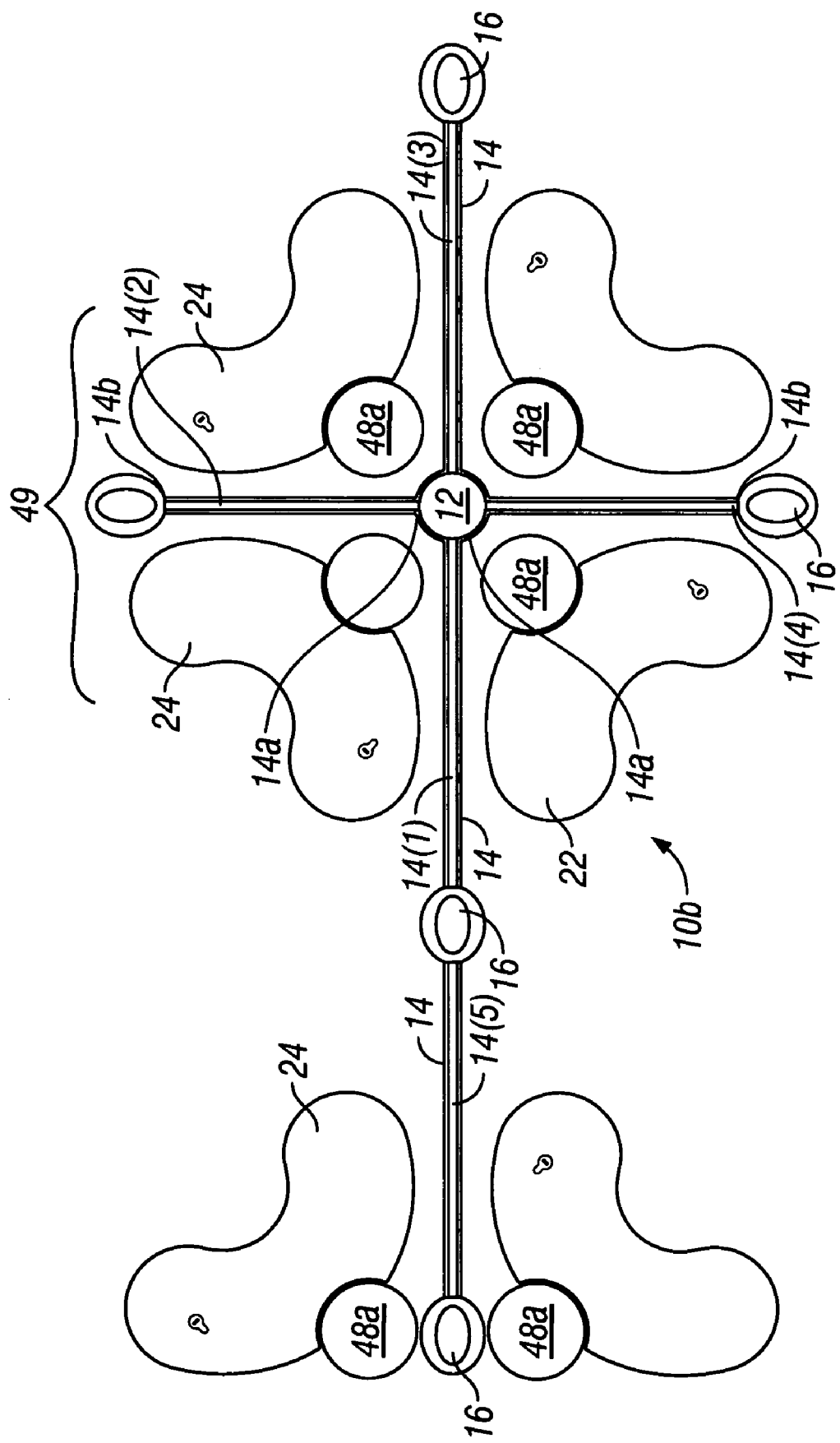
FIG. 4 is a top plan view of one embodiment of a system of the present invention.

In FIGS. 3 and 4 different embodiments of the office or work space system 10 are shown, showing various uses of the components, used in a variety of manners, to accommodate different needs for office or work space. The system 10 can be configured with any number of channels 14 and supports 16 for a variety of different furniture configurations. Referring to FIG. 3 a number of tables 24 are shown in a configuration of an office or work space system 10a. The system 10a of FIG. 3 might be a system used to provide a small degree of privacy and noise abatement for a group of telephone callers, sales persons, students or others who, while requiring some table space do not require absolute privacy in their daily operations. In FIG. 3, tables 24 are of a generally kidney shaped configuration, having a central portion 22a at which a chair (not shown) can be placed. The left 22L and right 22R wings of the table can be utilized to place, respectively, computer equipment and telephonic equipment (not shown). Screens 26 are placed intermittently between tables 24 to provide some degree of privacy and noise abatement. Screens 26 can be of the flat screen 26a or angular screen 26b variety. It will be understood by persons having skill in the art, that screens 26 can be shaped to fill any space as desired, without departing from the novel scope of the present invention. Screens 26, can in one embodiment, be constructed with a hardened core, for support, with insulation type material covered with cloth. In such a configuration, screens 26 can be used to post notes and messages for reminders, provide a privacy screening effect and absorb noises to aid in lowering the overall sound of the office or work space. It will be understood that screens 26 can be made utilizing other materials and without resilient materials such that their sole purpose is to provide privacy screening, without departing from the novel scope of the present invention.

Figure 5:
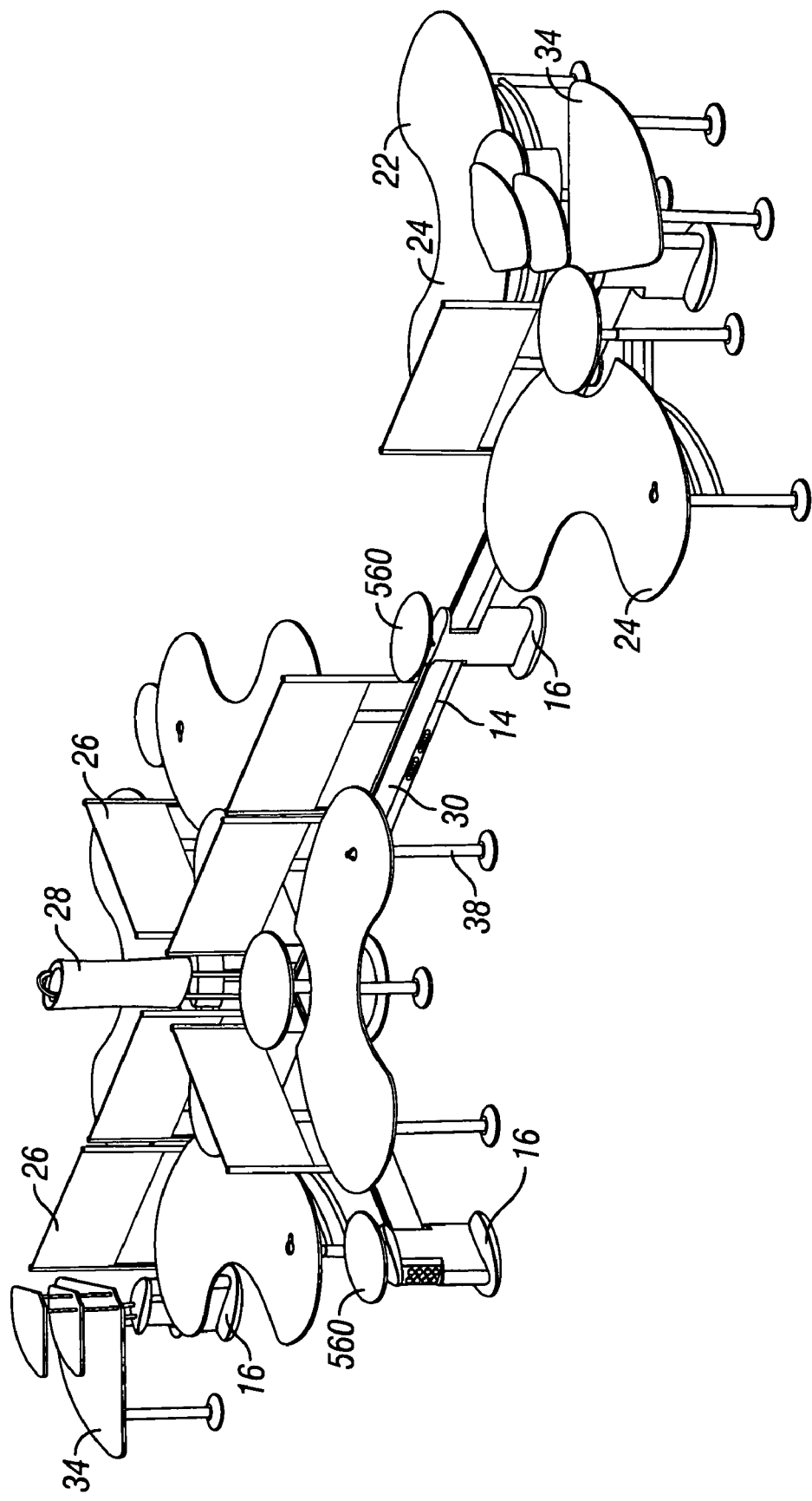
FIG. 5 is a perspective view of one embodiment of a system made in accordance with the present invention.

FIGS. 3 and 5 further show, a smaller work station 32 comprising a smaller table 34, generally having a generally pie-slice-shaped configuration and being surrounded on two sides by an angular screen 36. Station 32 can be an information center for the entire office or work space or can provide an impromptu space for one or more workers to stop and compare notes without disturbing other office mates.

It will be seen that tables 24 and 34 are supported by table legs 38, of various sizes and shapes, to best accommodate the shape and size of the table supported. Slender leg shapes supported by large diameter bases 40 are illustrated in FIG. 3. Such shapes provide excellent support for the various tables while giving a delicate and elegant look otherwise not available in such a large configuration of office furniture. A support structure 42, beneath table surfaces 24s is provided to permit the use of thinner table surfaces 24s while providing structural strength to surface 24s. It is a goal of the present invention to provide a well constructed and structurally significant work area while giving an architecturally elegant and light look.

A tower shaped screen 44 is included to provide both an aesthetic look and all of the features of the other screens 26 noted above. It will be understood, by persons having skill in the art, that screens having other shapes can be used without departing from the novel scope of the present invention. Further, an end table 46 is included between tables 24, situated at the end of a row of tables 24 and screens 26. End table 46 can be used for any number of functions as well as can be used merely to provide an adequate end-point to system 10.

Referring now to FIG. 4, another configuration of tables 24 and components is shown as system 10b. System 10b may be a workstation wherein a group of individuals can work together in a cluster 49 while supervisors work separately, in a smaller grouping, at a comfortable distance. As shown in FIG. 4, tables 24, having the desirable kidney shape shown in FIG. 3. In the present configuration, tables 24 are placed about channels 14, which in the present configuration are in a cross pattern. As will be shown in configurations shown in others of the Figures, channels 14 can, as a result of the novel improvements of the present invention, be placed in any desirable configuration with considerable ease. For initial clarity, a cross pattern is illustrated in FIG. 4.

The work system shown in FIG. 4, is created using five individual channels 14(1), 14(2), 14(3), 14(4) and 14(5) to form a cross shape and an elongation. Four of the channels 14 are joined together at their proximal ends 14a to a substation 12 and are supported at their distal ends 14b by supports 16. Substation 12 and supports 16 will be explained in greater detail below. Further, the fifth channel 14 spans two supports 16, extending from one of the channels 14(1) which forms part of the cross shape within the cluster of four tables. As will be explained in greater detail below, channels 14, substation 12 and supports 16 are instrumental in connecting the tables forming work stations together electronically and physically and connecting system 10b to other systems, networks and other office or work spaces.

As shown in FIG. 4, each of the tables 24 is provided with a super-structure platform 48, onto which a computer monitor, or other equipment can be placed. It will be understood that a television monitor, stereo equipment or other device (including such items as decorative elements) can be placed on platform 48 without departing from the novel scope of the present invention. As part of system 10b it will be understood that the devices such as those shown in FIGS. 1 and 3, that is screens and towers and others, can be used in the present embodiment without departing from the novel scope of the present invention.

FIG. 5 shows a further configuration of the elements explained above. It will be seen that in the configuration of FIG. 5, a different, more curvaceous configuration of channels 14 will be required. As will be shown below, such a configuration, previously impossible utilizing devices of the prior art, is possible utilizing the devices and methods of the present invention.

Figure 6:
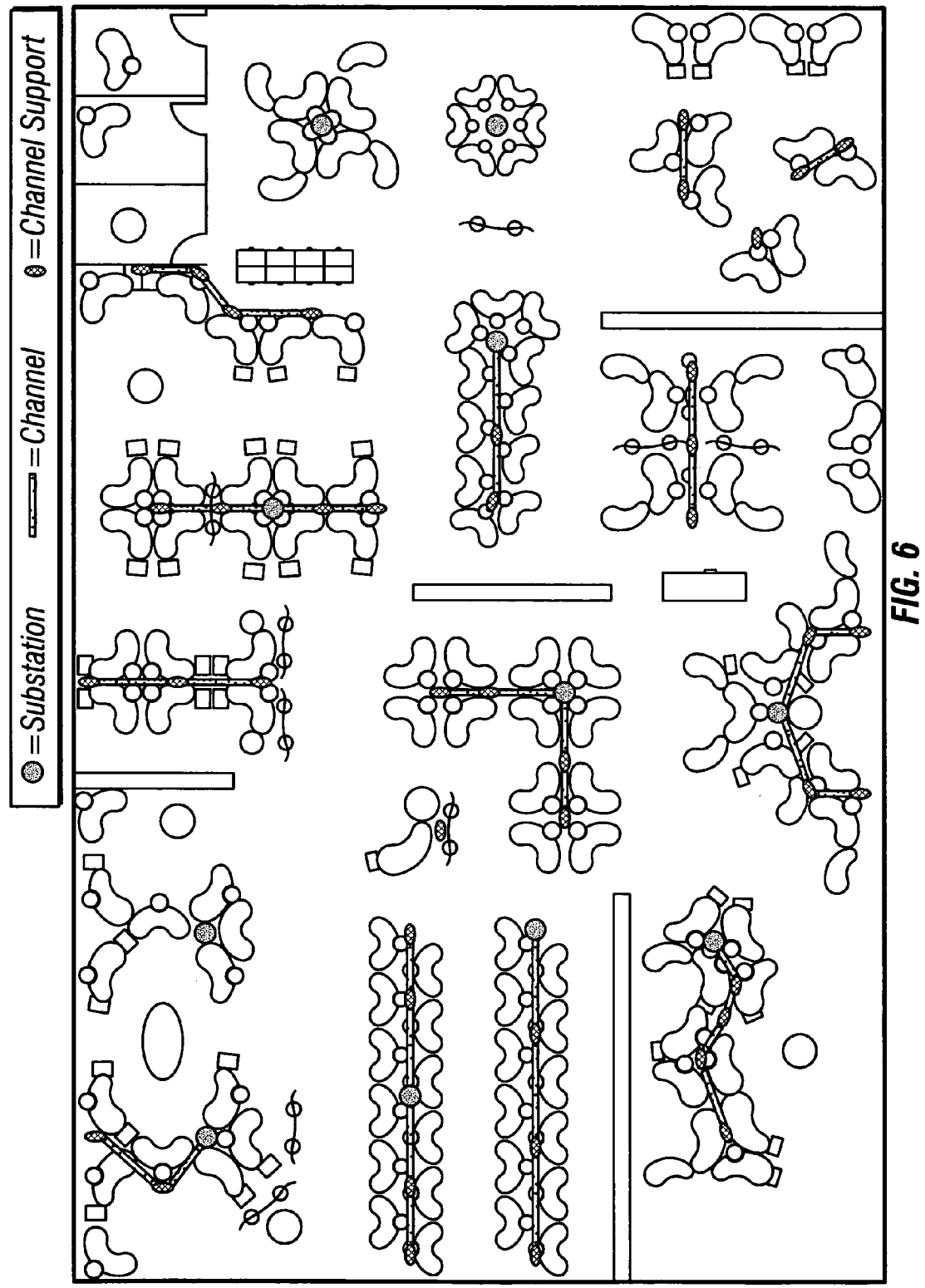
FIG. 6 is a schematic representation of various systems made in accordance with the teachings of the present invention.
Figure 7:
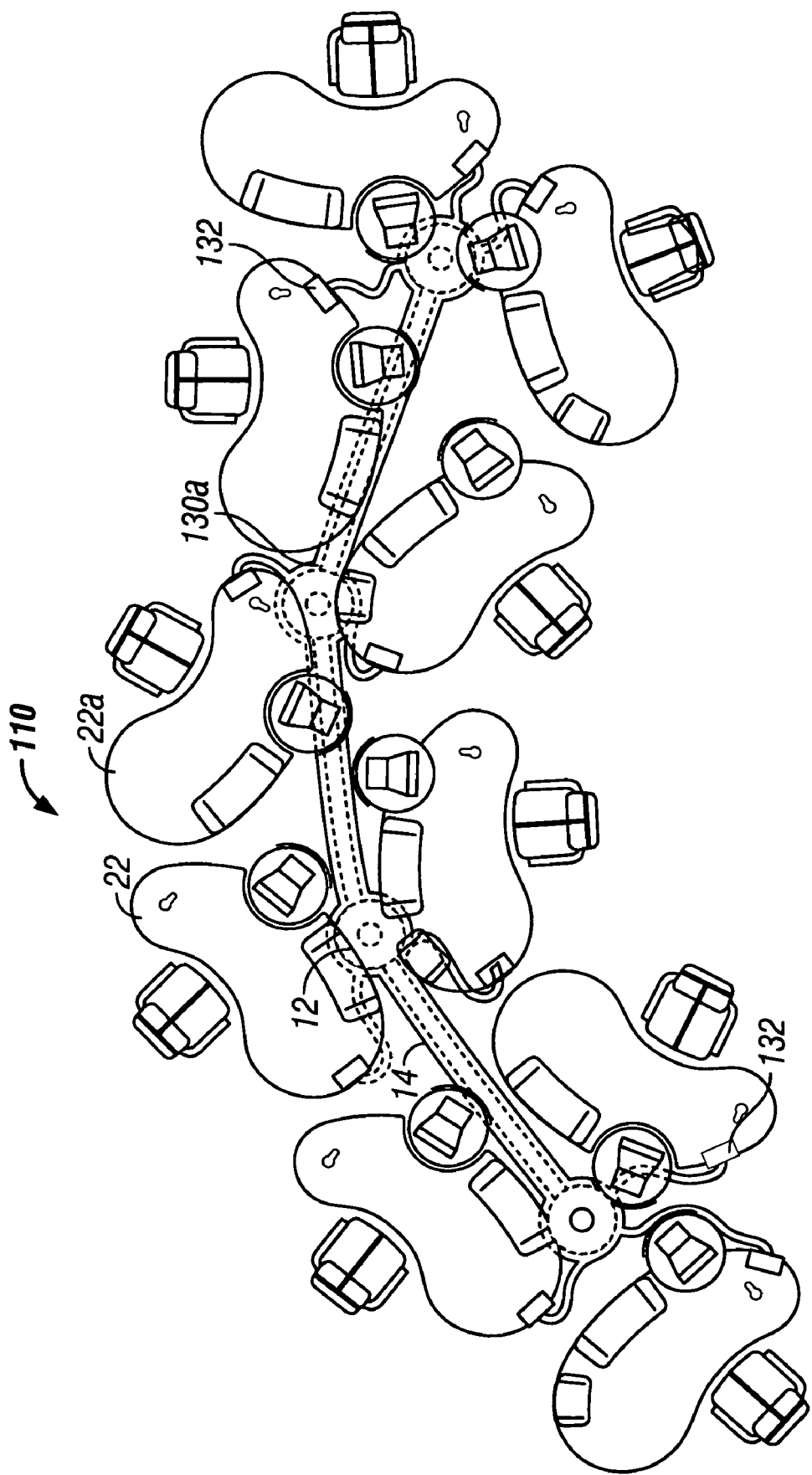
FIG. 7 is a schematic view showing a top view of one embodiment of a system made in accordance with the present invention.

Referring now to FIGS. 6 and 7, elevational views from above of various layouts of office or work spaces 10 are shown. It will be observed that unusual, for office or work space design, is the large varieties of work areas that can be developed from only those elements already described above. It is to be understood, in FIG. 9, that each of the layouts shown includes a transmission system 30 (or 130) as already discussed. Therefore, each of the systems shown includes at least one substation 12 (or 112), one or more channels 14 and one or more supports 16 or, in the alternative, a substation can be substituted for a support, as most clearly shown in FIG. 10. Each of these systems also includes furniture 22 as has been described in detail above.

Referring to FIG. 6, an office or work space system 10c is shown having a transmission system 130a, which as noted above, is comprised of a number of substations 12 and channels 14. In the example shown in FIG. 6, four substations 12 are included with 3 channels 14 spanning there between. It will be understood, with reference to FIG. 9, that almost an infinite number of shapes can be produced with the above parts without departing from the novel scope of the present invention. It will be further understood, that FIG. 13 should not be interpreted as limiting the present invention to those designs shown, but that FIG. 13 represents a number of possible designs in an almost infinite number of combinations.

Referring again to FIG. 6, it will be seen that transmission system 130a includes power outlet umbilicals 182 that permit the user to access power at the table top level, or at any intermediate levels at which the umbilical is placed. The umbilicals 182 will be better understood in association with the descriptions of FIGS. 13b, 23 and 24 below. Work system 10c further includes furniture 22 of the type previously described as well as chairs 50 and computers 52, or other electronic devices as needed.

Figure 8:
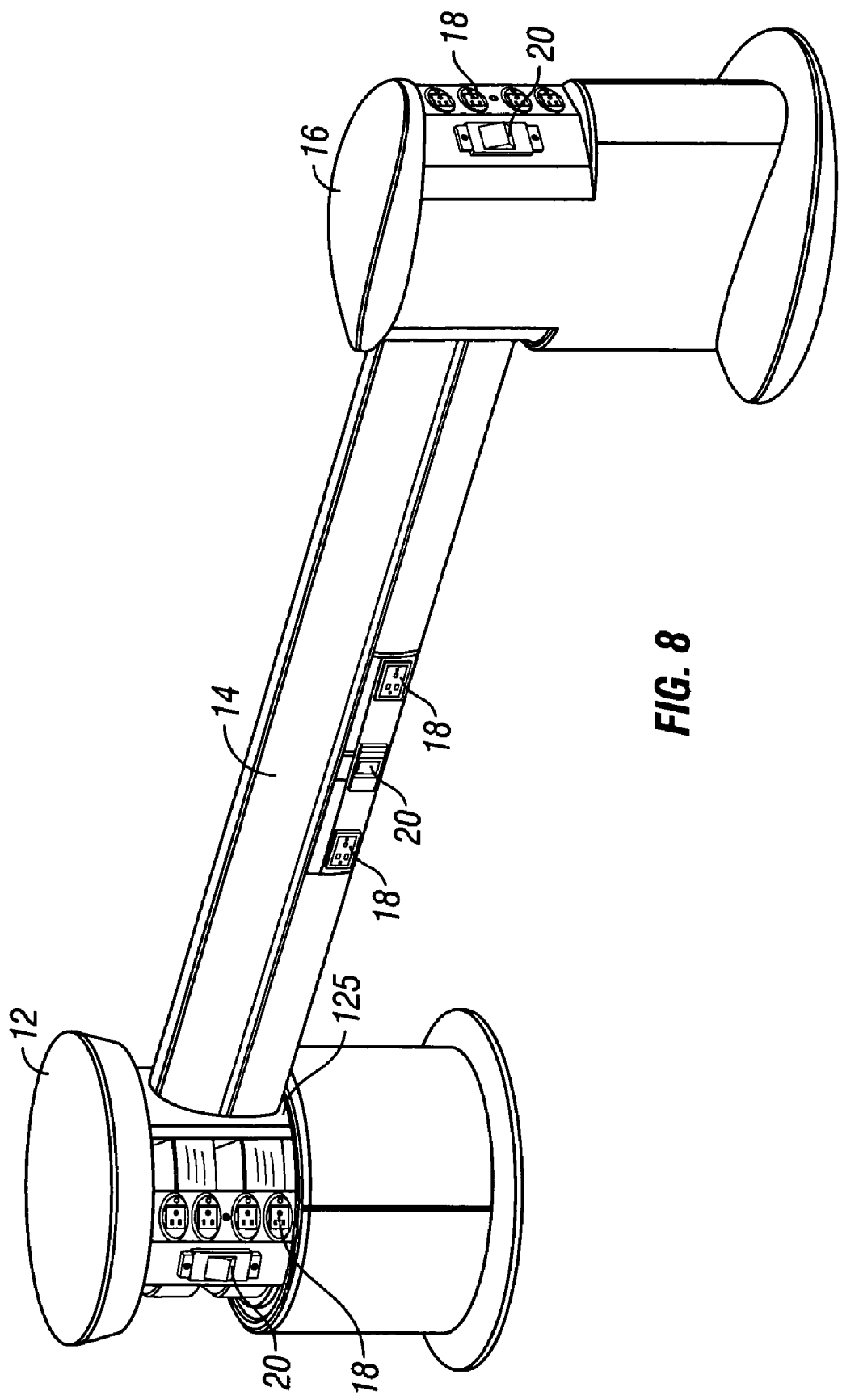
FIG. 8 is a perspective view of an embodiment of a substation, with a support, and a channel in combination.

FIG. 8 shows a substation 12 having data ports 20 and power connections 18. As shown in FIG. 8, and in FIG. 9 and others, substations 12 can provide datajacks 20a, telephone lines 20b and power connectors 18 as well as connections 12a for channels 14 and power feeds. In a preferred embodiment of the present invention, the individual selections of power connectors 18, datajacks 20a and telephone ports 20b, are selectable as desired and the parts can be interchanged so that any number of each or none of a certain type can be included in a duplex 19 of the present invention.

It will be understood by persons having skill in the art that data jacks 20a can include, but are not limited to all types and manner of network and LAN (or local area network) connection means. In the illustrative embodiment, connectors of the type typically used in a LAN are shown, however such means of connection to data and sources, such as the Internet or an Intranet as telephone lines, cable for use with cable modems, T1 and T2 connections, wireless data equipment and others, can be used without departing from the novel scope of the present invention. It will be understood that substations 12 are ideally suited to be nodes for wireless data transmission and can be fitted with appropriate transmitters and other devices that allow for data to be brought to a substation 12 and then permit the substation, with the equipment therein, to act as a broadcast point for wireless data.

As can be seen in various figures the substations 12 can achieve and support a wide range of channels 14 at any angle. In a preferred embodiment, substation 12 is has a round cross-section, which permits the placement of channels at any point along a 360 degree range about the substation. Substation connection ring 12r includes means to permit the connection of a locking member 17 (explained in greater detail herein), which can be connected to a channel 14 or caps, covers or other devices, in any location on ring 12r about the entire circumference of substation 12. This ability permits an infinite range of placements of channels 14 (and other devices) about substation 12 making the substation a hub for the work space transmission system 30. Substation 12 can be connected to a number of channels, each of which in turn, is connected to further supports 16 and even other substations, such that the office space can be configured as desired. Because of the extreme flexibility of the substation 12, it is a key element in the modular system of the present invention, permitting the formation of infinite combinations of elements making the modular system almost infinitely configurable. Further, the use of others of the elements described herein, in combination with the substation, permits configuration, reconfiguration and total flexibility in set-up, construction, packaging and moving of an office designed and built with the present invention.

Substations 12 typically will support a cluster of one or more users. Substations 12 are used as a power entry point and may attach to the floor with a bolt plate 12a. A data ring 12b may be provided on the substation and provide, in one embodiment, up to 12 data jacks and 6 telephone jacks in a data ring 12b. In other embodiments, other data jack and telephone jack configurations may be realized for the data ring 12b. A power ring 12c may provide an attachment point for any combination of channels or power blocks that can fit in a specific diameter of the ring 12b. It will be understood that while a power ring 12c is illustrated in some of the figures, a power junction box, such as the box 12d shown in FIG. 13e (and in other figures) can be substituted by persons having skill in the art without departing from the novel scope of the present invention. The substation 12 can accept power from the ceiling, wall or floor, as will be explained in greater detail below.

A variety of different data and power combinations may be realized for the substations 12. For example, if there is a cluster of three people around a substation 12 there could be three power blocks and nine data jacks on the substation, or if there is a cluster of six people around a substation there could be six power blocks and eighteen data jacks on the substation.

Further, as substations 12 can be easily fitted with any style or type of data, communication and power means, substations 12 will be receptive to new types of data and communication carrier and transmission means that are developed; substations 12 can be easily upgraded to take advantage of new technology as it becomes available. As noted herein, the transmission system 30, which includes substations 12, channels 14 and supports 16 are designed for ease of placement and removal of communication, data and power cables. Therefore, the refitting of the transmission system 30 to accommodate new and improved means for data, communication and power is a novel aspect of the present invention. It will be understood by persons having skill in the art that substation 12 can be fed with power, communications and data cords (or any one or more or combination of two or more) from various locations. For example, in a wood frame building, or building having a built up floor, cables can be fed from below the floor surface, into substation 12. Further, if the substation is placed near a wall, conduits can be fed laterally from the wall to the substation 12 in any unobtrusive manner. The details of a substation 12 are illustrated in further figures, and described in greater detail below.

Substations 12 may also include in another embodiment, power transformers (not shown) that permit electricity step down from outlet power (typically 110 volts.) to laptop computer power (typically 12 volts); as well as power transformers that convert 110 volts to 220 volts (and vice versa) for devices having foreign power requirements. In this manner, offices or, work spaces, constructed in accordance with the present invention can be used by persons or businesses with international clientele or business, accommodating visitors from foreign lands. It will be understood by persons having skill in the art that the substations and other elements of the present invention can be constructed for use with any power system in use and known, using all local power, data and communications equipment and requirements, without departing from the novel scope of the present invention. The present invention can be made to accommodate any type of systems or power sources such that even if the device is used exclusively in the United States it could be manufactured and constructed such that the user, while in the United States, could use equipment from any foreign region as if the user was in that foreign region. For example, a European based system, utilizing European power requirements (typically 220 volts) and European styles power and data plugs (having for example round pins in triangular configuration, or other) can be directly plugged in as if the person was in Paris, rather than New York, without departing from the novel scope of the present invention. It will also be understood, that a system of the present invention, utilizing a different power configuration than that of the United States, can include means to step power down so as to permit the use of the system by persons having US configured equipment, without departing from the novel scope of the present invention. The present invention can be utilized in a foreign country; further such a system could include means to accommodate a visitor using US configured equipment.

Referring to FIG. 10, another embodiment of a substation 112 is shown, in combination with the channel 14 and substation 16 previously noted, and each described in greater detail below. Substation 112 differs from the previously described substation 18 in that it includes a power pole or power entry tower 120. Power pole or power entry tower 120 permits a work station set up that has power, data and communications cables fed from the ceiling to the substation 112 and transmission system 130. It will be understood by persons having skill in the art, and those who design and construct buildings, that modern office buildings are typically built with a concrete surface between office floors. Typically, these building have 10 to 12 foot high ceilings, spanning between concrete surfaces, with drop panels forming the finished ceiling. Between the drop panel and the upper concrete surface building designers place the necessary utilities to make each floor comfortable and utilitarian. For example, the ventilation system, comprising ductwork, lighting and power cables are included in this space. Typically, electricity is fed from the ceiling area down through the walls to access points.

Figure 12:
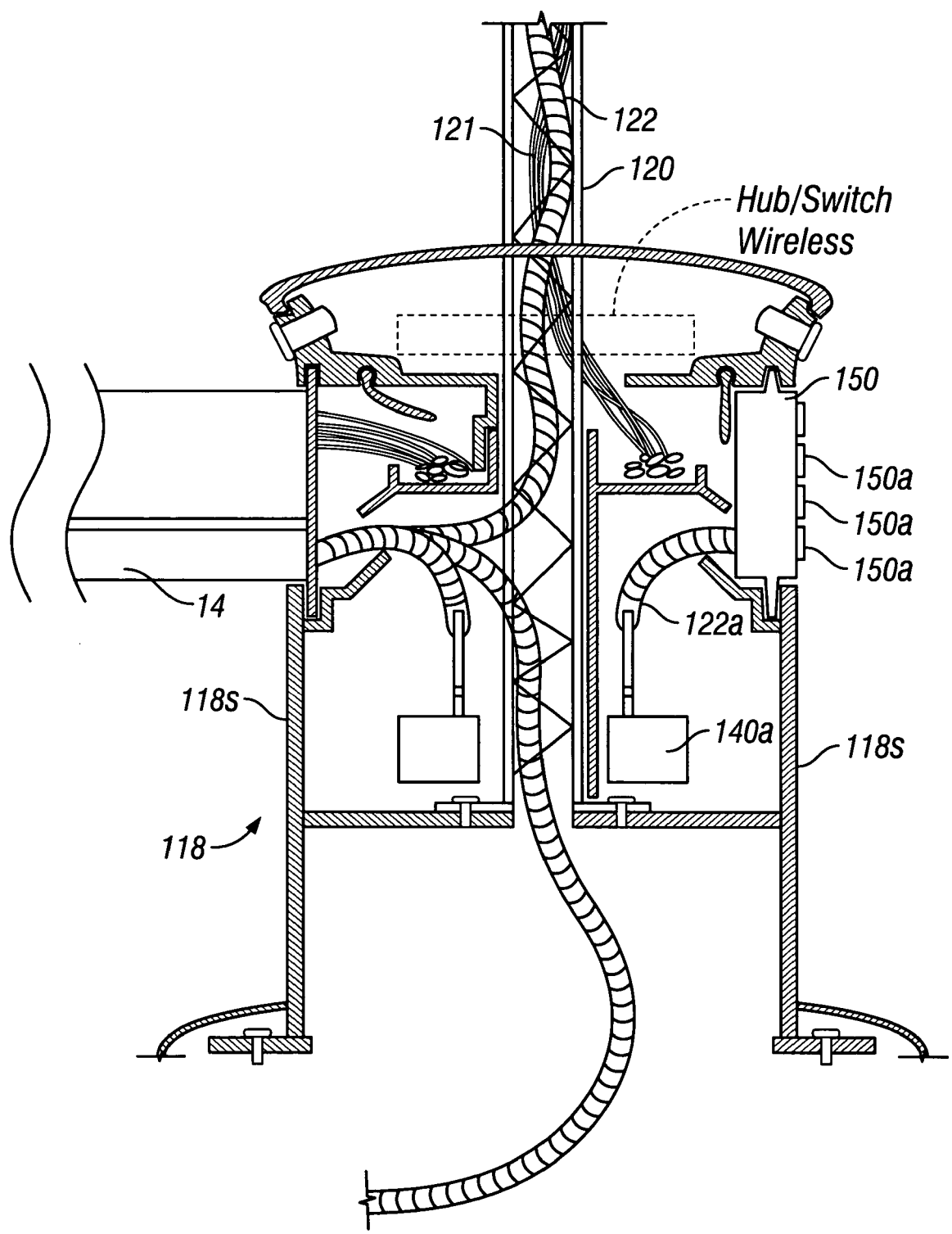
FIG. 12 is a schematic view of one embodiment of a custom connection ring used in a substation of the present invention.

As shown in FIG. 10 and more clearly in FIGS. 11a and 11b and 12, tower substation 112 includes a power pole or power entry tower 120 which spans from the top of substation 112 up to the ceiling (or to any desired height) permitting cables 121 and other conduits 122 to be fed from the ceiling down to transmission system 130. It will be understood by persons having skill in the art that while a power pole or power entry tower 120 is shown as a conduit for power, data and communications, such a tower can be utilized to bring only power or data or communication means or any combination of one or all three, with the others being brought into transmission systems of the present invention through other means (such as through a wall or floor, as described in detail herein).

Figure 12A:
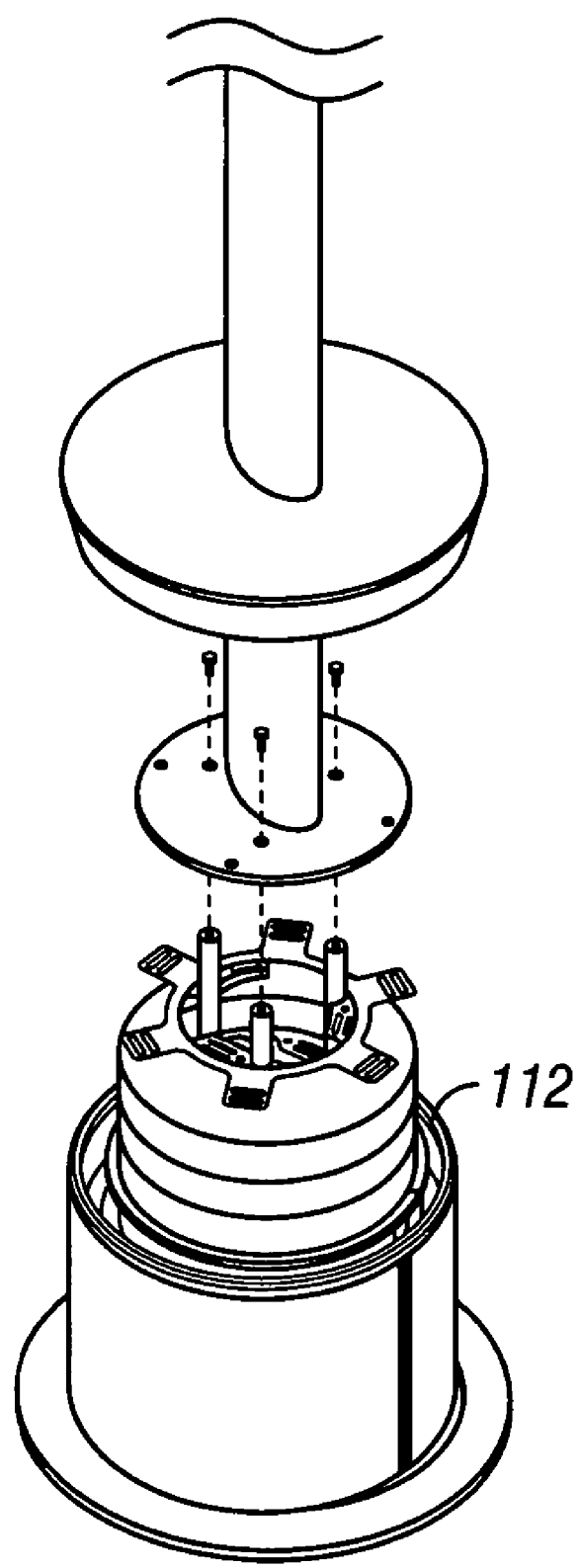
FIG. 12a is an exploded perspective view of one embodiment of a substation of the present invention using a power pole ceiling infeed.

Referring specifically to FIG. 12, it will be seen that one embodiment of a substation 112 is shown cut away to permit a view of the interior of the substation 112. A power pole or power entry tower 120 is included as is a channel 14. FIG. 12a shows, more clearly, the attachment of various accoutrements to substation 112 that permit tower 120 to be used and have an aesthetic and practical appearance. Referring again to FIG. 12, it will be seen that power conduits 122 and cables 121, which are representative of both data and communications cables, come into substation 112 from above through tower 120. Substation 112 is both a point for providing access to power, data and communications and a pass through, via channels 14, umbilicals (not shown) and other means, of power, data and communications means. As shown in FIG. 10 (as well as other figures) substation 112 has a generally cylindrical profile and provides data, communication and power access in any direction, for about 360 degrees of the circumference of its cylindrical body. It will be understood by persons having skill in the art, that substation 112, and the other illustrated substations, can be formed having other cross-sectional shapes and profiles, including elliptical, rectangular, square, and other profiles such as cubic or conical, without departing from the novel scope of the present invention. Further, access to data, communications and power can be secured, in any of these shapes from any available angle, such that a large number of access points are available, without departing from the novel scope of the present invention.

As shown in FIG. 12, substation 112 has a circular cross section such that the data, power and communications ports generally shown as ports 150 in FIG. 10, face any direction and are fed by conduits which are generally perpendicular to the surface 112s of substation 112. As illustrated, conduit 122a provides power to power plugs 150a, while being fed by power transfer point 140a. Power transfer point 140a is, in turn, fed by a conduit (not shown). Power transfer point 140a can be of a type that manages power, such as a step down transformer or a surge protector, prior to providing power through to plugs 150a.

The details of the cables or conduits being fed into substation 112 will be discussed in greater detail below and in association with other figures described below. It will be understood by persons having skill in the art that the present invention is amenable to use of any type of power, data and communications conduits presently available and is easily adaptable to accommodate new and/or improved data, communications and power conduits, without departing from the novel scope of the present invention. It will be clear that the type of conduit used and the ports necessary can all be fitted to the devices of the present invention with little or no modification, without departing from the novel scope of the present invention.

Figure 13B:
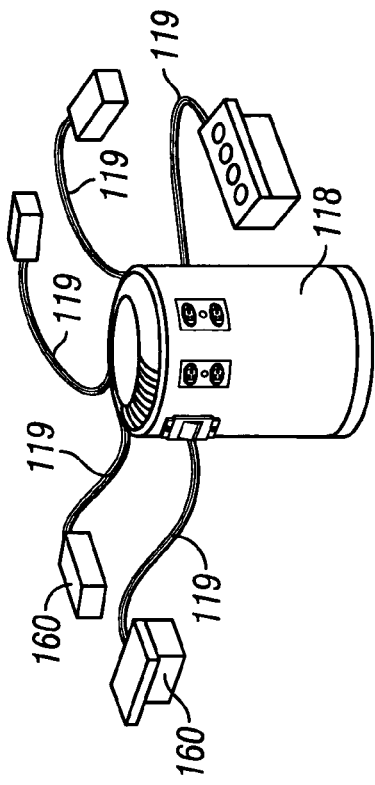
FIG. 13b is a perspective view of one embodiment of a substation of the present invention with umbilicals.
Figure 13A:
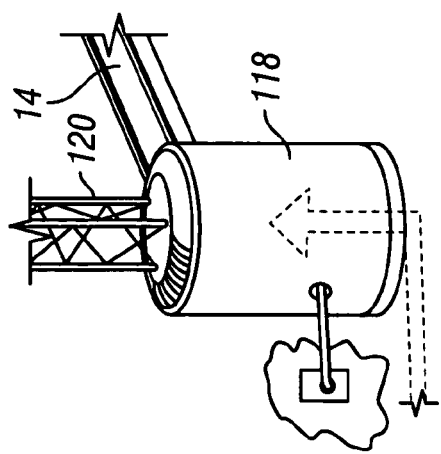
FIG. 13a is a perspective view of one embodiment of a substation of the present invention showing various power entry points.
Figure 13C:
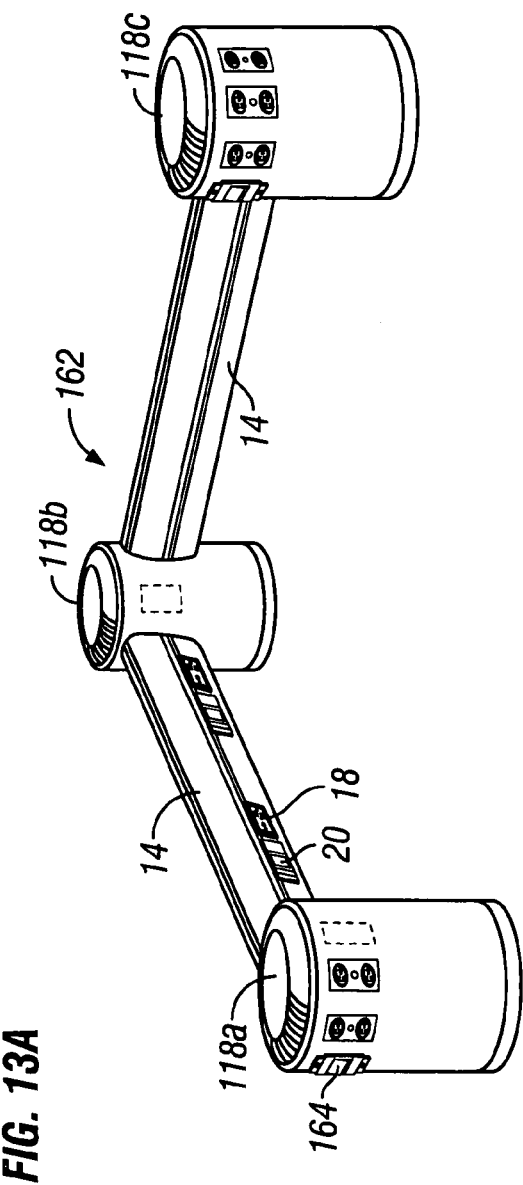
FIG. 13c is a perspective view of one embodiment of a system of a substations of the present.
Figure 13D:
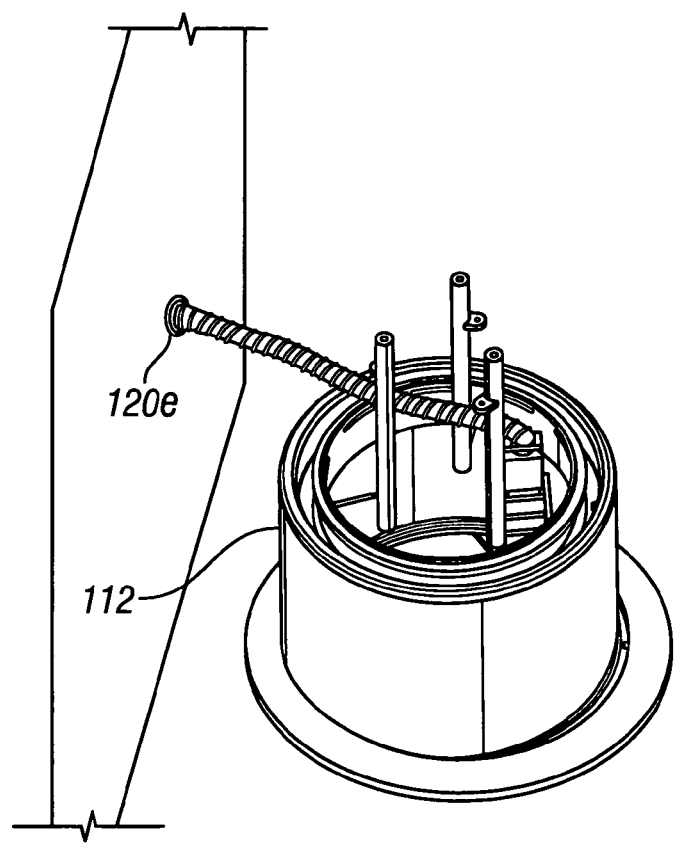
FIG. 13d is a perspective view, partially cut away, of one embodiment of a substation of the present invention, showing power entry.
Figure 13E:
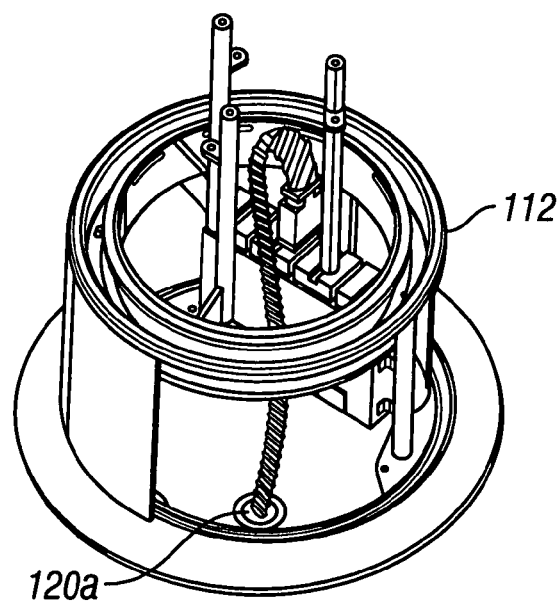
FIG. 13e is a perspective view, partially cut away, of one embodiment of a substation of the present invention, showing power entry.

Referring to FIGS. 13a, 13b and 13c, various configurations of substations 112 of the present invention are shown. In FIG. 13a, a substation 112 is shown with various means of power, data and communications entry. Substation 112 of FIG. 13a is connected to a channel 14 permitting power, data and communications means to be transmitted to work stations throughout the configure device. As illustrated, in FIG. 13a and in FIGS. 13d and 13e, entry in substations 112 can be made from above, utilizing a power pole or power entry tower 120, from below the floor surface 120a and through connection to a wall outlet 120e. In FIG. 13b a substation 112 is shown in a stand-alone configuration. In such a configuration channels and supports are typically not employed and the substation 112 serves as the focal point of the work station setting. Power, data and communication cables 119 are distributed using such items as power pods 160 of various configurations (discussed in greater detail below), and styled, among other names, "parrots" "umbilicals" and "power pods".

FIG. 13c shows the use of substations 112 and channels 14 alone, without supports. It will be understood that any number of substations 112, channels 14 and supports can be used in combination without departing from the novel scope of the present invention. The use in these figures of certain combinations of elements is only made by way of demonstration and is not to be considered a complete listing or illustration of all of the combinations possible. As shown in FIG. 13c, several substations 112, of various types, are assembled together with channels 14 of various types to create a desired transmission system 162 of the work environment. It will be seen that different configurations of substations 112 can be made, such as substation 112a which includes power, data and communication duplexes 164 and is connected to a channel 14 having power, data and communication points (18 and 20). Further, substation 112b which has no duplexes and is connectable to both powered and unpowered channels 14. Substation 112c comprises a number of duplexes 164 and is connected to an unpowered channel 14. It will be understood that an unpowered channel can still be a conduit for power, data and communication transmission means without departing from the novel scope of the present invention.

FIG. 14 shows the connection ring 170 of one embodiment of a substation 112. Connection ring 170 comprises a plurality of connectors 172 that can be easily joined to matable connectors 174 that in turn are connected to, or are part of, various devices. For example, a duplex 164, comprising power plugs 176, are shown attached to a connector 174. Further, a channel 14 can have power, data and/or communications conduits 178 that comprise a connector 174 for mating with a ring connector 172. Further, power, data or communications cables 180 brought into substation 112 can have a mating connector 174 for connection to ring connector 172 in such a manner as to supply substation 112 and a work space system, with data, communications and power. It will be understood, by persons having skill in the art, that other manners of mating power, data and communications conduits and devices to a substation and a work system without departing from the novel scope of the present invention.

Figure 15:
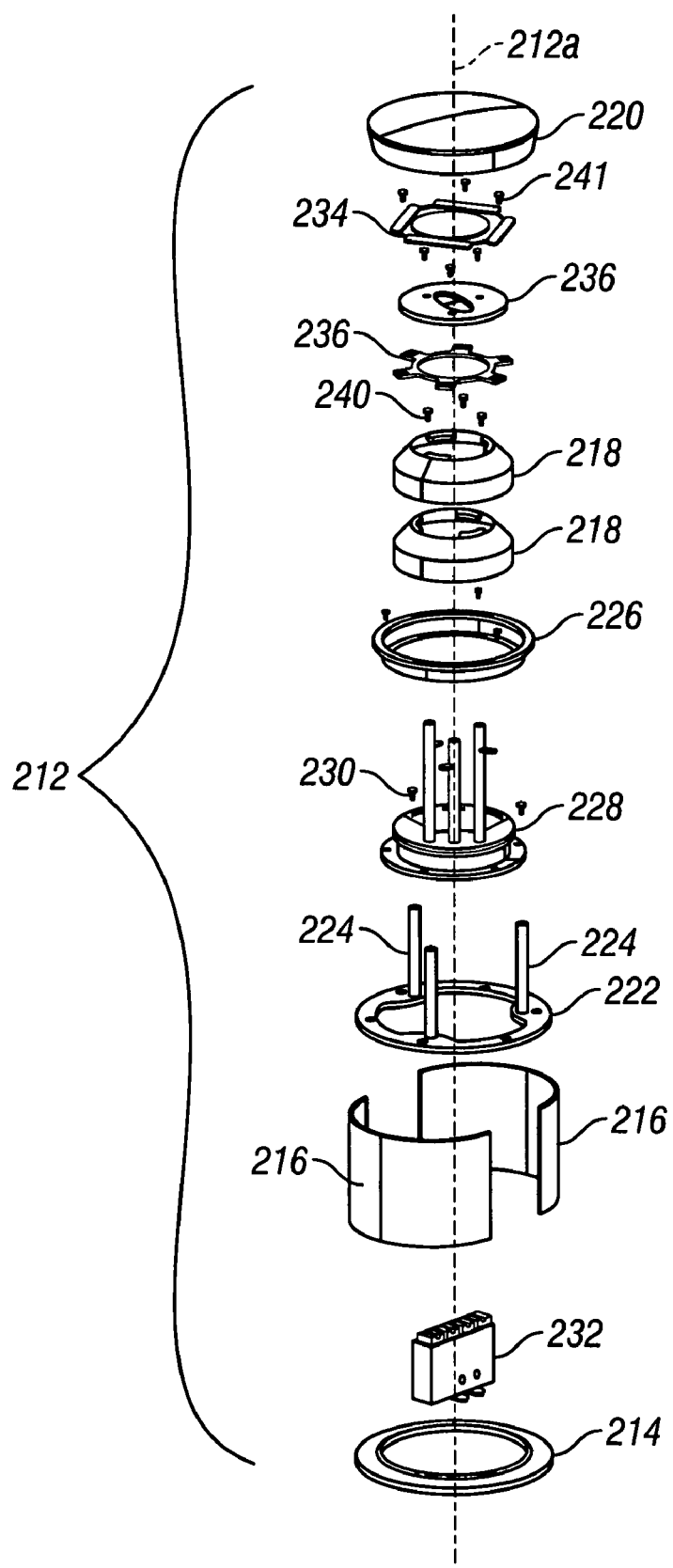
FIG. 15 is an exploded perspective view of one embodiment of a substation of the present invention.

Referring now to FIG. 15, a preferred embodiment of substation 212 is shown in an exploded view. In the present embodiment, substation 212 comprises a floor ring 214 for connection of substation 212 to a surface. It will be understood that substation 212 can be physically connected to the floor in any manner know, including through bolts or other fasteners, specifically configured releasably connective means, adhesives, through use of flooring materials laid over part of ring 214 and in other manners; further substation can be merely placed in location without affixation to a surface. Floor ring 214 further serves, with side covers 216, visual blocker rings 218 and top 220 to provide an aesthetically pleasing look to substation 212 when assembled. In a preferred embodiment, covers 216 are designed to easily slide open to provide access to the interior of the substation 212, in another embodiment covers 216 can be opened but are provided with locking means, of various types known in the art, to allow more limited access to the interior of a substation 212.

A base support structure 222, having columns 224, is provided to a structural connection for the side covers 216 and blocker ring base 226 as well as a second level structural ring 228 and support columns 230. A power junction 232 is provided within structure 222 and below base 228, and serves as a point at which power, data and communications cables can be attached and then dispersed to other areas of the transmission system of an office or work space set up. Various support elements 234, 236 and 238 are provided to join channel assembly points to substation 212. The support elements are attached with screws 240 allowing quick assembly and disassembly of the substation 212 and subsequently, the work station environment.

One philosophy associated with the system 10 of the present invention is that the work space is aesthetically pleasing while being functional. To achieve this goal, work station 212 provides means to establish connections to required systems while hiding all elements that are overtly functional. To this end, for example, visual blocker rings 218 are provided to hide the interior space of substation 212 from exterior view while providing a surface onto which a power and data elements can be removably attached and easily rotated about the axis 212a of substation 212. Further, top 220 is provided to give a finished appearance to substation 212 while providing cover to the interior elements of substation 212; further, in other embodiments, top 212 provides an entry point for power, data and communications fed from above as well as a means to attach a table top (FIG. 33b) or a screen or lamp fixture.

Figure 16:
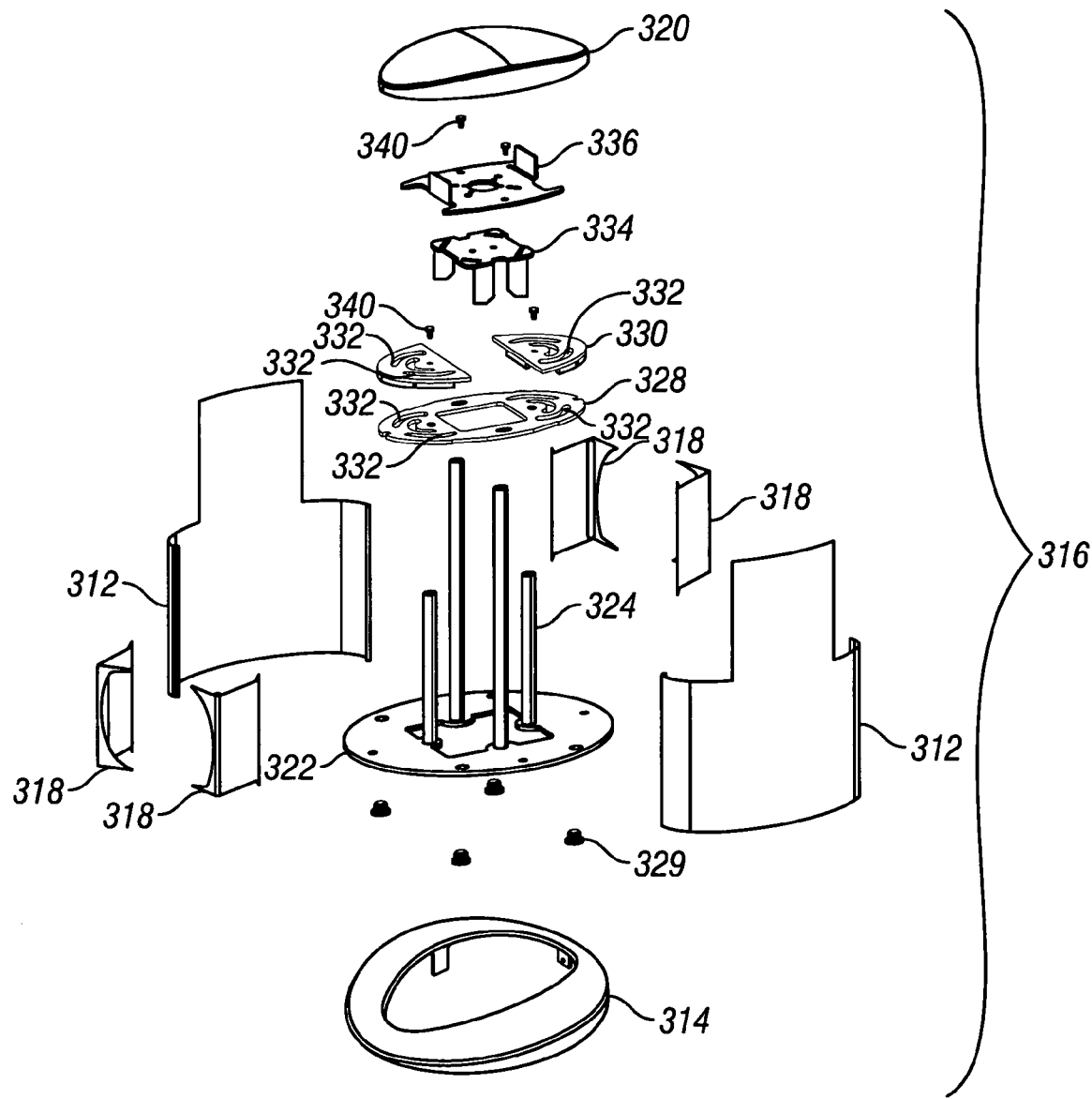
FIG. 16 is an exploded perspective view of one embodiment of a support of the present invention.

FIG. 16 shows an exploded view of a support 316 of the present invention. It will be seen that support 316 has a similar structure to substation 212, including a floor ring 314 for connection of support 316 to a surface. It will be understood that support 316 can be physically connected to the floor in any manner know, including through bolts or other fasteners, specifically configured releasably connective means, adhesives, through use of flooring materials laid over part of ring 314 and in other manners; further support 316 can be merely placed in location without affixation to a surface. Floor ring 314 further serves, with side covers 312, visual blocker panels 318 and top 320 to provide an aesthetically pleasing look to support 316 when assembled. A base support structure 322, having columns 324 and feet 325, are provided to create a structure for support 316. A mid level support floor 328 and a secondary position supports 330, for use with support lock members 17, are provided, attached to support 316 though columns 324. It will be seen that mid level support 328 and secondary position supports 330 each define arc paths 332 into which support lock members 17 can be placed to allow for the rotation of channels 14 as discussed herein. Various support elements 334 and 336 are provided to complete the joining of channel assembly points to support 316. The support elements are attached with screws 340 allowing quick assembly and disassembly of the support 316 and subsequently, the work station environment.

Figure 17:
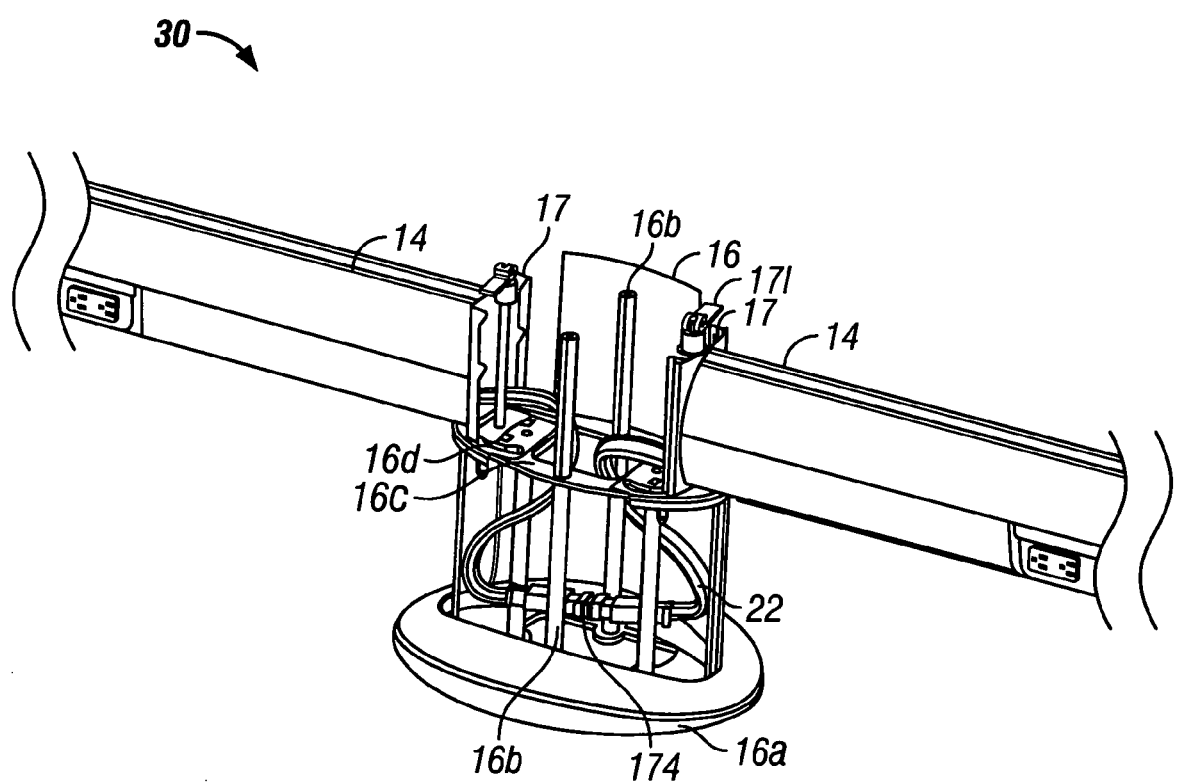
FIG. 17 is a perspective view, partially cut away, of a support of the present invention connected to two channels of the present invention.
Figure 18A:
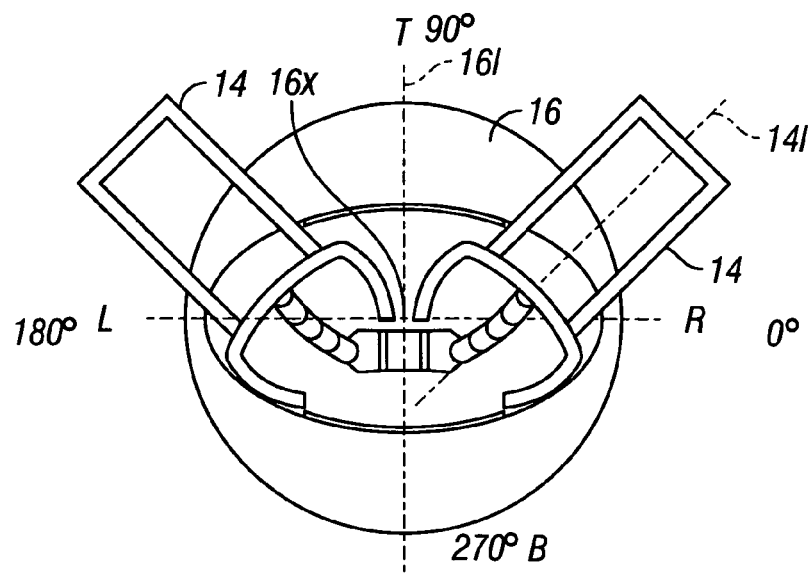
FIG. 18a is a schematic view of one of the various angles that can be achieved with the supports and channels of the present invention.
Figure 18B:
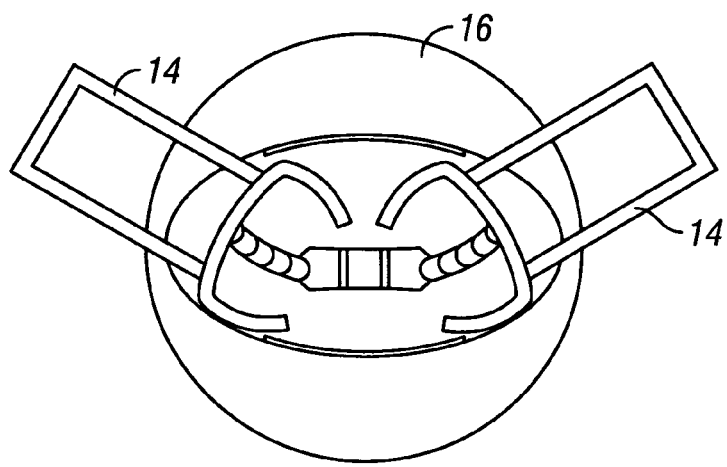
FIG. 18b is another schematic view of another one of the various angles that can be achieved with the supports and channels of the present invention.
Figure 18C:
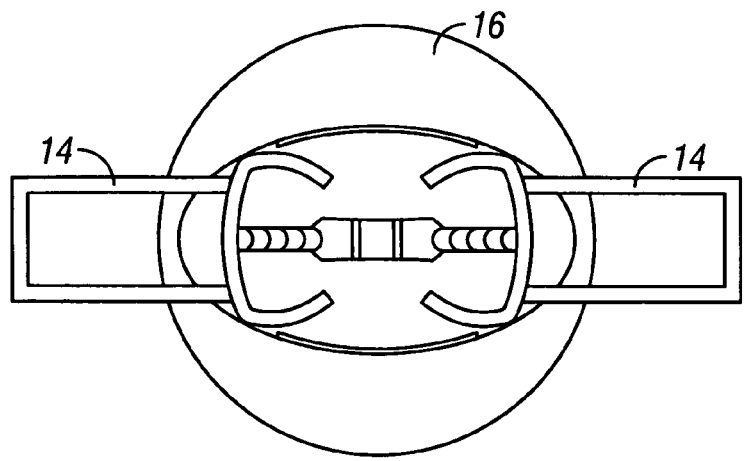
FIG. 18c is a further schematic view of another one of the various angles that can be achieved with the supports and channels of the present invention.
Figure 19:
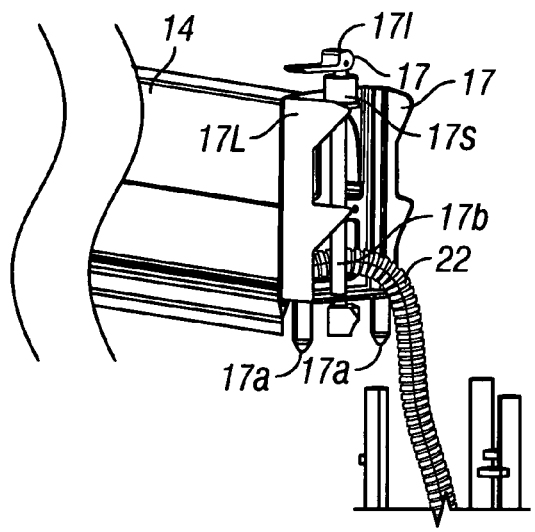
FIG. 19 is a partial perspective view of one channel connection device of the present invention.

Referring now to FIGS. 17, 18 and 19, a support 16, shown in FIG. 2 and described above, is shown in detail. It will be seen that supports 16 are used to permit channels 14 to span from a first location, typically a substation 12, throughout an entire office or work space so that power, data and communications means can be conducted from one end of an office or work space to another. Supports 16 provide both the means to carry the channels 14 (and concomitantly all that the channels carry therein) and a means, as will be discussed in detail, to cause the channels 14 to be directed in desired directions to form desirable work spaces.

FIG. 17 shows a support 16 used in conjunction with two channels 14. It will be seen, and shown in greater detail below, that supports 16 can direct the transmission system 130a of an office or work space in almost an infinite number of directions. As more clearly shown in FIGS. 18a, 18b and 18c, channels 14 are attached onto support 16 in such a manner as to allow them to swivel to desired positions and then lock into place. It will be understood that those figures and this description are meant only as an illustration and should not be considered a limitation on the novel scope of the present invention. In this manner any combination of channel placements can be accomplished at any combinations of desired angles. FIGS. 18a, 18b and 18c show various degrees of rotation of one channel 14 with respect to another with a support 16 therebetween. It will be understood that with this degree of rotation, one channel 14, feeding into a support can have the channel 14 fed from the support 16 in such a manner as to have a large amount of rotation, such that almost any configuration of office space, from perfectly rectilinear to curvilinear can be accomplished.

Figure 20A:
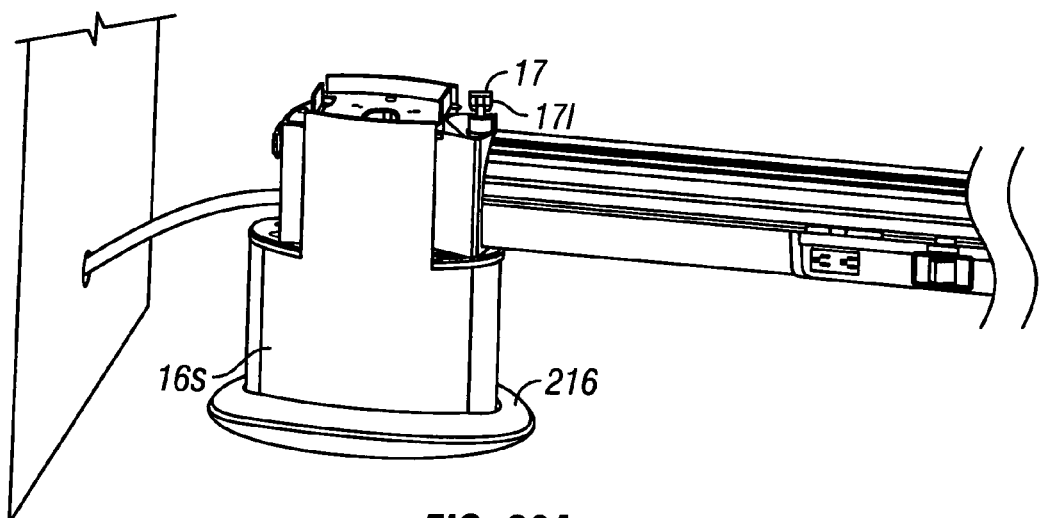
FIG. 20a is a partial perspective view of one embodiment of a support of the present invention as it is being assembled to a channel.
Figure 20B:
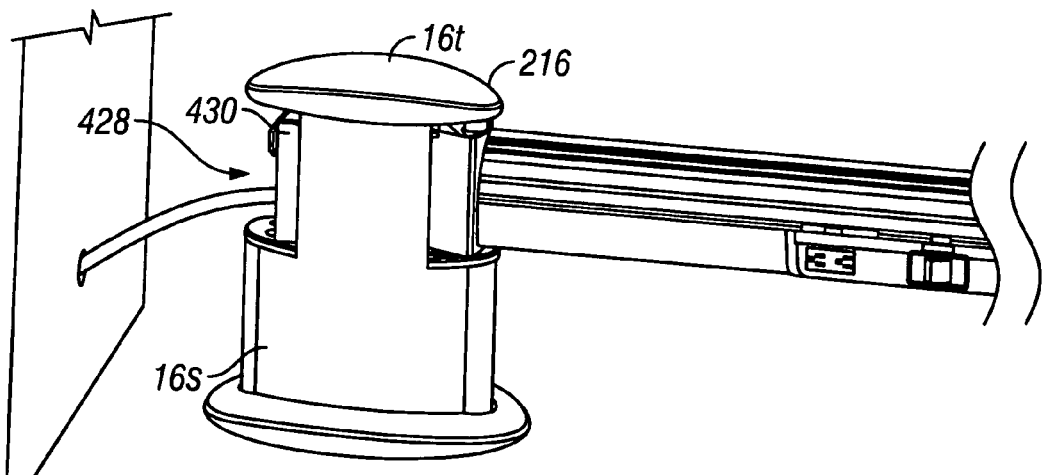
FIG. 20b is a partial perspective view of the support and channel of FIG. 20a assembled.
Figure 20C:
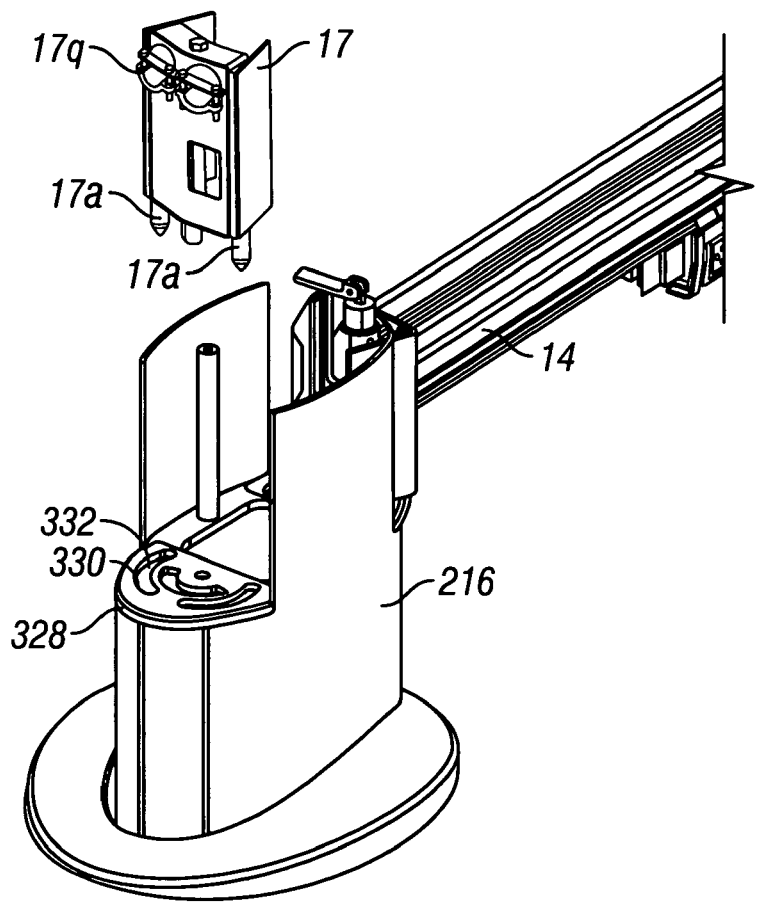
FIG. 20c is an exploded partial perspective view of a support with a wall infeed cover plate.
Figure 20D:
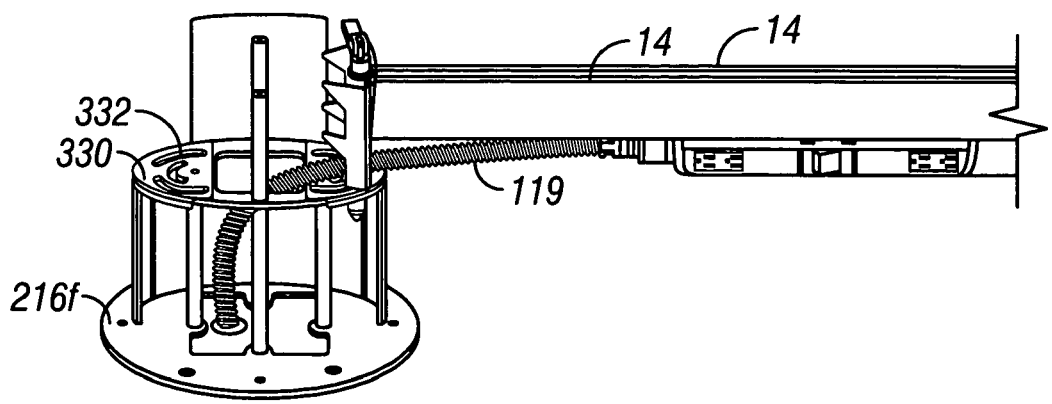
FIG. 20d is a partial perspective view of a support showing an alternative power feed.

Referring to FIGS. 18a-18c and FIGS. 20c and 20d, it will be seen that when a channel is combined with locking connector 17, of any of the types shown in the figures or described herein, and then attached to a substation 12 or support 16, such as support 216 shown in FIGS. 20c and 20d, almost any combination of angles of channels in relation to support or substation, can be created. This forms a seminal part of the present invention, as by using such channels, supports and substations, the user can form any desired shape of office or work station. Channel 14, in place on support 16, using locking connector 17 can swivel using legs 17a inside arcs 332 of plate 330 of support 216 (see FIG. 20c), through a large arc of angles. Further, there are no set positions in which the channel is locked, instead it swivels to the desired position and then can be locked, using locking means 17L, to hold it at the desired angle until a change is needed, required or wanted.

Referring to FIG. 18a, for clarity the figure has been divided into four regions T for top, B for bottom, L for left and R for right. Using a 360 degree circle, it will be seen that longitudinal axis 14L of channel 14 and the plane 16L of the axis of support 16 is initially, at its extreme reach of movement, forming an angle of approximately 45 degrees on the 360 degree circle. Channel 14, on the right side R, can be swung oppositely to an extreme angle of 315 degrees; for a range of 90 degrees. Further, the channel on the left side L can swing in a similar range. As shown in FIG. 18a, the channels 14 together, in the position shown in the figure, create an angel of approximately 90 degrees, allowing the formation of a right angle in the transmission system 130. FIG. 18b shows the channels each forming an intermediate angle with the axis of support 16l, together forming an obtuse angle; FIG. 18c shows the channels 14 forming together an approximately 180 degree angle.

It will be understood that while FIGS. 18a and 18b show movement in the top region T, support 16 permits the movement of either or both channels a similar range to the bottom B. Although not shown, it will be understood, in one example, that the channel shown on the right side R, can be swung to the extreme at an angle of approximately 315 degrees (on the 360 degree circle) while the channel on the left side L remains in position at approximately 135 degrees, forming approximately a 180 degree line of channels 14. The left side L channel 14 can, if desired, then be moved to an angle of approximately 150 degrees such that the channels form a bend of approximately 195 degrees; dropping the left channel to an angle of approximately 225 degrees, makes a channel bend of approximately 270 degrees. It will also be understood, thereby, that a support of the present invention, utilizing a connection member 17, can change the direction of a transmission system by an infinite number of angels between approximately 315 degrees to 225 degrees along a 360 degree circle, that is about some 270 degrees of change; at any desired angle with no set stops on the arc. Again, this description and the drawings associated therewith are meant only as an illustrative embodiment and not as a limitation. Persons having skill in the art will understand that slight modifications of the illustrative embodiment can lead to channel angles having a greater range than those illustrated, all of which is encompassed in the novel scope of the present invention.

While angles divisible by 5 have been named in the above examples, it will be understood by persons having skill in the art that any angle, or fraction thereof, can be used without departing from the novel scope of the present invention. For example, FIG. 18b could be showing angles of channels such as 41.5 degrees on the right side R and 127.3 degrees on the left side L, for an angle between channels of approximately 85.8 degrees. In the present invention the channels can enter or depart from (feed or fed from) substations or supports at almost any desired angle to create a work space of almost any desired shape.

The present invention permits a change of channel direction, from support to support (or substation to support, or substation to substation) in such a manner as to allow an almost curvilinear shape of the transmission system 30, permitting the user to take best advantage of the space provided and use the space to its greatest advantage. The ability of the channels to swivel to almost any angle, while keeping power, data and communications devices in electrical and communicative connection, permits the user to redesign or continuously modify the work station set up, until the desired station is developed, and then modify the work station as needed in future modifications, all without disconnecting power, data and communications cables or equipment. In this manner the system of the present invention is almost completely, continuously and easily modifiable as desired.

Referring again to FIG. 17, the interior structure of support 16 is shown. Support 16 comprises a base 16a, which can either be attached to a floor surface or which can stand without attachment, as desired, is provided having structural support elements 16b and a mid plate 16c. Mid plate 16c is designed to support lock members 17 which form the basis of attachment of channels 14 to either supports 16, as shown, or to substations 12. Lock members 17, as shown in FIG. 15a, comprises engagement legs 17a which engage elongated slots 16d in mid plate 16c (FIG. 17). The engagement of legs 17a within slots 16d permits each lock member 17 to turn through an angle of 90 degrees at each end of support 16. The combination of two channels 14 each being able to swivel independent of the other through 90 degrees permits support 16 to change the directions of a transmission system 30 in almost infinite directions.

FIG. 17 further shows the feed of a cable 190 from a first channel 14 to a second channel 14, using a connector 174 to engage cables 190 together. Cables 190 are joined together, provided with sufficient slack to permit connections to remain in tact in case of accidental movements of transmission system 30, and allowed to rest in the base of support 16. It will be seen that the present invention permits the connection of cables 190 with no need to feed the ends of the cables through structure. In this manner, the rearranging of a work space can be accomplished quickly and easily without disassembly of the cables 190 or fishing the cables free from support or structural elements.

As shown in FIG. 19 support lock members 17 include means for engaging a channel 14 and locking means 17l to lock a channel 14 in a desirable position on support 16. Locking means 17l is a spring loaded cam lever, which is a first position allows channel 14 to be swiveled to a desired position, and when flipped 180 degrees, pressed lock member 17 into mid plate 16c locking channel 14 in a desired position. Subsequent movements of channel 14 can be effected by unlocking locking means 17l, moving the channel to the newly desired location, and re-locking locking means 17*l*. It will be understood that support lock member is interchangeably lockable onto substation 12 such that a channel 14 can be removed from a substation 12 and immediately attached to a support 14, or vice-a-versa, without any adjustment or modification. It will be seen (FIG. 23) that in the use of spring loaded cam lever 17*l*, a coil spring 17*c* is placed on the upper portion of bolt 17*b*, such that when lever 17*l* is flipped from one side to the other, the action of spring 17*l* causes bolt 17*b* to alternatively push into locked position and open to unlock position. This allows ease of connection, disconnection and rearrangement of component parts of the transmission system. It will be understood by persons having skill in the art that other means of locking and, other types of springs, can be utilized without departing from the novel course of the present invention.

Referring to FIGS. 20*a*, 20*b*, 20*c* and 20*d* support 16 is shown in a further embodiment. In the embodiment of FIG. 20*a* and FIG. 20*b*, support 16 is shown in a wall infeed position. It will be understood that support 16 can be used to secure power, data and communications means for a transmission system 30, particularly in the absence of a substation (such as substation 12). In the present embodiment, support 16 is shown being fed from a wall outlet; it will be understood that support 16 can also be fed through a floor feed and in any other means necessary to secure such feed and conduct the means throughout the transmission system used. As shown in FIG. 20*b*, support 16 is provided with a decorative skin 16*s* and a decorative (and generally functional) top 16*t*. Skin 16*s* and top 16*t* provide an aesthetic appearance to support 16 and means for protecting the interior of support 16, while giving transmission system 30 a finished and aesthetic appearance.

FIG. 20*a* shows channel connector assembly 17 in place, attached to a channel 14 on one end and a wall infeed cover plate 17*a* on the other end. FIG. 20*c* shows such a connector apart from support 216 in the process of being attached, so as to allow views of the various parts thereof. The cable connection means of lock member 17 can be an opening in lock member 17, feeding a cable directly through support 16 and connecting directly to power connection means in channel 14, or can include a connector 174, to which a secondary cable is used to feed to connection means in channel 14, in a more sophisticated embodiment. Channel connector assembly 17 is shown on support 16, with lock lever 17*l* in a locked position.

In one form, a support 16 links a channel 14 to another channel 14. A support 16 may also provide a location to accept a power feed. In one embodiment, a support 16 may terminate a channel run and provide a quadruple duplex box. Supports 14 provide an attachment point for accessories and allow for plus or minus ninety degree bends. Supports 16 can accept power in feed from a wall, floor or ceiling. In another embodiment, supports 16 can have a double joint that allows for a non-linear conditions. When a channel 14 is connected to a support 16, a support 16 can provide for a variety of different angle configurations for the channels 14 with respect to the supports 16. FIG. 20*d* shows the connection of a floor feed support 216*f* and the manner in which cables 119 are fed there through to a channel 14. It will be noted that the type of connector 17 used with a substation 12 is in use with support 216*f*; it will be understood that such substitutions can be made, to facilitate changes in an office set-up, without departing from the novel scope of the present invention. Such substitutions permit rapid changes without having to delay in order to purchase the more appropriate connection member (as shown in FIG. 20*a*).

Figure 21:
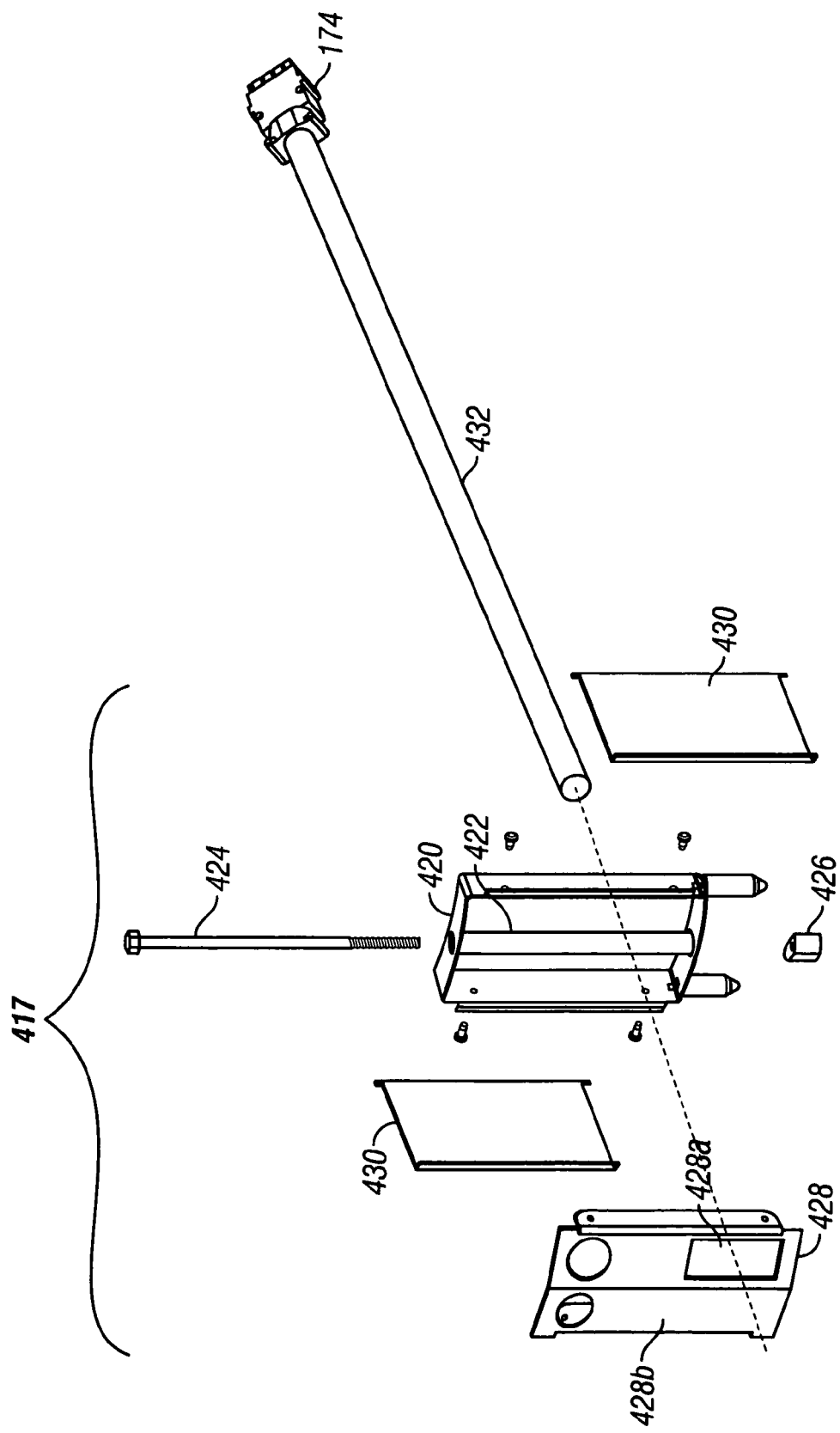
FIG. 21 is an exploded perspective view of a one embodiment of a lock member assembly of the present invention.
Figure 22:
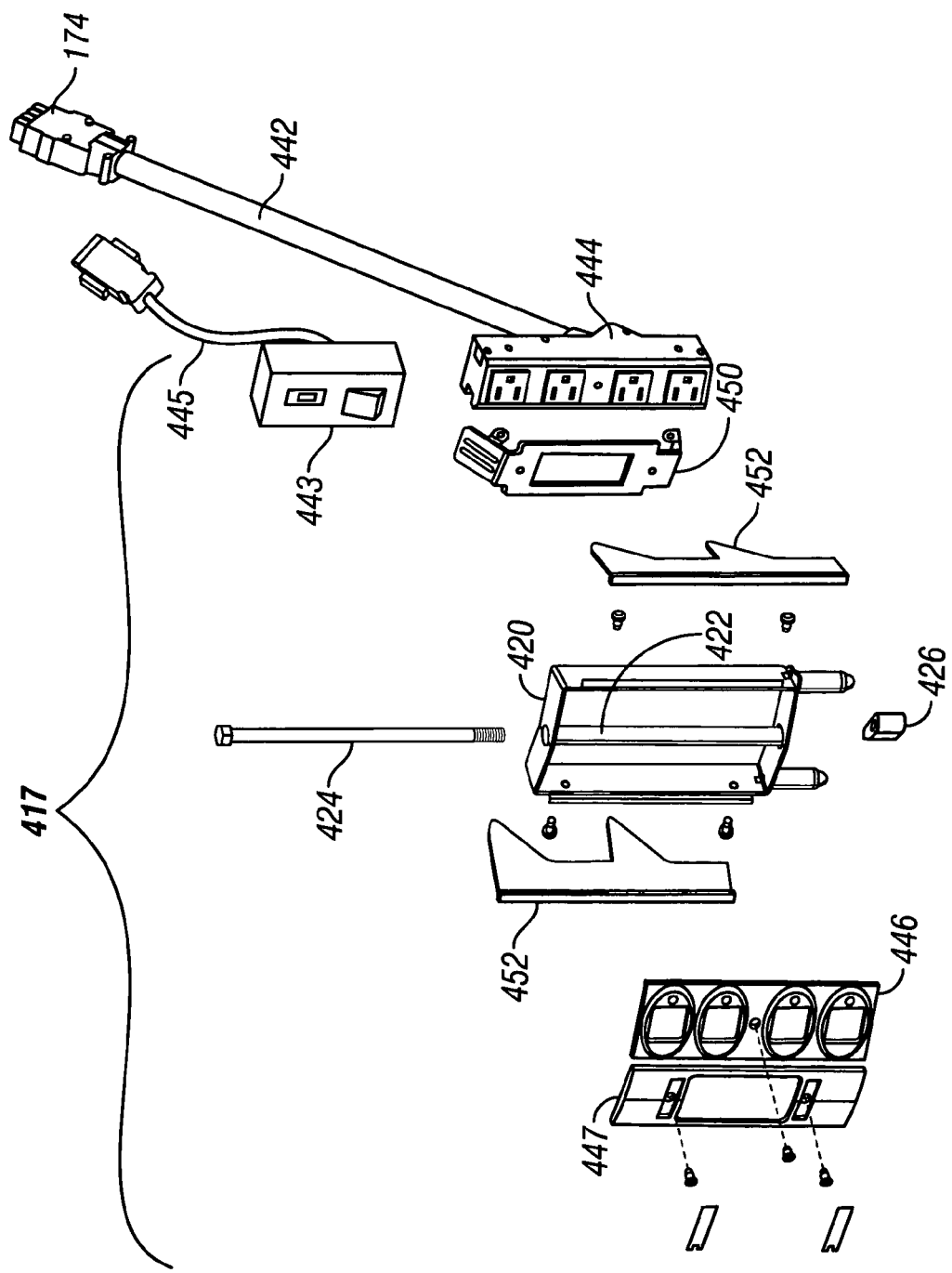
FIG. 22 is an exploded perspective view of another embodiment of a lock member assembly of the present invention.

Referring now to FIGS. 21 and 22 two types of connection assemblies 417 are shown in exploded views. For clarity, connection assemblies 417 shown in FIGS. 21 and 22 are being labeled "417", it will be understood however, that connection assemblies 417 are similar in type and construction to those previously shown and labeled "17". Further, it will be understood by persons having skill in the art that while this type of connection assembly 417 is a preferred embodiment, different manners and methods of connecting channels 14 to other components of the present invention can be used without departing from the novel scope of the present invention. Assembly 417 is comprised of a rigid frame 420 divided, in a lateral direction, by a bolt housing 422. A bolt 424 is inserted through housing 422 and assembled with a nut 426 when assembly 417 is attached to a substation or support. Assembly 417 further comprises a face plate 428 having cable entry points 428*a* and a basic cover 428*b* and visual blocker panels 430. The assembly 417 of FIGS. 21 and 22 are of the type that are generally attached to support or substation and comprise termini therefore. In such situations, one of the locations on a support or a substation is not to be attached to a channel and forms the terminus of that part of the transmission system. In FIG. 21, assembly 417 represents a point at which power, data and communications cables 432 (or other means) may brought into a system from, for example, wall outlets. It will be seen in FIG. 20 that the type of visual blocker panels are for use in association with a support 16, however, substitution of visual blocker panels 452, shown in FIG. 22 and explained below, can be made such that assembly 417 can be fitted to a substation 12.

Referring to FIG. 22, assembly 417 is of a type having outlets for power, data and communications. As shown, a power distribution cable 442, having means to connect within a substation 12, such as a matable connector 174 is provided at one end of cable 442, while power outlets 444 are provided at the other end. Data and communications means 445 are also provided. Further a power face plate 446 and data/communication face plate 447, having appropriate port configurations is provided for attachment to frame 420. In the illustrative example, both power outlets 444 and data and communications ports 443 are provided. It will be understood that any combination or single use of power, data and communications ports and covers, can be made, as desired, without departing from the novel scope of the present invention. The assembly of FIG. 22 is additional provided with visual blocker panels 452, which provide a means for rotation about the substation 12 (as explained herein).

Channel 14, while shown and described above, is shown in greater detail in FIGS. 23 though 25. As noted, the association of channels 14 with substations 12 and supports 16 having been previously explained, it will be understood that a channel 14 can be made as either powered or non-powered version. In the prior art, a straight run of cable is typically protected by a reinforced sheath, a analogous device to the channel 14 of the present invention. Typically the sheaths of the prior art are placed either on the floor or against walls; when placed on floors such sheaths generally include perpendicularly placed cross-members to support the sheath in an upright position; it will be understood that no analogous cross-member structure is need in the present invention. A straight run of channels 14 do not need another channel, at 90 degrees, attached to the run for stability. In one embodiment, the channels 14 are about 15 inches off, suspended by substations 12 or supports 14 (or a combination of both) of the floor, such that a vacuum cleaner, or other cleaning implements, can clean beneath the channel, to avoid flooding concerns, and such that the channels 14 are sufficiently high off of the floor so as not be a trip hazard.

In the channels 14 of the present invention, significant novel differences have been created in comparison with the prior art. Because the channels 14 of the present invention are suspended between substations 12 and supports 16 (or any combination or permutations of both) they can comprise an elongated thin tubular shell 14s. Tubular shell 14s, in one embodiment, includes an elongated uninterrupted structural element 14t, which provides structural support for the entire channel and onto which all other parts of the channel 14 are connected. Channel 14 includes an external protective cover 14u that is attachable to conduit 14t and lower conduit carriers 14v, which are included for attachment to structural element 14t; lower conduit carriers 14v are designed to cover power cables 119 (having connectors 174, for connection within substations and supports) for aesthetic and protective purposes. Further, power outlets, or duplexes 164, and various systems to present power to a user through a cable are shown in-various depictions of channels 14, including FIG. 24. As can be seen, the lower conduit carries 14v, in association with the power systems present a finished appearance for the user. In a preferred embodiment, the various parts of channel 14 are extruded to the desired shapes and are created of such materials as aluminum, steel, other lightweight metals and plastics, including translucent and transparent plastics, used particularly on protective covers 14u.

Figure 23:
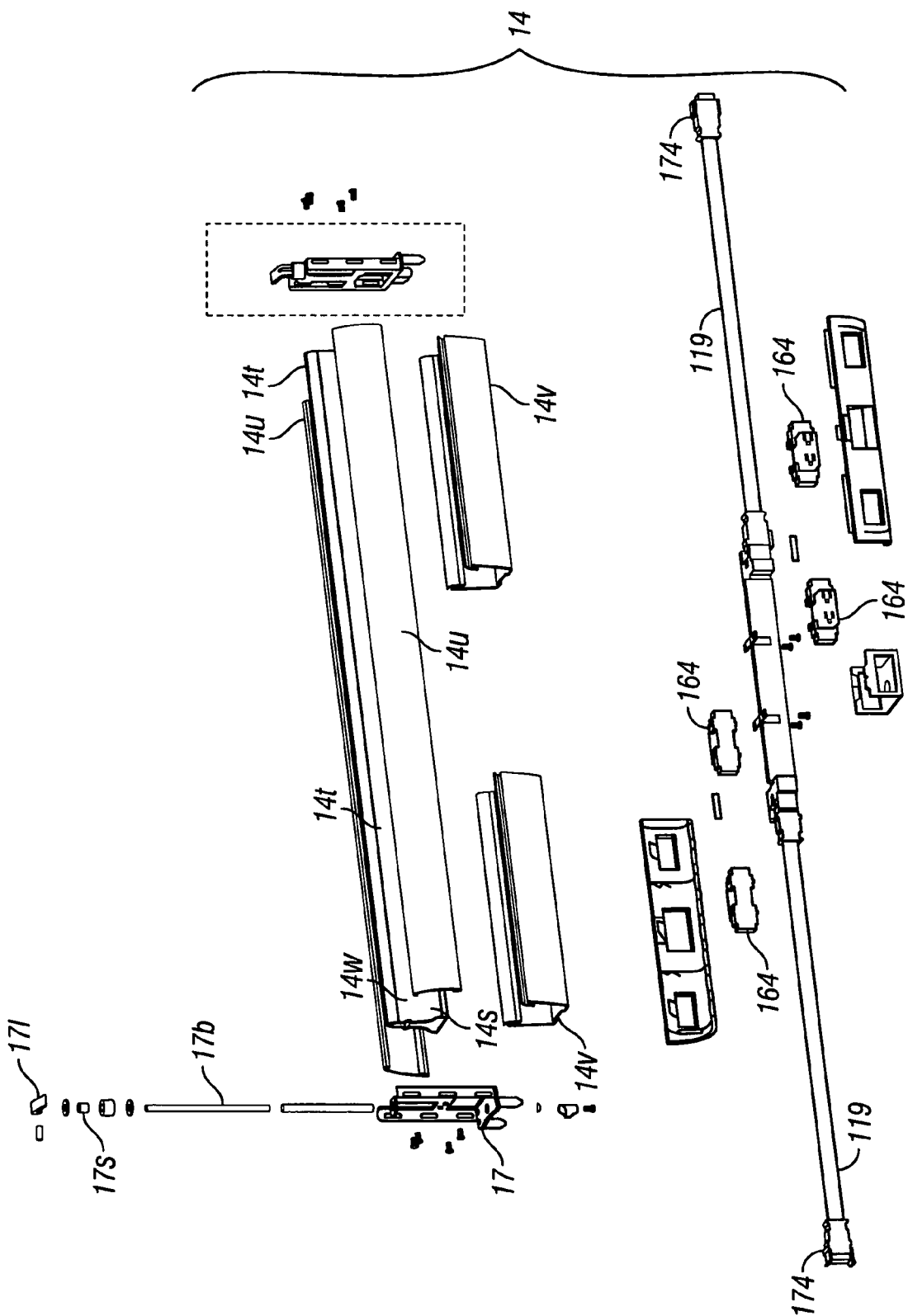
FIG. 23 is an exploded perspective view of one embodiment of a channel of the present invention.

Data and communications cables can be laid within the spaces between structural element 14t and covers 14u such that the data and communications cables span between supports 16 and or supports 16 and substations 12. As the space between the covers 14u and structural element 14t is uninterrupted, the cables can be dropped into channel 14 without having to feed the cables through openings, such as in conduits of the prior art. It will be understood that channels 14 are of sufficient size and character that any number of telephone lines and data line can be placed within conduit 14t to accommodate offices or work spaces, large or small. As shown, power cables 119 are placed within conduit carriers 14v. It will be understood that various modifications can be made to accommodate local codes and/or standards without departing from the novel scope of the present invention. For example, FIGS. 23e and 23f are illustrations of a particular design as required in the city of Chicago, Ill. It will be seen that separate conduit boxes 15 are required for power outlets 15a and for data ports 15b. In the "Chicago" version of the present invention, an installer would install the power and data ports within the conduits and then attach the power or data cables prior to installing the conduit carriers 15v.

Figure 23A:
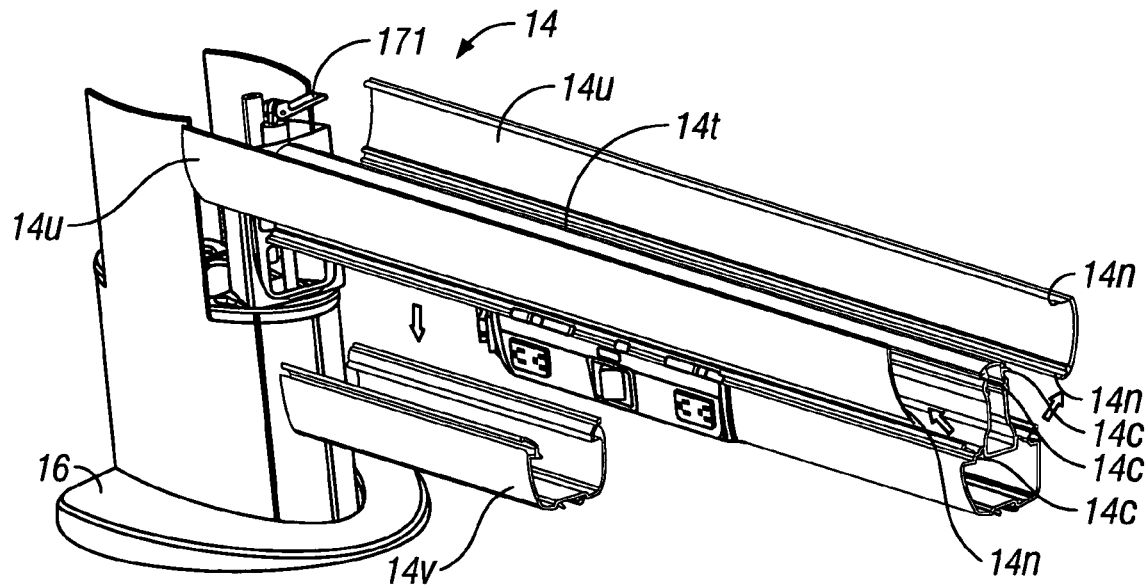
FIG. 23a is an exploded perspective view of one embodiment of a channel of the present invention showing disassembly.
Figure 23B:
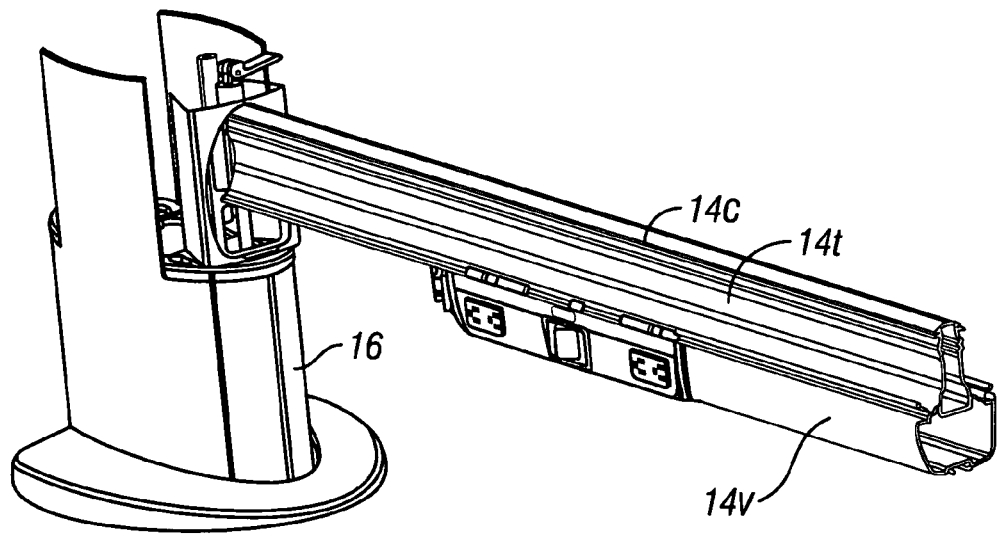
FIG. 23b is a perspective view of one embodiment of a channel of the present invention in a disassembled state.
Figure 23C:
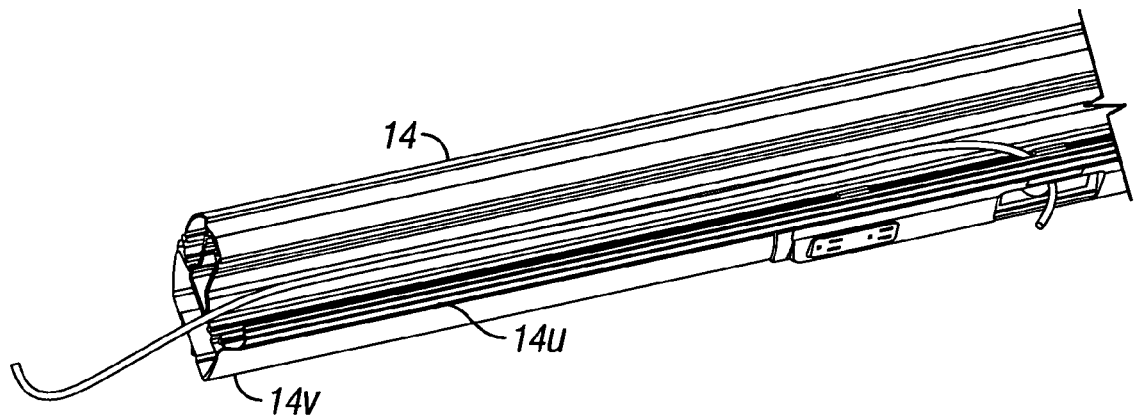
FIG. 23c is a perspective view of one embodiment of a channel of the present invention with a panel pivoted open.
Figure 23D:
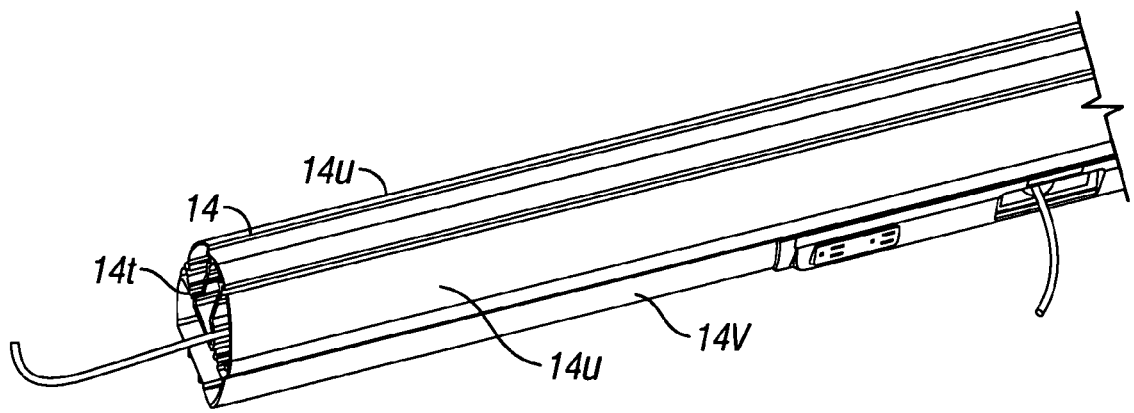
FIG. 23d is a perspective view of the channel of FIG. 23c with the panel closed.
Figure 23E:
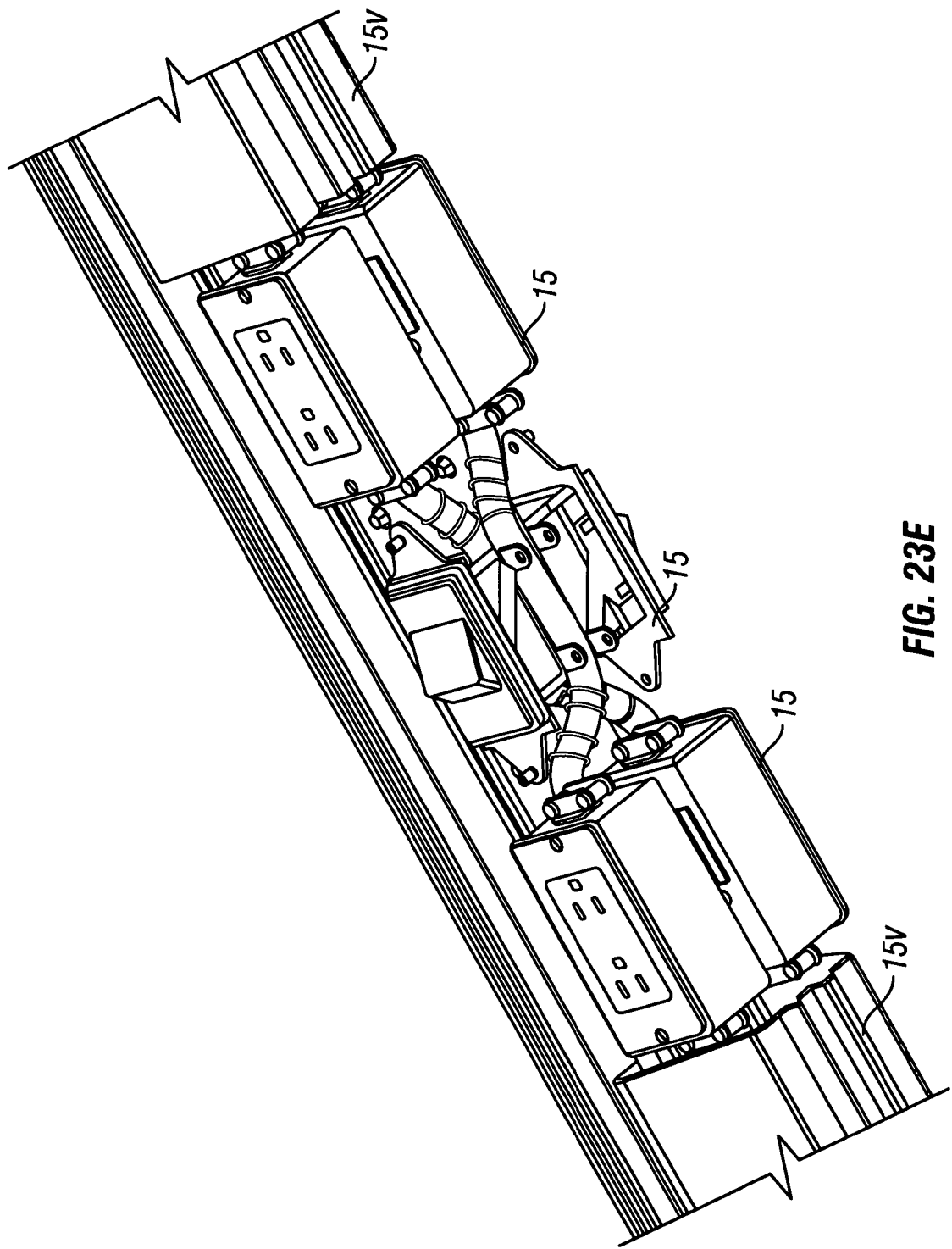
FIG. 23e is a perspective view of another embodiment of a channel of the present invention in a disassembled state.
Figure 23F:
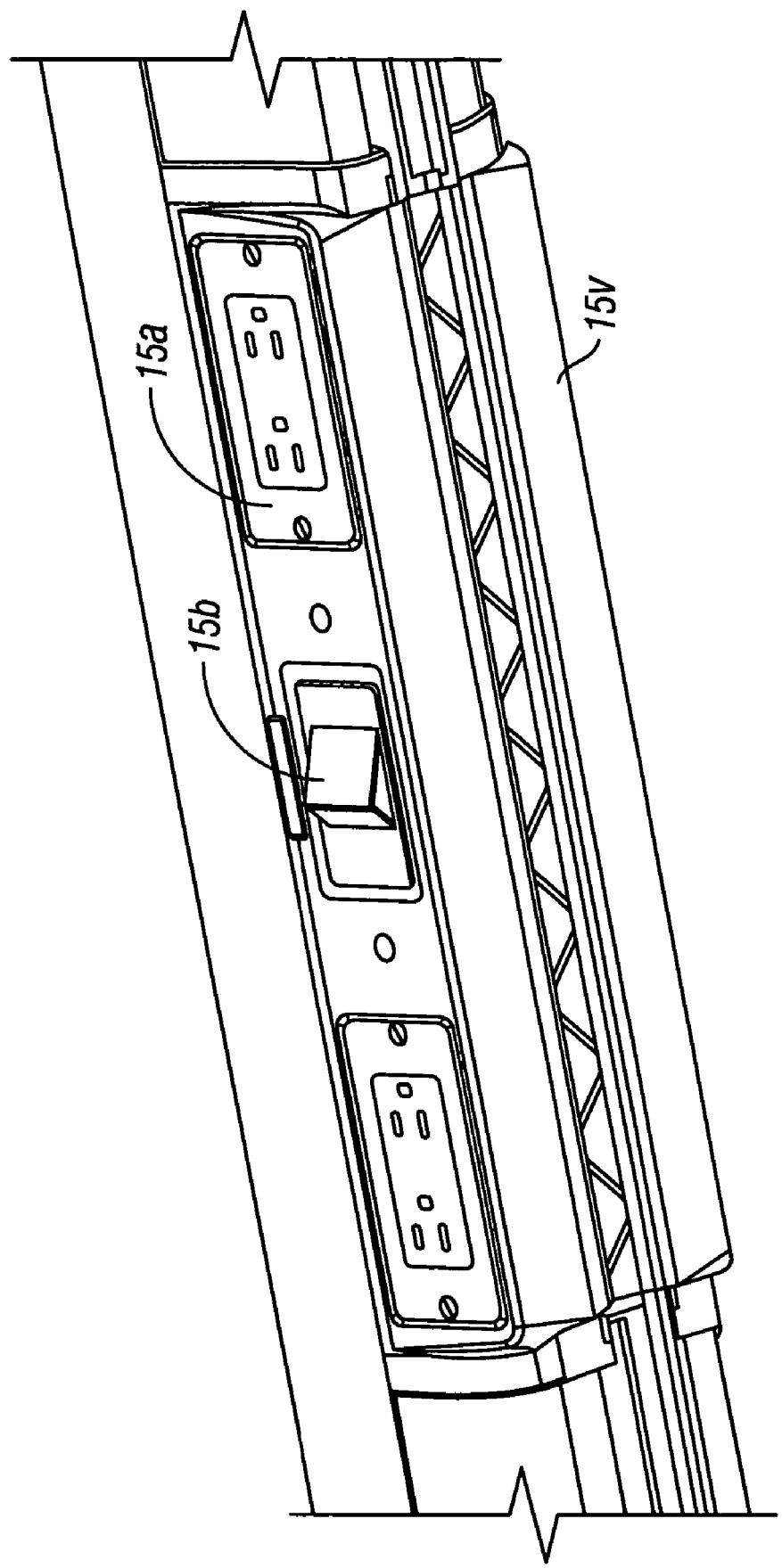
FIG. 23f is a perspective view of the embodiment of FIG. 23e assembled.

FIGS. 23a and 23b more clearly illustrate the placement of the parts of a channel 14 and the various uses of those parts. In FIG. 23a, panels 14u have been removed from structural conduit 14t. As shown, conduit 14t is comprised of an elongated extruded member having connection channels 14c therein. Panels 14u have corresponding mate-able tabs 14n that permit the panel 14u to be snapped into place on conduit 14t. It will be understood that other than complete removal of panels 14u, panels 14u can instead be hinged open by leaving one of its tabs 14n in place on conduit 14t and merely rotating the panel open (as shown in FIG. 23c). As shown in FIGS. 23c and 23d, once rotated and/or pivoted cables or other conduits can be laid into channel 14 and panel 14u can then be snapped back into place, without the need for fishing or threading cables therethrough.

As shown in FIGS. 23 through 25b, connection assemblies 17, similar to those described previously, are shown as the attachment means of the channels 14 to substations 12 and supports 16. It will be seen that supports 16 and substations 12 each have a dedicated type of connection assembly 17, which differs only in the type of visual blocker used. Each is provided with a locking mechanism 17l, which provides a quick and easily undoable method of locking a channel to one of the support or substation mechanisms. Referring to FIG. 24a, the end of a channel 14 is shown, having connection assembly 17 clearly demonstrated. As shown connection flange 17f is shown in the default disconnect position, however, when connection assembly 17 is placed on a support 16 and legs 17a are rotated and/or pivoted to the desired position, such that channel 14 extends in a desired direction, locking mechanism 17l can be flipped to its lock position (by lifting lock handle 17h and squeezing spring 17s) causing flange 17f to engage support 16, releasably locking channel 14 in place.

In preferred embodiments channels 14 can include one or more of the following features: duplexes 164 along the length of the channel; conduit carrier 14v for wire electrical system; further, depending on regional regulations, different conduit carrier 14v for certain geographic regions. In one embodiment of the present invention, channels 14 can be pre-wired at a factory location and built to order, so that assembly of the transmission system is made easier. Conduit carriers 14v can be constructed of any desirable material having such qualities as strength and durability, such as aluminum, steel, other metals or alloys, or plastics and can be created using molds, extrusions or any type of material manipulation.

Further, in one embodiment a support system can be used such that channel 14 can be placed so that the bottom surface is 20 inches off of the floor; it will be understood that the present invention can be modified to place channels at any desired height without departing from the novel scope of the present invention.

In a preferred embodiment, outer covers 14u are made of plastic extrusions of desired colors, providing flexibility and aesthetics. The design of the present invention, further has been found to support the weight of the Underwriters Laboratory (UL) sit test, providing strength and flexibility to the transmission system.

As noted, in a preferred embodiment, an added feature of the system is that data and/or cables can be installed without the necessity of running cables through holes and floors and walls. The cables are simply laid into the tops of the channels, substations and supports and then the appropriate covers are placed back on the channels and substations and supports. The channels have flexible troughs that can be flexed open to lay in the data cables. This eliminates much of the network installation time and cost. It will be understood that as a result of the elegant method of laying cables and the use of substations, channels and supports to bring power, data and communications conduits to the transmission system and throughout the system of the present invention, the archaic need to fish cables and conduits through walls, floors, ceilings, moldings, and equipment can be obviated; a single feed of these through to the transmission system, and then the simple laying of cables as desired makes such practice unnecessary.

Figure 27:
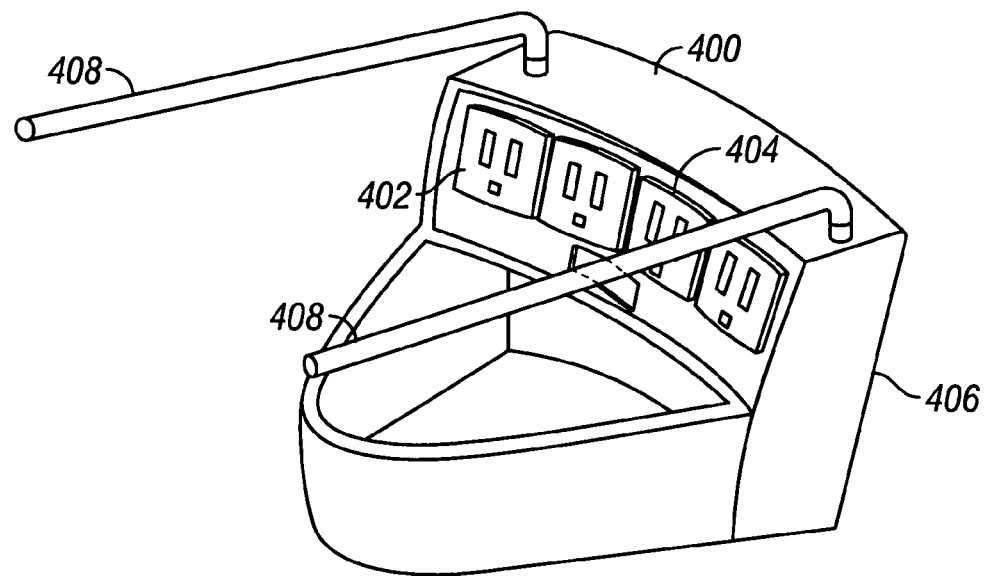
FIG. 27 is a perspective view of one embodiment of a bucket of the present invention.

Referring now to FIGS. 26 through 29, various data, communications and power components 400, which permit the movement of power from a substation, channel or support to a desk, table top or other work surface are shown. The components 400 are designed to increase user accessibility and convenience. They provide power/phone/data receptacles at desk level and maybe mounted to various furniture components. They also provide bulk cord storage (FIG. 27). The umbilical bucket 402 is a power strip 404 with a tray 406. After plugging a device into the power strip, a user can throw cords in the tray and the entire umbilical bucket 402 slides underneath the desk, using placement arms 408. This is a unique way to hide the cord clutter that is usually left hanging off the back of desks.

Figure 28:
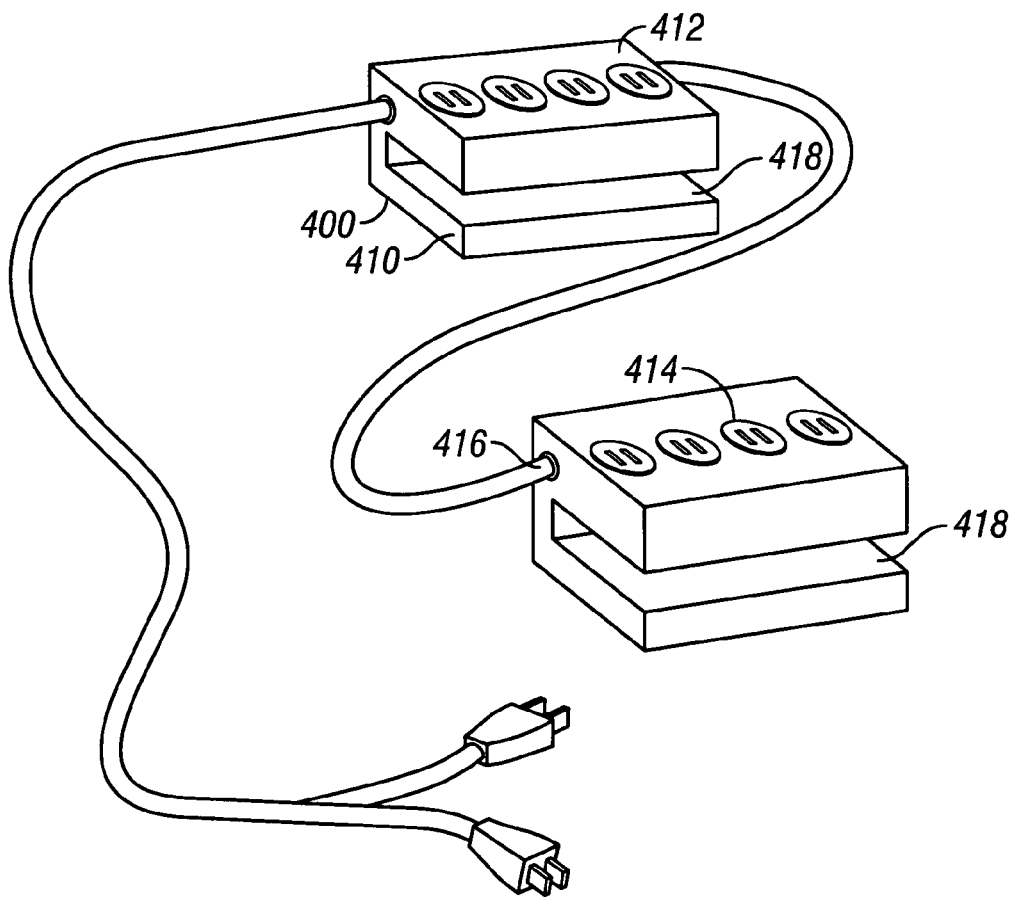
FIG. 28 is a perspective view of one embodiment of an umbilical used in association with the present invention.

FIG. 28 shows a second umbilical system 410 that does not include a bucket. Umbilical 410 can include electrical protection equipment such as static discharge elements and surge protectors, without departing from the novel scope of the present invention. In a preferred embodiment, the umbilical 410 includes a power strip 412 that has two circuits such that one circuit can be used for a computer and the other circuit can be used for other devices without fear of overloading or risking two valuable devices. In another embodiment, shown in FIG. 28, an umbilical 410 comprises two power strips 412 and 414. The first power strip 412 can plug into the back of the second power strip 414 utilizing a special connector 416. This gives the user the option of having one or two power strips. It also allows a user to put one power strip on one side of their desk and one on the other side of their desk, utilizing desk attachment means 418. Connecting one to the other reduces the number of cords that are running from the desk to the channel.

Figure 29A:
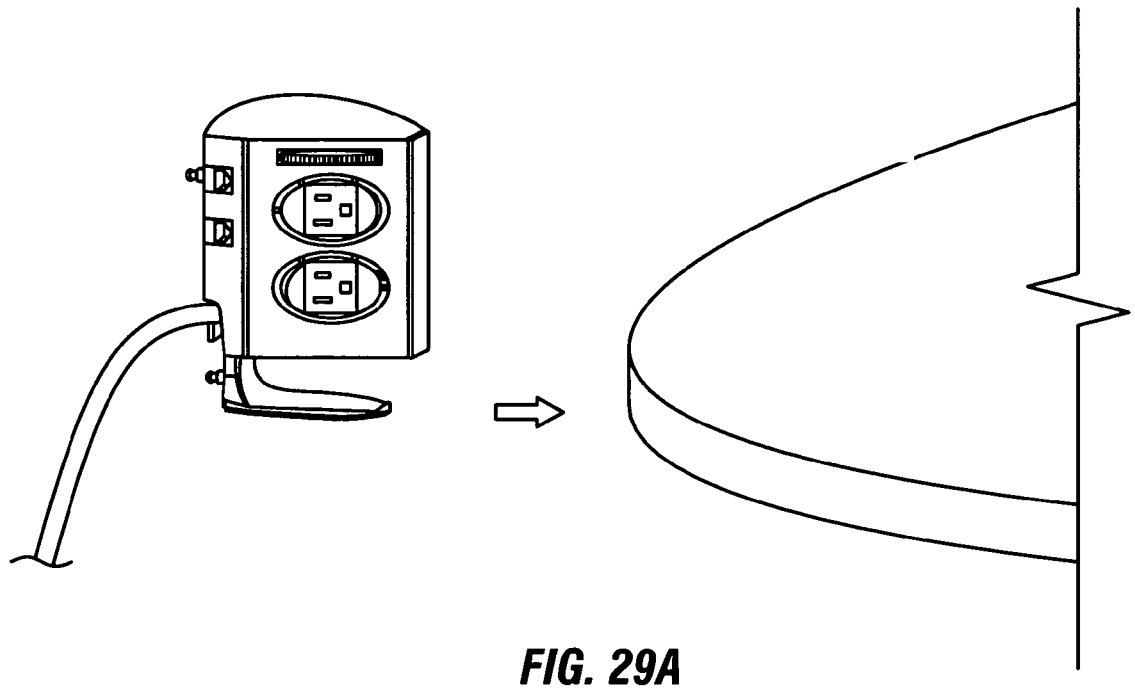
FIG. 29a is a perspective view of one embodiment of a data, power and communication source, of the present invention, being attached to a work surface.
Figure 29B:
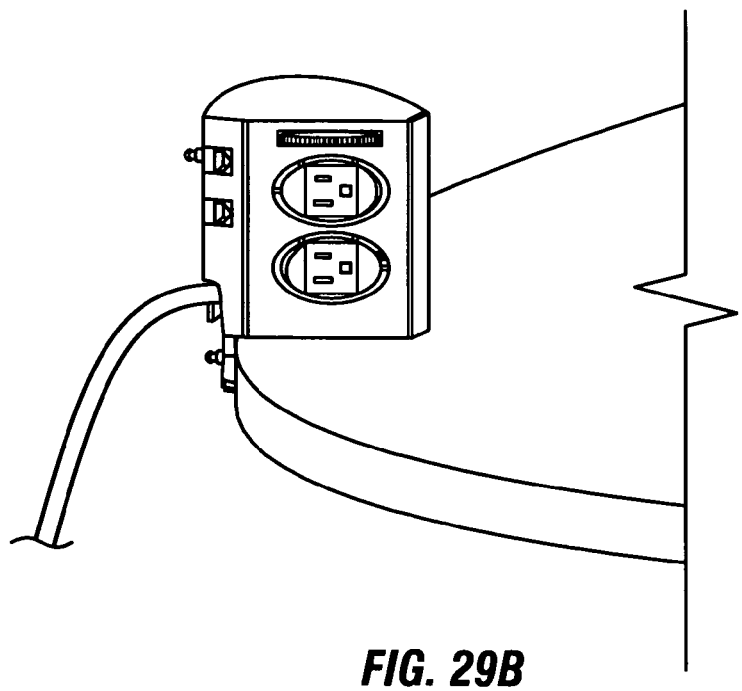
FIG. 29b is a perspective view of one embodiment of a data, power and communication source, of the present invention, attached to a work surface.

FIGS. 27, 29*a* and 29*b* show variation of power management systems and the manner of connection of the devices to a work surface. It will be understood that devices having various shapes and designs, and comprising power, data and communications ports, or any combination thereof, can be used, in association with the present invention, without departing from the novel scope of the present invention. Each of the devices can include duplexes, that include power, data and communications means, such that a work station, having easy use features and easy means of reaching power, data and communications ports, without having to bend down below the surface of a desk and find an outlet, are created. It will be understood that the present invention concerns itself more with the means of moving power, data and communications means from the transmission system 30 to or near work surfaces and stations, for ease of and accessibility. Further, it will be understood that such devices can include step-down or up power means, such that devices using different sources of power or communications ports, can be used when such devices are brought to the work station; as for example, when a foreign visitor arrives at an office.

Referring now to FIGS. 30 and 30*a*, a channel 14, similar to those previously shown, having power and data outlets, a tubular shell 14*s* and outer covers 14*u*, is shown. It will be understood that a channel of the type having no data or power sources could be substituted here without departing from the novel source of the present invention. Channel 14 further includes accessory holding attachments 510, which can be removably snapped onto the top of tubular channel 14*s*, or as illustrated can be fixed to channel 14 using physical attachment means, such as fastening means 510*f*. Tubular channel 14*s*, in a preferred embodiment of the present invention, includes means to permit the attachment of accessory holding devices. As will be understood by persons having skill in the art, accessory holding can be accomplished by extruding tubular shell 14*s* in such a manner that the two standing walls 14*w* (FIG. 23) are molded to form a male mating member 14*m* at the top and molding the accessory holding means with a female mating means 510*f* (it will be understood by persons having skill in the art that other forms of mating means can be molded, or otherwise made, into the accessory holding part and the channel such that the channel 14 can be used to support accessories, without departing from the novel scope of the present invention).

The accessory holding means 510 include a first attachment point 510*a* and a second attachment point 510*b*. Each holding point is designed to hold different types of accessories that can be used in association with the present invention. As illustrated a set screw 510*s* in included to help maintain screen 26 in position.

Referring again to FIGS. 30 and 30*a*, a screen 26 is shown in position to be attached to channel 14. Screen holding pegs 26*p* can be lowered in to first attachment point 510*a* and held in position in channel 14, to provide screening in the work station. It will be understood that other accessories can be attached to channel 14, such as lights, monitors or other accessories or devices, using both first attachment point 510*a* and/or second attachment point 510*b* or both, without departing from the novel scope of the present invention.

Among the other types of screens and accessories, the following types of accessories are merely a brief listing, not meant to be complete or to encompass all of the accessories that can be attached within the novel scope of the present invention. Screens, such as privacy screens, space dividing screens, noise abatement screen, tack or marker boards, and lighted screens.

Figure 31:
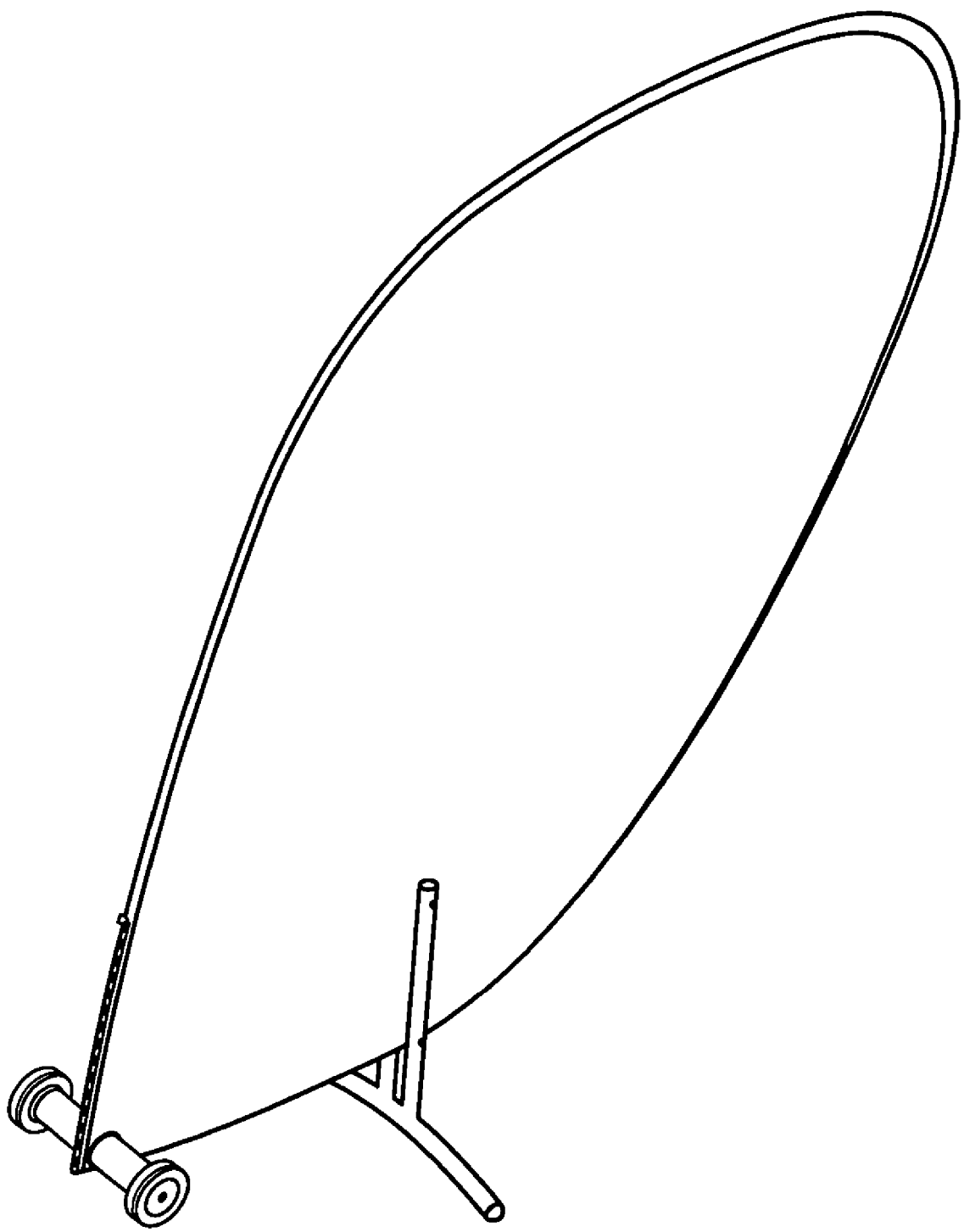
FIG. 31 is a perspective view of one embodiment of a mobile screen of the present invention.
Figure 31A:
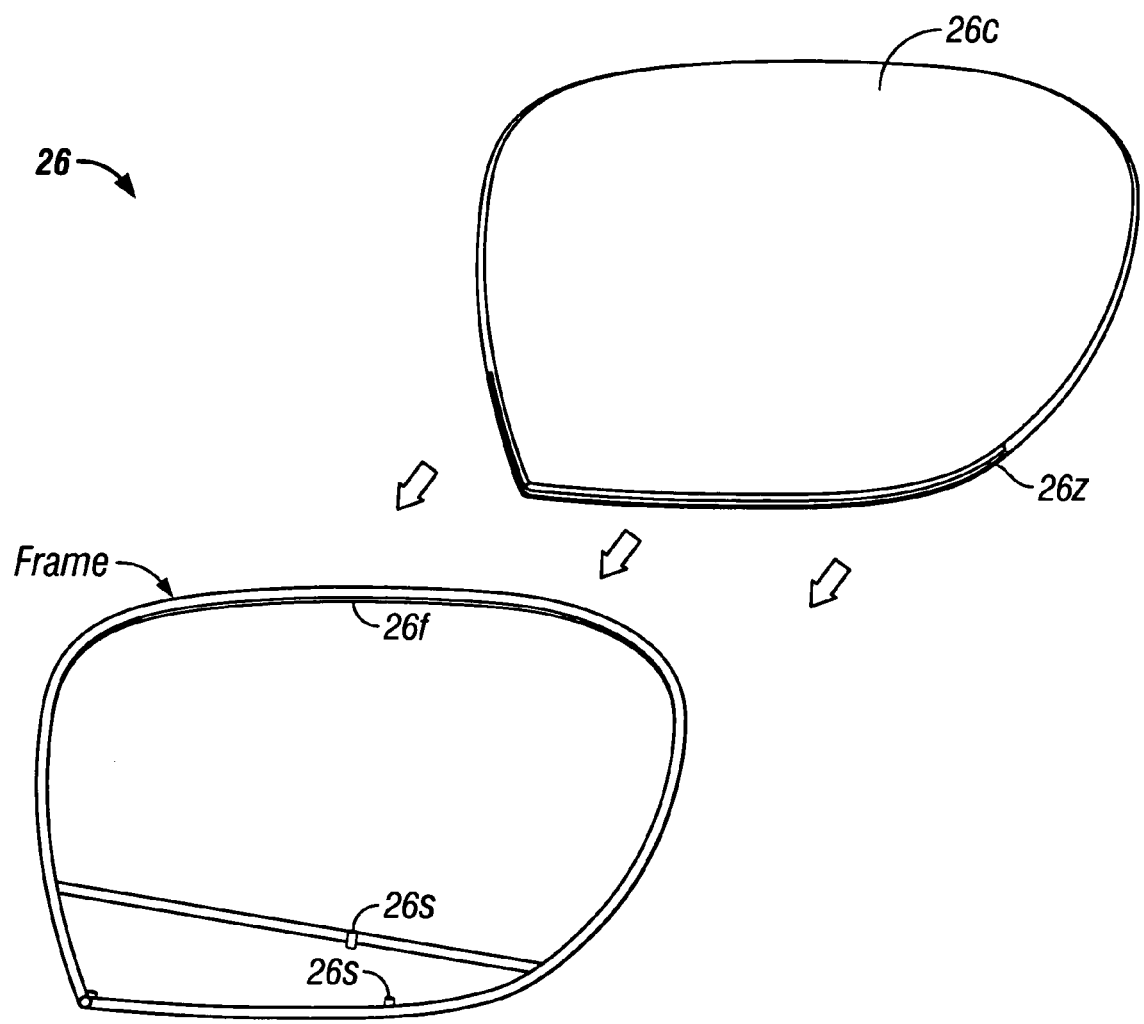
FIG. 31a is an exploded view of a screen and screen frame of the present invention.

Referring to FIG. 31 a movable screen, that can be rolled into position in the system 10 of the present invention is shown. This type of screen, while not attached to the transmission system of the present invention (not shown) can be utilized with the work station of the present invention. FIG. 31*a* shows an added feature of the screens 26 of the present invention. In some embodiments of the present invention, screens 26 comprise a cover 26*c* and frame 26*f* such that a screen can be removed and replaced in case of damage or for cleaning purposes. In FIG. 31*a* it can be seen that a tubular frame 26*f* having fastening points 26*s* and a bushing 26*b* is designed for specific mating with a screen cover 26*c* having concomitant points of connection. Screen cover 26*c* is fitted over screen frame 26*f* and a zipper 26*z* is fastened completing the screen assembly process. Should a new or different type of screen be needed or desired, or should cleaning or mending of the present screen be needed, the reverse procedure can be employed to remove and replace a screen.

Figure 32:
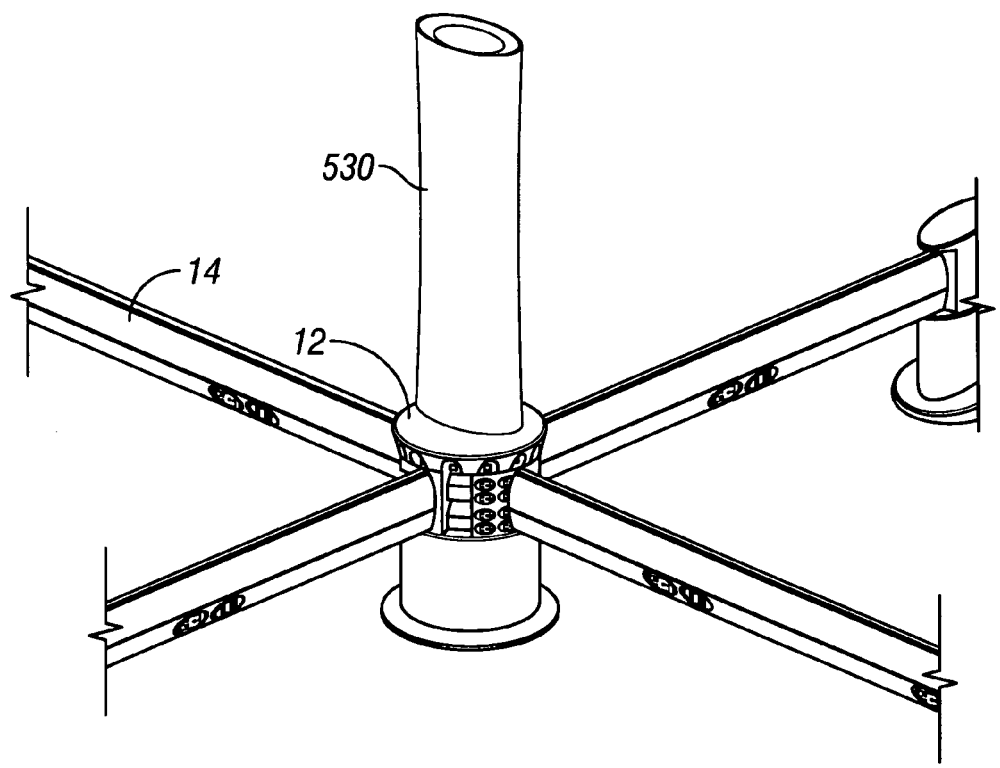
FIG. 32 is a perspective view of one embodiment of a substation with channels and a lighting source made in association with the teachings of the present invention.

FIG. 32 shows one type of lighting fixture 530 that can be used in an office system of the present invention. In FIG. 32 a lighting fixture 530 is attached at the top of a substation 12, of the type previously discussed. The fixture 530 is powered through the substation 12 and can be controlled by various means, including, but not limited to computer control through a network connection, overall power switch, local power switch, remote control switch and/or timers. It will be understood that such fixtures can be controlled to provide more or less light, by means of dimmers and other means, without departing from the novel scope of the present invention. Other types of light fixtures and lighting means can be utilized in the present invention. For example, the following types of lighting can be used: task lighting attached on a substation and channel support light pipe and ambient or reflective lighting. This list is meant only for example and is not to be an entire listing of all types of lighting that can be used with the present invention. These lighting sources can be attached at any of the points previously discussed, including channels 14, supports 16 or substations 12, or any combinations of these, without departing from the novel scope of the present invention.

The various accessories are designed to be easy to manufacture and low in cost to produce. The accessories facilitate additional user space and may provide privacy, additional lighting and/or storage. In one embodiment, the screens are movable. The front screens can slide side-to-side. The sail screens can rotate. The screens can be attached anywhere on the channels, substations, or supports. The front screen is flexible so that it bends out of the way if a table overlaps the channel.

Figure 33A:
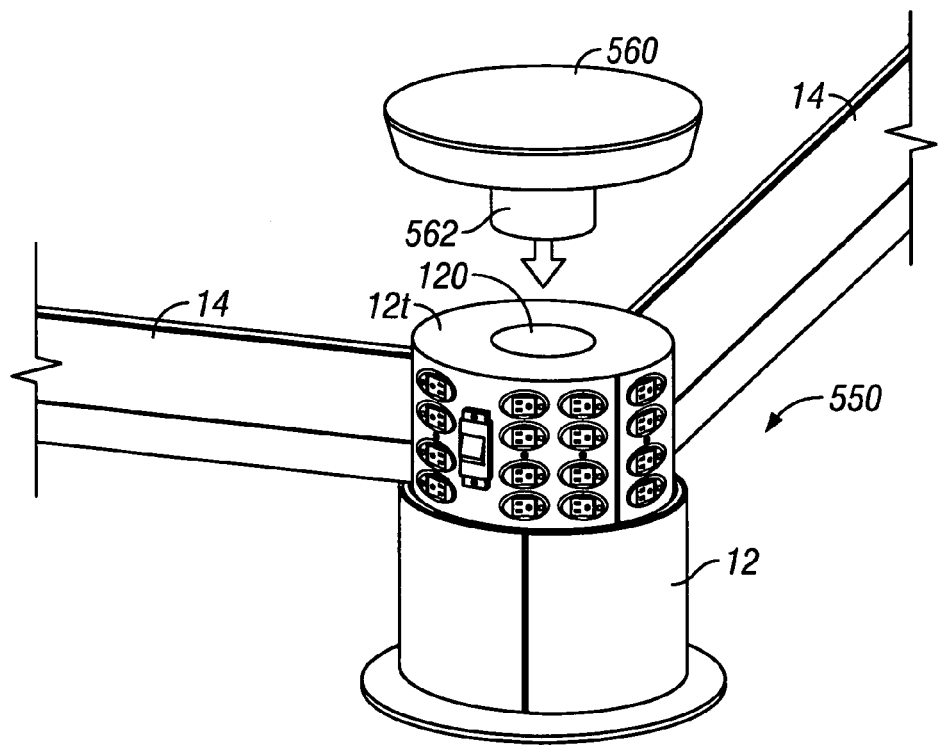
FIG. 33a is a perspective view of the assembly of a substation of the present invention and work surface.
Figure 33B:
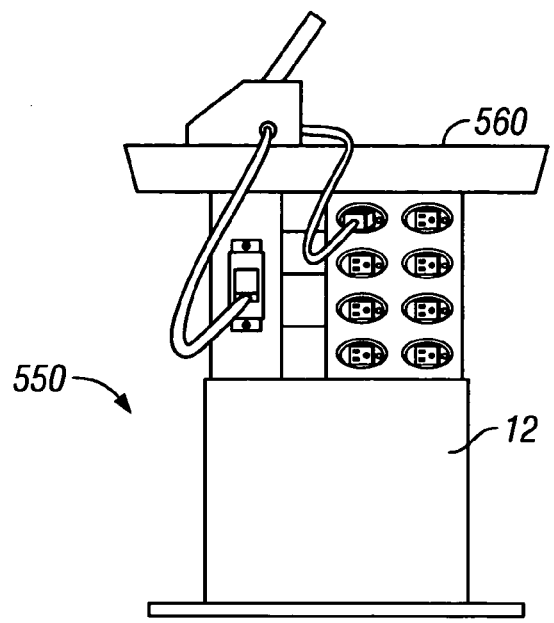
FIG. 33b is an elevational view of the substation and table top of FIG. 33a in use.

Referring now to FIGS. 33a and 33b, it can be seen that a work station 550 can be constructed using a substation 12 and a surface piece 560. In a preferred embodiment of the present invention, surface piece 560 is designed to have a connection point 562 that can be inserted into an opening 12o in a substation top piece 12t. When attached work station 550 can be used to hold equipment, such as a facsimile machine 564 which can be connected into data, communications and power ports on substation 12. It will be understood that any device can be placed on workstation 550 and or workstation 550 can be used for any purpose desired.

Figure 34:
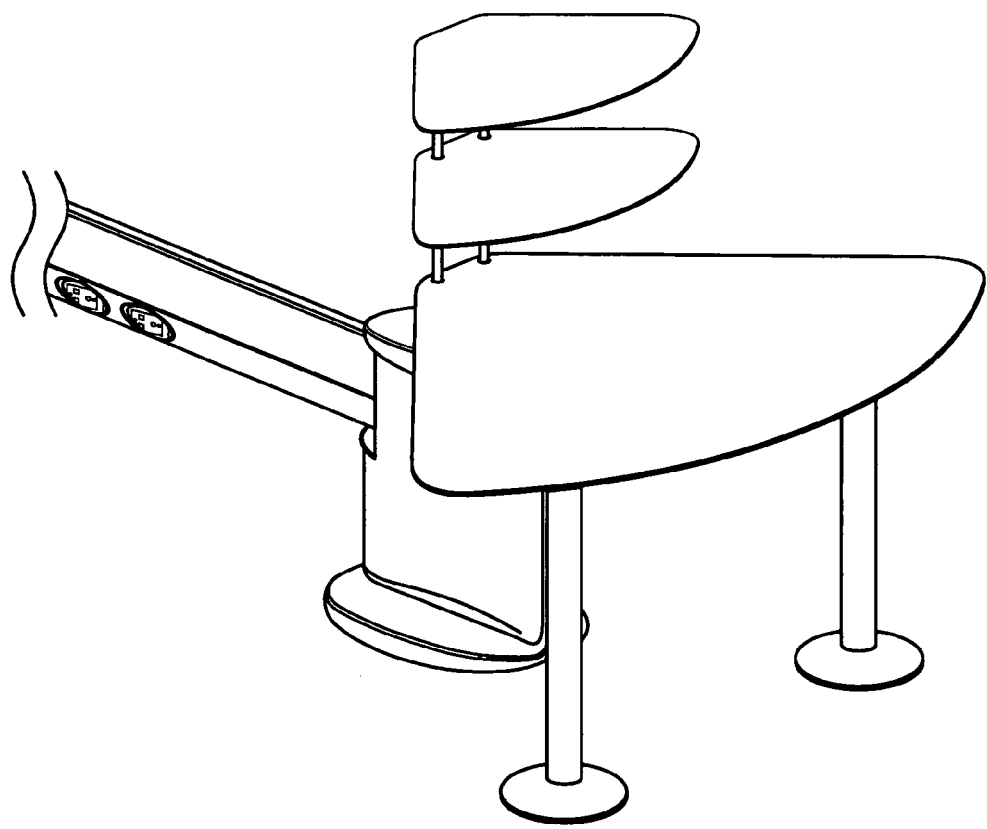
FIG. 34 is a perspective view of one embodiment of an end work and storage table of a workstation of the present invention.

Referring to FIG. 34 an end table, having various levels for use in any desired manner is shown. It will be understood that any type of device or table can be added to the end of a transmission system to provide a needed or desired work or storage area. A variety of different work surface extensions may be provided for system 10. Various embodiments may be as follows: end of run tables—for supporting equipment; channel mounted multi-tiered tables—with adjustable positions along the channel; substation work surfaces—provide additional space or storage area. This list is provided as an exemplary listing of possible but not a complete listing of all items that can be so attached and used.

Figure 35:
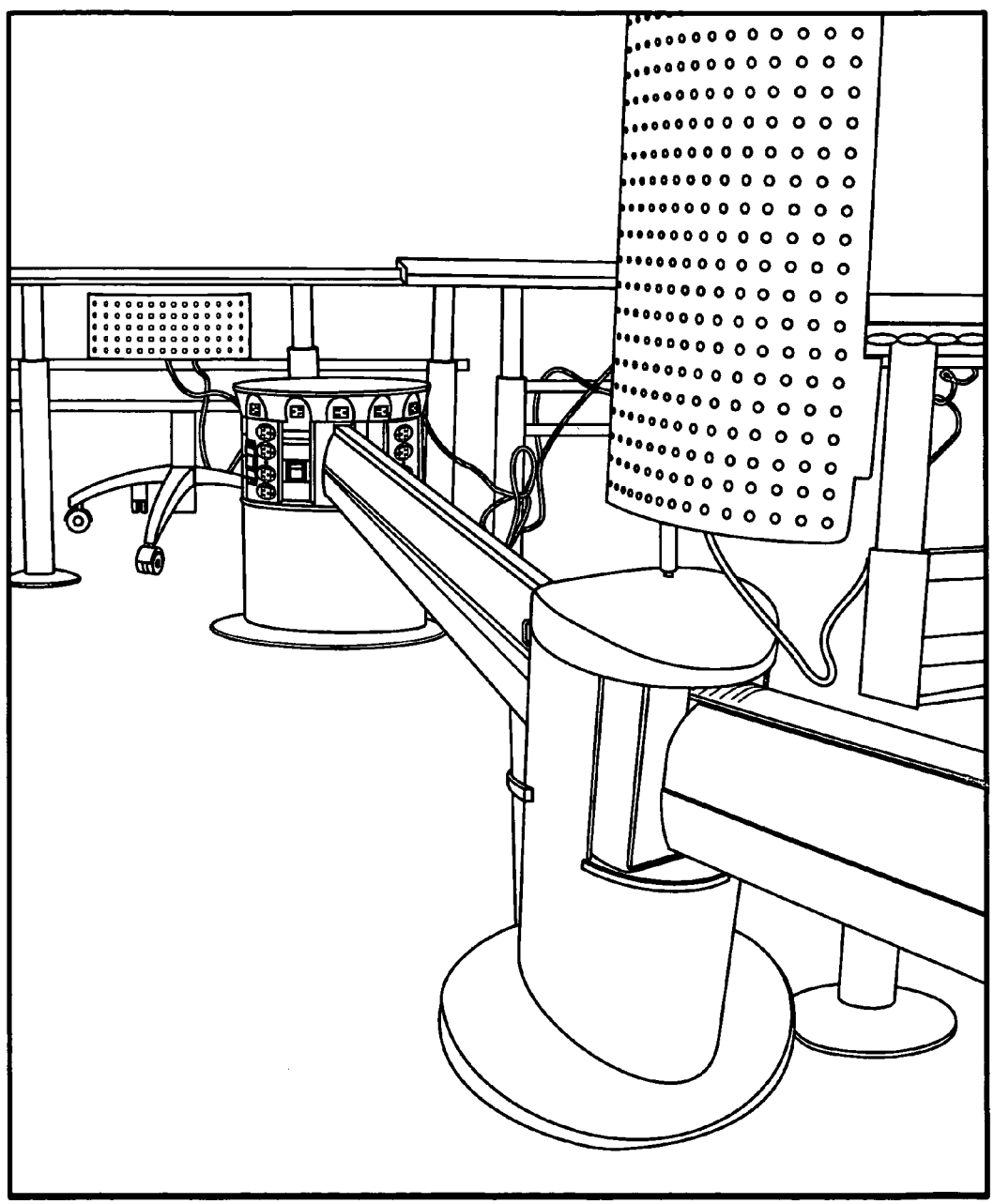
FIG. 35 is a perspective view of one embodiment of a screen used in association with a support and channels of the present invention.

Referring to FIG. 35 a support 16 is shown holding a perforated screen in a work station. The use of perforated screen permits the creation of a work station environment having some degree of privacy while permitting workers to interact. The illustration shows another embodiment of a work station and the extreme degree of flexibility provided by the device of the present invention. A variety of different marker and tack boards may be provided for system 10. For example: fabric tack boards—solid surface; adjustable positions along the channel; perpendicular to the channel, angle adjustable; various heights; marker boards; MDF with marker surface; adjustable positions along the channel; perpendicular to the channel, angle adjustable. This list is provided as an exemplary listing of possible but not a complete listing of all items that can be so attached and used.

Other accessories for system 10 may include signage, name plates, additional task lighting, utility bars, files storage/management, in/out trays etc., without being an exhaustive list or departing from the novel scope of the present invention.

Figure 24:
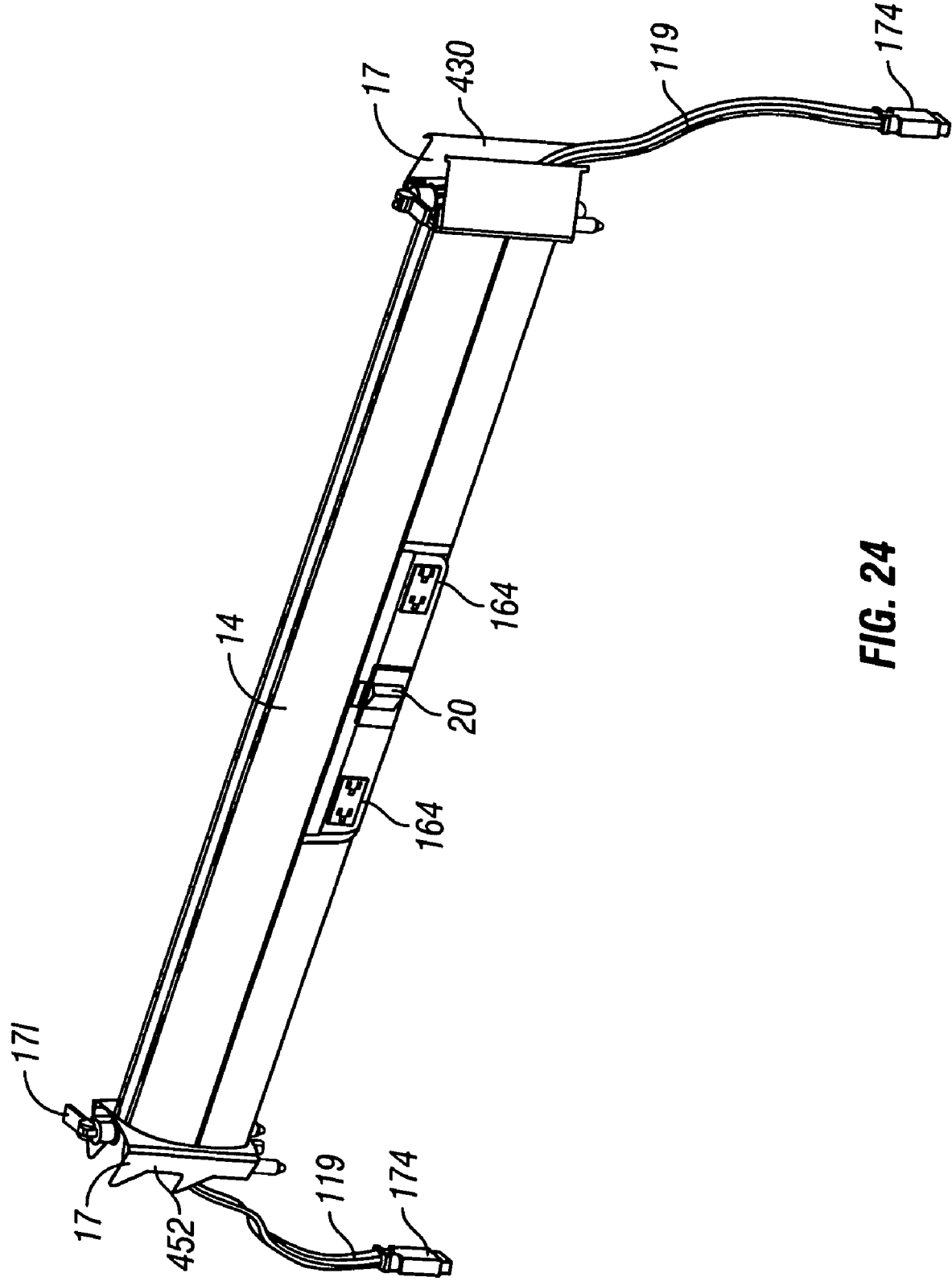
FIG. 24 is a perspective view of one embodiment of a channel of the present invention.
Figure 25A:
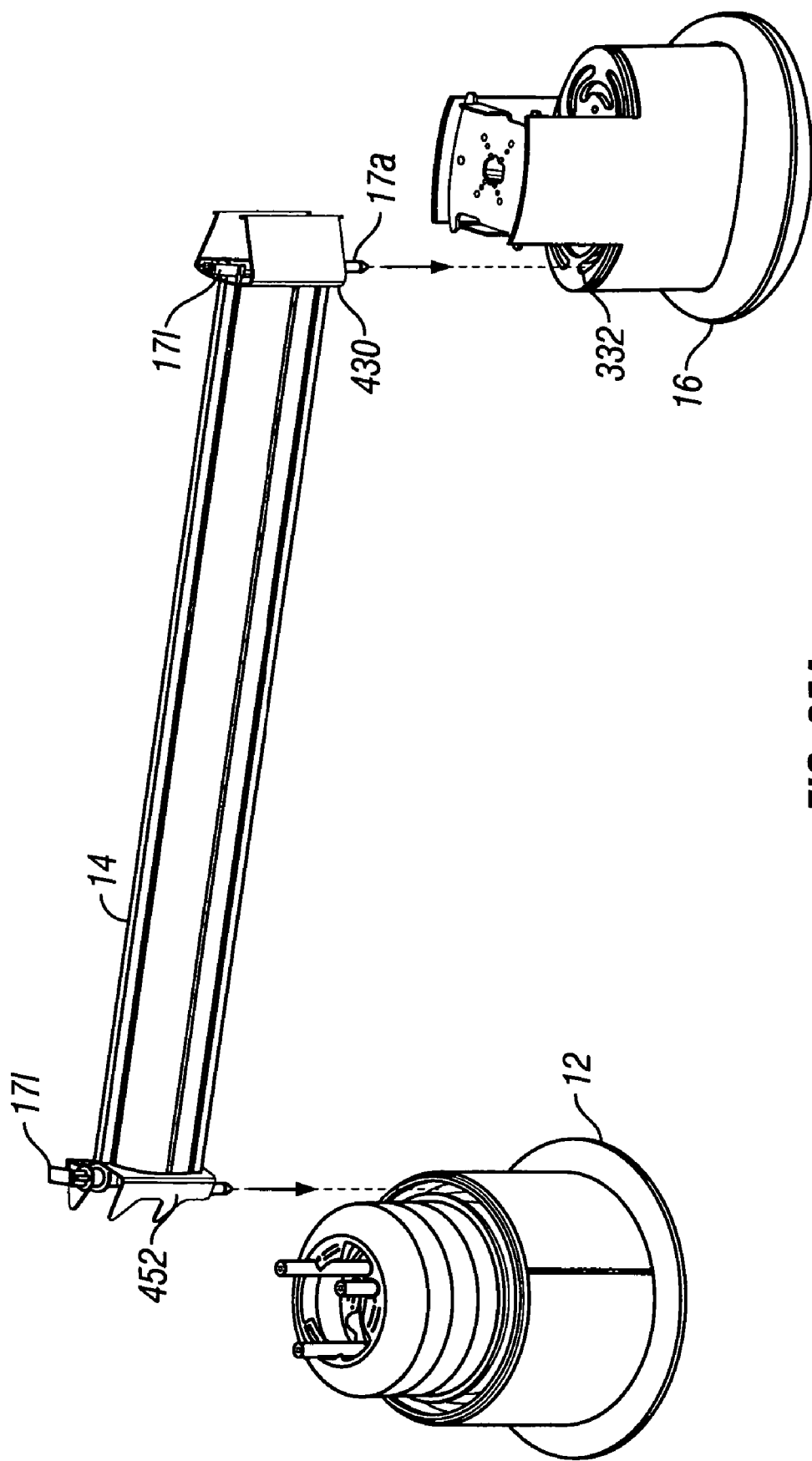
FIG. 25a is a perspective view of the assembly process of a channel of the present invention to a substation and support of the present invention.
Figure 26:
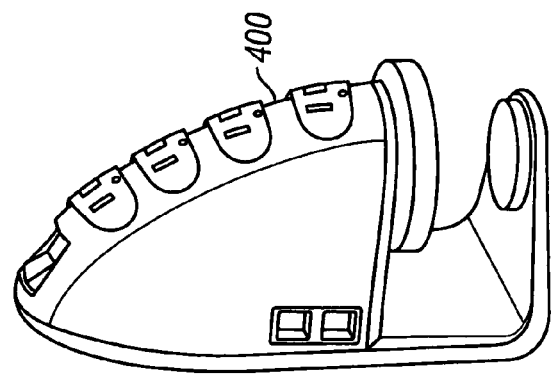
FIG. 26 is a perspective view of one embodiment of a parrot of the present invention.
Figure 25B:
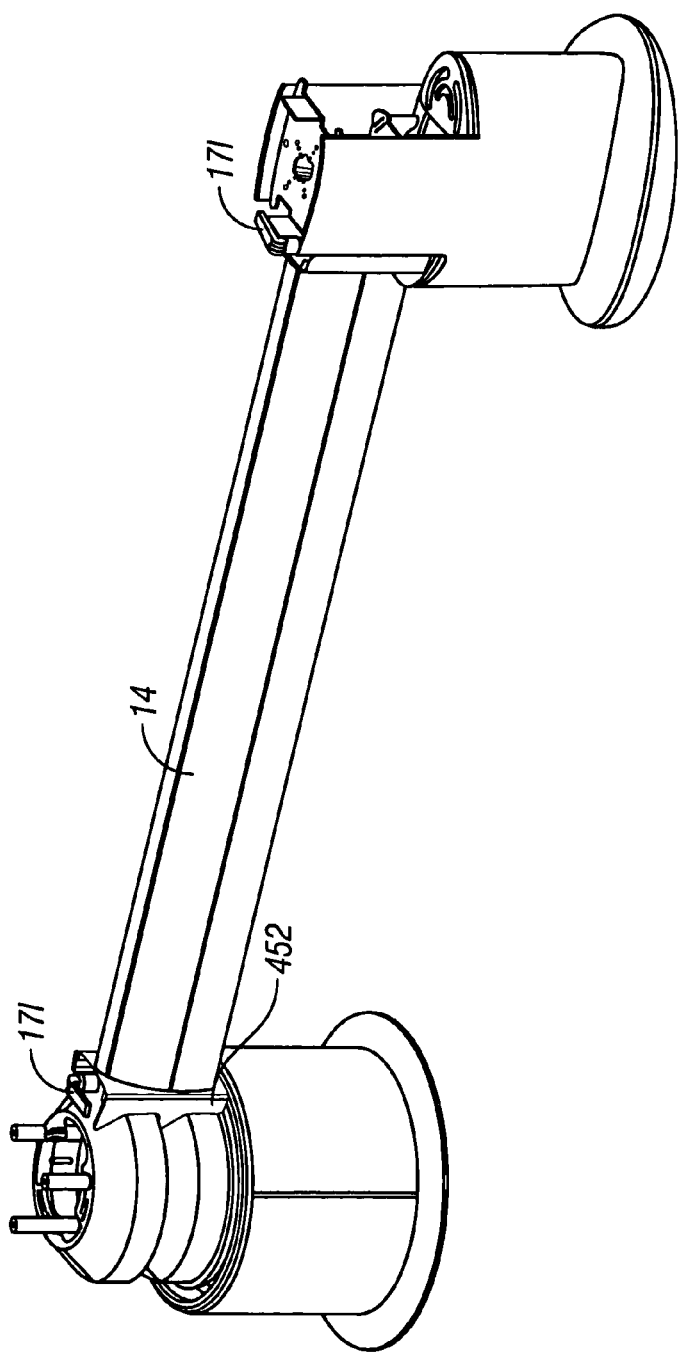
FIG. 25b is a perspective view of an assembled system of a substation, a channel and a support of one embodiment of the present invention.

In the creation of one embodiment of an office space environment, a user will typically select one or more substations 12 a number of channels 14 and supports 16. The user will decide the types of data and communications equipment that will be needed and have an adequate number of ports and cables assigned to each work station that will be developed. A desired number of tables, desks, screens, chairs and other furniture, as well as computers and electronic devices will be selected and ordered. A transmission system 30 will be laid out, using channels 14, substations 12 and supports 16. It will be understood that the number of work stations can be adjusted so that fewer or more can be added or removed as needed, throughout the life of the office or work station. As an example, a user orders one substation 12 three channels 14 and four supports, which are attached together, as described above and shown in FIG. 2. As part of the set-up of the system, the substation is attached so that it receives power, data and communications cables from a wall outlet. The substation is fitted with an end fitting 17e, as shown in FIGS. 21-23, to permit the feeding of cables from the wall into transmission system 30. A number of duplexes, including power, data and communications ports are attached to substation 12, and a channel is attached thereto as well. Channel 14 is fitted to substation 12, using a support locking member 17 and locked into place, in a desired angle, using locking means 17l to quickly and releasably set channel 14 as desired. A support is attached at the distal end of channel 14, in a manner described above. Channel 14 can included duplexes, as shown in FIG. 24, or can be unpowered as desired. A number of umbilicals, can be attached to substation 12 to provide power to any number of desks or tables used in association and in proximity to substation 12. A second channel 14 is attached to first support 16 and subsequently the other channels and supports are attached in sequence as described, herein. The last substation in the sequence is fitted with either a locking member 17 having duplexes or fitted with a decorative cover, so as to provide a finished appearance to transmission system 30. Each of the supports 16 can include power duplexes and can include umbilicals as needed, or which can be added as desired. Screens can be placed onto channels 14 to provide privacy between work stations.

At a future date, as the office or work station user needs to add more work stations, the decorative or duplex locking member can be removed and further channels 14, substations 12 and/or supports 16 can be added and more workstations included in the original office space. Further, with the inclusion of new substations 12 and/or supports 16, new means of bringing more data, communications and power cables, or other sources, can be brought in through either the original substation or through the new devices. As the substations, channels and supports are designed such that there is no need to feed cables through openings, as described above, new cables can be easily dropped into the transmission system 30 without having to feed cables. As cables are, in a preferred embodiment, attached through mate-able jumper cables, they can be traded out by merely unplugging a cable and plugging in a new cable. Further, sufficient plug in stations can be provided such that the rather than switching out cables (to provide more capacity) new cables can merely be dropped in and attached. It should be clear, from the description and figures, that one of the novel aspects of this invention is its ability to change an office space quickly and easily.

Should the above office space need to be retracted, as a result of down-sizing or employee loss, any number of the work stations can generally be unplugged and lifted away from the transmission system with little difficulty. The parts making up the now extra items, can be stored for quick and easy re-introduction as needed. Further, office managers can keep additional office stations in storage for use by employees or consultants who are only at the office or work space for only part of the work year or are seasonal. The quick attachment and then removal of these spaces allows for the modification of offices on a seasonal basis or as desired.

Although illustrative embodiments of the invention have been shown and described, it is to be understood that various modifications and substitutions may be made by those skilled in the art without departing from the novel spirit and scope of the invention.

What is claimed is:

1. A modular system of power and/or data and/or communications components comprising:
   a first structure into which at least one of data, power or communications means is brought into the modular system and distributed;
   at least one work station;
   at least one second structure, having a first end and a second end, the second structure spanning between a first structure and a work station with the first end being located proximate the first structure and the second end being located proximate the at least one work station, for accepting the at least one data, power or communications means and making at least one of data, power or communications means available to the at least one work station; and
   at least one connection means on the second structure at the first end and/or the second end, pivotally connected to either the first structure or the at least one work station or both, allowing the first structure and the at least one work station to be spaced apart by the length of the at least one second structure, along a rotational arc generally parallel to the surface that the first structure and the at least one work station are on, having a locus at the point of connection to the first structure and/or the at least one work station, the work station being movable to a plurality of locations apart from the first structure by the length of the second structure, while in connection therewith, whereby the first structure and the at least one work station can remain in data, power or communications connection, throughout a configuration and a subsequent reconfiguration of the modular system of the first and second structure, through the second structure.

2. The modular system of claim 1, wherein the first structure is one of a group comprising a substation and a support.

3. The modular system of claim 1, wherein the at least one second structure is one of a group comprising a substation, a support, an umbilical, a parrot, a channel or a support.

4. The modular system of claim 1, wherein the data, power and communications means are all brought into the first structure and are all distributed to the second structure.

5. A modular system of power, data and communications components comprising:
   a substation having power and data ports, for connection respectively to power and data carrier means, and means to connect said ports to, respectively, a source of power and at least one communication data source;
   at least one work station;
   at least one channel releasably connectable to said substation, said channel comprising a proximal end and a distal end and means to carry power and data from said substation therethrough;
   at least one connection means on the at least one channel, at the proximal end and/or the distal end, pivotally connected to either the substation or the at least one work station or both, allowing the substation and the at least one work station to be spaced apart by the length of the at least one channel, along a rotational arc generally parallel to the surface that the substation and the at least one work station are on, having a locus at the point of connection to the substation and/or the at least one work station, the work station being movable to a plurality of locations apart from the substation by the length of the channel, while in connection therewith, whereby the substation and the at least one work station can remain in data, power or communications connection, throughout a configuration and a subsequent reconfiguration of the modular system through the channel.

6. The modular system of claim 5, wherein said channel and substation are connected such that said channel can rotate in relation to said substation.

7. The modular system of claim 5, wherein said channel and support are connected such that said channel can rotate in relation to said support.

8. The modular system of claim 5, wherein said channel and substation are connected such that said channel can rotate in relation to said substation and said channel and support are connected such that said channel can rotate in relation to said support.

9. A method of providing a configurable and easily reconfigurable work space, having power or data or communication means, comprising the steps of:
   providing at least one first structure for receiving at least one of data, power and communications means;
   providing at least one work station;
   providing at least one second structure, having a first end and a second end, the second structure spanning between a first structure and the at least one work station with the first end being located proximate the first structure and the second end being located proximate the at least one work station, for accepting the at least one of data, power or communications means and making at least one of data, power or communications means available to the at least one work station; and
   providing at least one connection means on the second structure at the first end and/or the second end, pivotally connected to either the first structure or the at least one work station or both, allowing the first structure and the at least one work station to be spaced apart by the length of the at least one second structure along a rotational arc generally parallel to the surface that the first structure and the at least one work station are on, having a locus at the point of connection to the first structure and/or the at least one work station, the work station being movable to a plurality of locations apart from the first structure by the length of the second structure, while in connection therewith, whereby the first structure and the at least one work station can remain in data, power or communications connection, throughout a configuration and a subsequent reconfiguration of the work space through the second structure.

10. The method of claim 9, including the steps of providing at least one third structure for receiving the at least one of data, power and communications means and providing access to the means to the work space.

11. The method of claim 9 including providing at least one table for use in the work space.

12. The method of claim 9 including providing at least one screen.

13. The method of claim 9 wherein the at least one structure is one of the group comprising at least one substation, at least one channel and at least one support.

14. The method of claim 13 including the step of providing at least one table and the at least one screen as desired about the system; and
   laying power cables and data cables within the system such that data and power are available where desired within the office or work space system.

15. The method of providing an office or work space environment of claim 13, including providing a coverable opening along the length of the at least one channel, the channel comprising a first end and a second end, the opening being disposed to have power and data cables operably placed within the channel by being simply laid in the opening from the first end of the channel to the second end of the channel.

16. The method of providing an office or work space environment of claim 13, including providing attachment means to the substation and support, the attachment means including rotating means, such that the support may be spaced apart from the substation at any point away from the substation and a channel may span from the substation to the support.

17. The method of providing an office or work space environment of claim 13, including providing a single substation and a plurality of supports and channels, such that a large office or work space environment is created.

18. The method of claim 9 including the step of providing means to drop power and communication means from the ceiling of the work environment to the at least one structure.

* * * * *